United States Patent
Looney et al.

(10) Patent No.: US 6,953,886 B1
(45) Date of Patent: Oct. 11, 2005

(54) MEDIA ORGANIZER AND ENTERTAINMENT CENTER

(75) Inventors: Brian M. Looney, Lexington, MA (US); Evan Lampros, Bridgewater, MA (US); Howard Hull, Attleboro, MA (US)

(73) Assignee: Looney Productions, LLC, Lexington, MA (US)

( * ) Notice: Subject to any disclaimer, the term of this patent is extended or adjusted under 35 U.S.C. 154(b) by 0 days.

(21) Appl. No.: 09/951,040

(22) Filed: Sep. 12, 2001

Related U.S. Application Data

(63) Continuation-in-part of application No. 09/855,858, filed on May 15, 2001, now abandoned, which is a continuation of application No. 09/419,559, filed on Oct. 18, 1999, now Pat. No. 6,232,539.

(51) Int. Cl.[7] .......................... G10H 7/00; G04B 13/00; A63H 5/00
(52) U.S. Cl. ...................................... 84/615; 369/30.08
(58) Field of Search .......................... 84/609, 615, 653; 369/30.08, 30.09

(56) References Cited

U.S. PATENT DOCUMENTS

| | | |
|---|---|---|
| 3,947,882 A | 3/1976 | Lightner |
| 4,061,890 A | 12/1977 | Froeschle et al. |
| 4,158,756 A | 6/1979 | Keezer |

(Continued)

FOREIGN PATENT DOCUMENTS

| | | |
|---|---|---|
| GB | 2305339 | 4/1997 |
| WO | WO 93/18465 | 9/1993 |
| WO | WO 9318465 | 9/1993 |
| WO | WO 96/12255 | 4/1996 |
| WO | WO 96/12256 | 4/1996 |
| WO | WO 96/12257 | 4/1996 |
| WO | WO 9612258 | 4/1996 |
| WO | WO 96/12259 | 4/1996 |
| WO | WO 9617451 | 6/1996 |
| WO | WO 9848532 | 10/1998 |
| WO | WO 9908193 | 2/1999 |

*Primary Examiner*—Jeffrey W Donels
(74) *Attorney, Agent, or Firm*—Cesari and McKenna, LLP

(57) ABSTRACT

A media organizer and entertainment center includes an importer for importing individual media/data selections and automatically assigning each selection at least one associated category flag pursuant to predetermined or user defined criteria. The center also includes a storage device for storing compressed data corresponding to the plurality of individual media/data selections and the associated category flags and a retriever for retrieving selections from the storage device based upon user selection of one or more of the associated category flags, and a data decompresser that translates the compressed data into playable digital or audio media data. With the center, playable digital or audio media data can be advantageously transported, organized, played or recorded through or on a variety of products or devices.

17 Claims, 64 Drawing Sheets

U.S. PATENT DOCUMENTS

| | | | |
|---|---|---|---|
| 4,227,220 A | 10/1980 | Brown et al. | |
| RE31,679 E | 9/1984 | Froeschle et al. | |
| 4,549,631 A | 10/1985 | Bose | |
| 4,577,069 A | 3/1986 | Keezer | |
| 4,703,465 A | 10/1987 | Parker | |
| 4,739,514 A | 4/1988 | Short et al. | |
| 4,851,931 A | 7/1989 | Parker et al. | |
| 4,937,807 A | 6/1990 | Weitz et al. | |
| 5,092,424 A | 3/1992 | Schreiber et al. | |
| 5,408,630 A | 4/1995 | Moss | |
| 5,418,713 A | 5/1995 | Allen | |
| 5,445,295 A | 8/1995 | Brown | |
| 5,486,645 A | 1/1996 | Suh et al. | |
| 5,502,601 A | 3/1996 | Scheffler | |
| 5,508,984 A | 4/1996 | Goto | |
| 5,510,573 A | 4/1996 | Cho et al. | |
| 5,557,541 A | 9/1996 | Schulhof et al. | |
| 5,581,795 A | 12/1996 | Maupin et al. | |
| 5,592,511 A | 1/1997 | Schoen et al. | |
| 5,610,774 A | 3/1997 | Hayashi et al. | |
| 5,610,893 A | 3/1997 | Soga et al. | |
| 5,611,607 A | 3/1997 | Kuzara et al. | |
| 5,616,876 A * | 4/1997 | Cluts | 84/609 |
| 5,619,425 A | 4/1997 | Funahashi et al. | |
| 5,625,608 A | 4/1997 | Grewe et al. | |
| 5,633,839 A | 5/1997 | Alexander et al. | |
| 5,636,276 A | 6/1997 | Brugger | |
| 5,648,628 A | 7/1997 | Ng et al. | |
| 5,670,730 A | 9/1997 | Grew et al. | |
| 5,679,911 A | 10/1997 | Moriyama et al. | |
| 5,696,965 A | 12/1997 | Dedrick | |
| 5,734,119 A | 3/1998 | France et al. | |
| 5,734,719 A | 3/1998 | Tsevdos et al. | |
| 5,739,451 A | 4/1998 | Winksy et al. | |
| 5,740,134 A | 4/1998 | Peterson | |
| 5,841,979 A * | 11/1998 | Schulhof et al. | 709/237 |
| 5,926,624 A * | 7/1999 | Katz et al. | 709/217 |
| 5,987,525 A | 11/1999 | Roberts et al. | |
| 6,061,680 A | 5/2000 | Scherf et al. | |
| 6,154,773 A | 11/2000 | Roberts et al. | |
| 6,240,550 B1 | 5/2001 | Nathan et al. | |
| 6,243,725 B1 * | 6/2001 | Hempleman et al. | 715/530 |
| 2002/0037083 A1 * | 3/2002 | Weare et al. | 381/58 |

* cited by examiner

| Test | ID | DiskN | SongNum | Title | Artist | Mstyle | Dtype | Spe | Time | En |
|---|---|---|---|---|---|---|---|---|---|---|
| OK | 2:RH34 | 3416 | | 1979 | Smashing Pumpkin | UP | | M | 260 | A |
| OK | 3:RU14 | 10 | | 1979 (Vocal Mix) | Smashing Pumpkin | UP | | M | 310 | A |
| OK | 5:T327 | 11 | | A Little Bit Me. A Littl | Specials | UP | | M | 211 | A |
| OK | 6:T317 | 11 | | Aeroplane | Red Hot Chili Peppe | UP | FAST D | F | 251 | A |
| OK | 11:RH36 | 3607 | | Big Me | Foo Fighters | UP | | | 133 | A |
| OK | 12:T319 | 13 | | Big Me | Foo Fighters | UP | MELLO\ | UP | 133 | A |
| OK | 13:T319 | 10 | | Bing Bang Baby | Stone Temple Pilots | UP | MELLO\ | UP | 203 | A |
| OK | 15:T320 | 15 | | Bluster | Salt | UP | | F | 194 | C |
| OK | 16:T314 | 16 | | Brother | Toad The Wet Spro | MEL | | M | 237 | A |
| OK | 17:RH38 | 06 | | But Anyway (Studio E | Blues Traveler | MEL | | M | 179 | A |
| OK | 19:RH36 | 3618 | | Champagne Super No | Oasis | MEL | | M | 304 | A |
| OK | 20:T317 | 13 | | Champagne Super No | Oasis | UP | | M | 301 | A |
| OK | 22:T322 | 04 | | Charms (Radio Remix | Philosopher Kings | UP | | M | 247 | A |
| OK | 23:RH35 | 3508 | | Closer to Free | Bodeans | UP | | M | 191 | EN A |
| OK | 24:T322 | 13 | | Common People (7 B | Pulp | UP | FAST D | F | 249 | EN A |
| OK | 25:RH37 | 3702 | | Counting Blue Cars | Dishwalla | UP | FAST D | | 263 | EN A |
| OK | 26:T319 | 15 | | Counting Blue Cars (E | Dishwalla | UP | | M | 263 | EN A |
| OK | 28:T325 | 17 | | Dangerous Type | Letters To Cleo | UP | FAST D | F | 194 | A |
| OK | 31:T350 | 14 | | Don't Speak | No Doubt | UP | | F | 252 | EN A |
| OK | 34:RH35 | 3502 | | Everything Falls Apart | Dog's Eye View | UP | | M | 227 | A |
| F/OK | 35:T318 | 17 | | Flood | Jars Of Clay | UP | | F | 196 | A |
| F/OK | 36:RH36 | 3614 | | Flood | Jars Of Clay | UP | | F | 197 | A |
| OK | 37:RH35 | 3513 | | Follow You Down | Gin Blossoms | MEL | | F | 226 | EN A |
| OK | 38:T313 | 11 | | Follow You Down | Gin Blossoms | MEL | | F | 225 | EN A |
| OK | 40:T334 | 11 | | Free To Decide | Cranberries | UP | | F | 265 | EN A |
| OK | 41:RH38 | 03 | | Free To Decide | Cranberries | UP | | F | 265 | EN A |
| F/OK | 43:T323 | 18 | | Girl Don't Tell Me | Fuzzy | UP | | F | 148 | A |
| F/OK | 44:T324 | 03 | | God Only Knows | Nylons | UP | | M | 211 | EN F |

FIG. 17

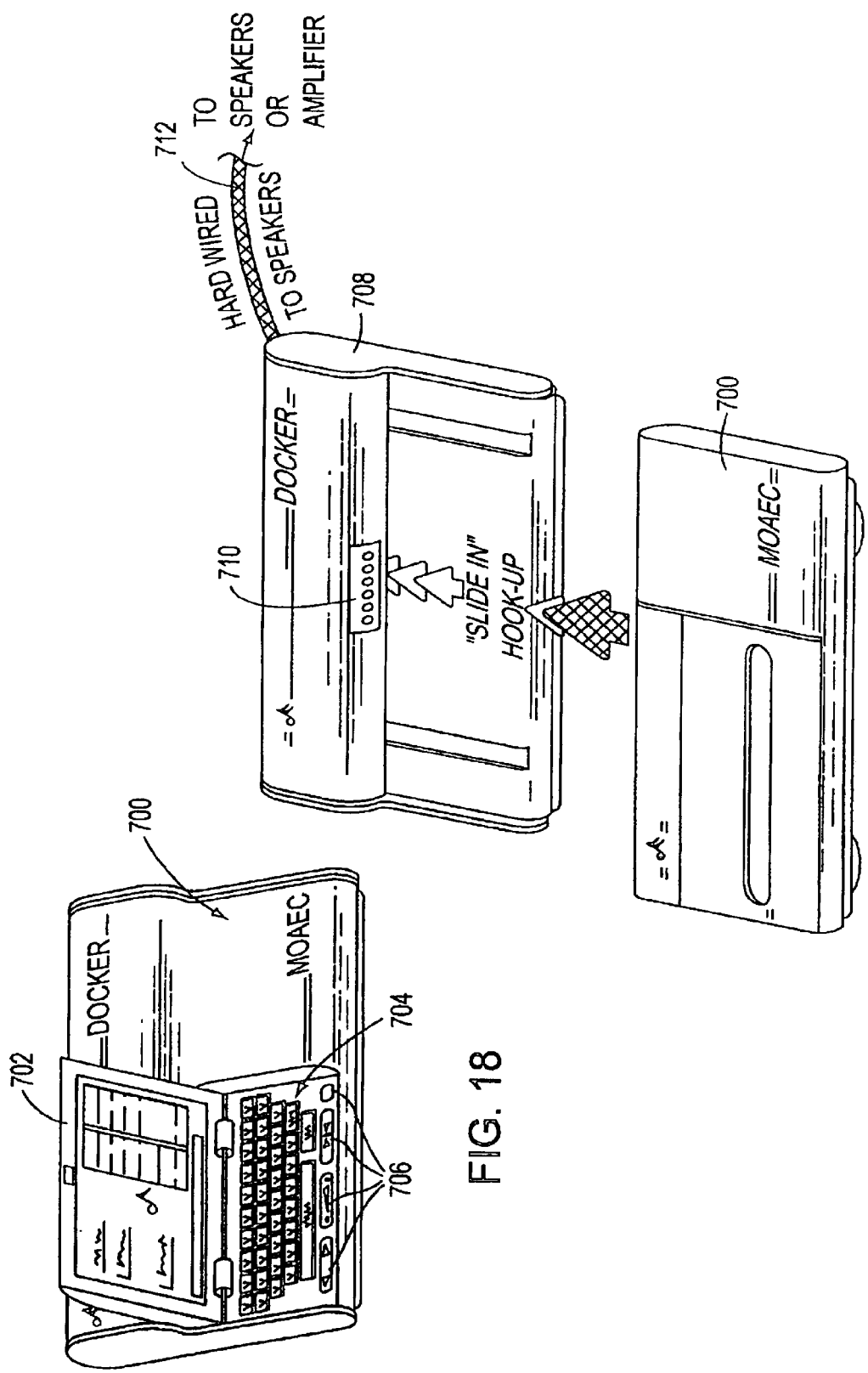

FIG. 23

| Own | Song Title | Artist | Data | Music Category | Music Style | Dance Type | Music Speed | Energy | Rating |
|---|---|---|---|---|---|---|---|---|---|
| Yes | Head Overfeet | Alanist Morissette | 95 | Alternative | Upbeat | Special Dance | Medium | Energy | |
| Yes | He Is | Ashley Cleveland | | Country | Mellow | Special Dance | Medium | Energy | |
| Yes | Spaceman | Babylon Zoo | | Metal | Upbeat | Special Dance | FMS | Energy | R |
| Yes | Somethin 'Bout Jesus | Big Tent Revival | | Religion | Upbeat | Fast | Fast | Energy | |
| Yes | Here With Me | Big Tent Revival | | Rock | Upbeat | Special Dance | Fast | Energy | |
| Yes | Three Is The Magic Number | Blind Melon | 96 | Alternative | Upbeat | Special Dance | Medium | Energy | |
| Yes | But Anyway (Studio Edit Guit... | Blues Traveler | 91 | Alternative | Mellow | Special Dance | Medium | Energy | |
| Yes | Hurt By Love | Bodeans | 97 | Rock | Upbeat | Special Dance | Medium | Energy | |
| Yes | Closer To Free | Bodeans | 96 | Alternative | Upbeat | Fast | Fast | Energy | |
| Yes | I'll Be Comin Around | Bottle Rockets | | Country | Upbeat | Special Dance | Fast | Energy | PG |
| Yes | That's The Point | Charlie Peacock | | Country | Mellow | Special Dance | Medium | Energy | |
| Yes | The World I Know | Collective Soul | 95 | Alternative | Mellow | Special Dance | Medium | Energy | |
| Yes | Free To Decade | Cranberries | 96 | Alternative | Mellow | Special Dance | Medium | Energy | |
| Yes | Free To Decade | Cranberries | 96 | Alternative | Upbeat | Special Dance | Medium | Energy | |
| Yes | Salvation | Crush | 96 | Alternative | Upbeat | Fast | Fast | Energy | |
| Yes | Jellyhead | DC Talk | | Top 40 | Upbeat | Special Dance | Fast | Energy | R |
| Yes | Between You And Me | Dishwalla | | Alternative | Upbeat | Special Dance | Medium | Energy | |
| Yes | Counting Blue Cars (Edit) | Dishwalla | 96 | Alternative | Upbeat | Special Dance | Medium | Energy | |
| Yes | Counting Blue Cars (Edit) | Dog's Eye View | 96 | Alternative | Upbeat | Special Dance | Fast | Energy | |
| Yes | Everything Falls Apart | Double Plus Good | 96 | Rap | Upbeat | Special Dance | Fast | Energy | R |
| Yes | The Winding Song | Everclear | 95 | Alternative | Upbeat | Special Dance | Medium | Energy | |
| Yes | Santa Monica | Foo Fighters | 95 | Alternative | Upbeat | Special Dance | Medium | Energy | |
| Yes | Big Me | Foo Fighters | 95 | Alternative | Upbeat | Special Dance | Medium | Energy | R |
| Yes | Big Me | Fuzzy | 78 | Alternative | Upbeat | Special Dance | Fast | Energy | PG |
| Yes | Girl Don't Tell Me | Garbage | 96 | Alternative | Upbeat | Special Dance | Medium | Energy | |

MEDIA ORGANIZER AND ENTERTAINMENT CENTER

RELATED APPLICATIONS

This is a continuation-in-part of U.S. patent application Ser. No. 09/855,858 filed May 15, 2001 now abandoned, which is a continuation of application Ser. No. 09/419,559 filed Oct. 18, 1999 now U.S. Pat. No. 6,232,539 B1.

BACKGROUND OF THE INVENTION

Reference to Computer Program Listing Appendix

This application includes a Computer Program Listing Appendix pursuant to 37 CFR 1.96(c) that contains a computer program listing of program commands in the commercially available Visual Basic language for implementing various functions of one embodiment of the center of the present invention described herein. The Appendix includes an original compact disc and a duplicate compact disc. Each disc having a portion of the disclosure of this patent document or patent disclosure contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Each disc includes a file entitled MOAECSOURCE.TXT that was created on Jun. 5, 2002 and is 602,096 bytes large.

1. Field of the Invention

This invention relates to media/data (music, books, movies, etc.) organization, playback and recording systems, and more particularly to a system that enables organization, storage, playback and recording of a wide range of individual music selections/songs according to user-defined or pre-programmed list of categories.

2. Background Information

The storage of music on digital media has presented a number of opportunities to miniaturize storage devices for music, thus enabling larger amounts of music to be stored in one place, and to radically alter the presentation of this music. In addition to the actual music sound data, new data related to certain characteristics of the music can now be overlaid in the storage media. This enables a listener to organize and playback music in a highly customized manner. It is no longer strictly necessary to store music in one format (e.g., a single disc or record) and playback individual selections from this disc or record according to a strict organization scheme. Likewise, advances in data compression and storage technology have enabled much larger quantities of digital data to be stored on magnetic disc and optical media than previously. The "Red Book" format common to music compact discs is somewhat inefficient due to its slow sample rate, and a much larger amount of data can be compressed on a standard data optical disc (CD-ROM), and decompressed and replayed using any number of readily available playback software routines.

In addition, most computers and data processing devices are now equipped with multimedia programs and advanced high-fidelity sound.

It is, therefore, an object of this invention to provide a media organizer and entertainment center that takes advantage of the latest advances in media data compression, storage and data processing capabilities. It is a further object of this invention to provide a user with the ability to fully customize playback of media/data according to a variety of parameters including categories. The graphical presentation of playback and storage controls should be easy to use and learn, and should take advantage of color and other visual aids.

SUMMARY OF THE INVENTION

This invention overcomes the disadvantages of the prior art by providing a media organizer and entertainment center that enables customized playback of music or other media/data such as movies, films, books, tape, etc. having a variety of predetermined categories that are provided, typically, ahead of time by a service provider, but can also be customized and edited by a user. Media/data is played back in any desired order based upon categories from an onboard or remote database that can include a large number of songs, titles, artists, producers, etc.

The media organizer and entertainment center provides a center having a micro-processor, sound card functions and high-volume data storage and retrieval units for playing back media/data according to a variety of predetermined categories or categories determined by the user. Media/data can be played back in random form or can be played back according to a particular pre-selected order. The categories used are provided by a service provider or the end user. The service provider or the end user deliver media/data into the system. The media/data is typically loaded using a custom CD-ROM provided from the service provider or the end user (digital files, audio cds, dvds etc.). The media/data is provided in data-compressed form or audio format which is later compressed. The media/data is then later decompressed and processed through a sound card during playback. The categories can include a variety of parameters such as title, artists, producer, date, speed, dance characteristics, energy level and style, type, etc.

The user selects between a variety of graphical user interface screens that are arranged on a display. The display can comprise a touch screen, or can include a variety of cursor-moving functions for operating different display "buttons" defined on the screen. Alternatively voice recognition software can be used to provide a voice operation capability to the user. Likewise, voice synthesis can be used to inform the user of various system operations.

The interface can be organized according to various categories (i.e. music, movies, books, etc.) that each appears as buttons, or other selection mechanisms which are not limited to size or shape. Within each button can be contained sub-categories for further organization. All categories are cross indexed with categories that are predefined within various fields of the database that stores the data for each song in an appropriate file having the various category flags appended thereto. Conventional database software such as Microsoft Access® can be used in forming the database for compressed media/data and categories. The media/data is preferably compressed using MPEG3 (although other compression technologies can be used). A standard sound card, typically having high-fidelity characteristics is used to playback the decompressed media/data. The media/data is stored in a hard drive or other high-volume storage medium on the system in compressed form. Compression of the media/data, as well as loading of appropriate category flags, can be accomplished at the service provider's facility or by the end user. Orders can be taken by the service provider and filled electronically, via the Internet, satellite, etc. Alternatively, oral orders can be made, that are filled by preparing a CD-ROM containing the selected media/data in compressed or decompressed form. A master list can be contained on the database of the service provider and/or users' system. This master list can be used to select the various media/data from the service provider. The CD-ROM can include updates to the master list that are loaded along with the media/data The CD-ROM and/or individual media/data can include a special code or identification that is keyed to the user's system's code. In this manner only the user's system can load the media/data on its hard drive. A docking mechanism can be provided to all or part of the system to allow media/data to be moved to different playback devices (i.e. hard drives, flash sticks, memory cards, microchips, etc.). In this manner the user can have a library of media/data to organize, playback, and record into a variety of portable and fixed base units, such as boats, airplanes, automobiles, commercial and residential applications.

One of the categories provided to selections can be ratings. Ratings are typically provided ahead of time by the service provider, but are user editable, and are appended to the overall database of categories. The user has, in the center, a facility for blocking out any media from being listed, searched, played or recorded that exceed a predetermined rating category. A password is used to control the block-out function. This password is initially entered by the user or is provided ahead of time by the service provider. It must be entered in order to control the block-out function.

The center can also be provided with an auto exit function. When an initial screen is called, the user can indicate how many minutes he or she wishes the center to playback media/data. When that number of minutes has elapsed, the center automatically shuts off.

It is contemplated that with appropriate data storage techniques and playback facilities, the center can organize, playback and record video and image data as well as music data.

In one embodiment of the invention, a user can import, categorize and organize media/data from audio compact discs or media/data resident on a storage device to a database. The organization of the media/data is according to user defined categories that are assigned manually or automatically at time of import or at a later time. The database and/or media/data can be resident on the center's hardware or located at a remote location.

In one embodiment, categories such as music speed, music style, and dance type are determined by scanning the song in real time and determining a beats per minute value of the song.

The alternate center also advantageously allows a user to substantially control all the function of the center from one screen.

BRIEF DESCRIPTION OF THE DRAWINGS

The foregoing and other objects and advantages of the invention will become more clear with reference to the following detailed description, as illustrated by the drawings in which:

FIG. 17 is a plan view of a fourth graphical user interface screen;

FIGS. 18 and 19 are perspective views of an exemplary media organizer and entertainment center according to an alternate embodiment of this invention utilizing a base is unit and docking principle;

FIG. 23 is a plan view of the graphical user interface screen of FIG. 12 detailing a favorite hits function;

FIG. 24 is a plan view of the fourth graphical user interface screen showing a display of the service provider's available library;

FIG. 26 is a plan view of the graphical user interface screen of FIG. 24 showing a password entry window for retrieving rated music;

FIGS. 50–52 are plan views of the screen of the Search and Play Main Interface Screen with various search screens superimposed thereon;

DETAILED DESCRIPTION OF AN ILLUSTRATIVE EMBODIMENT

Figure 1:
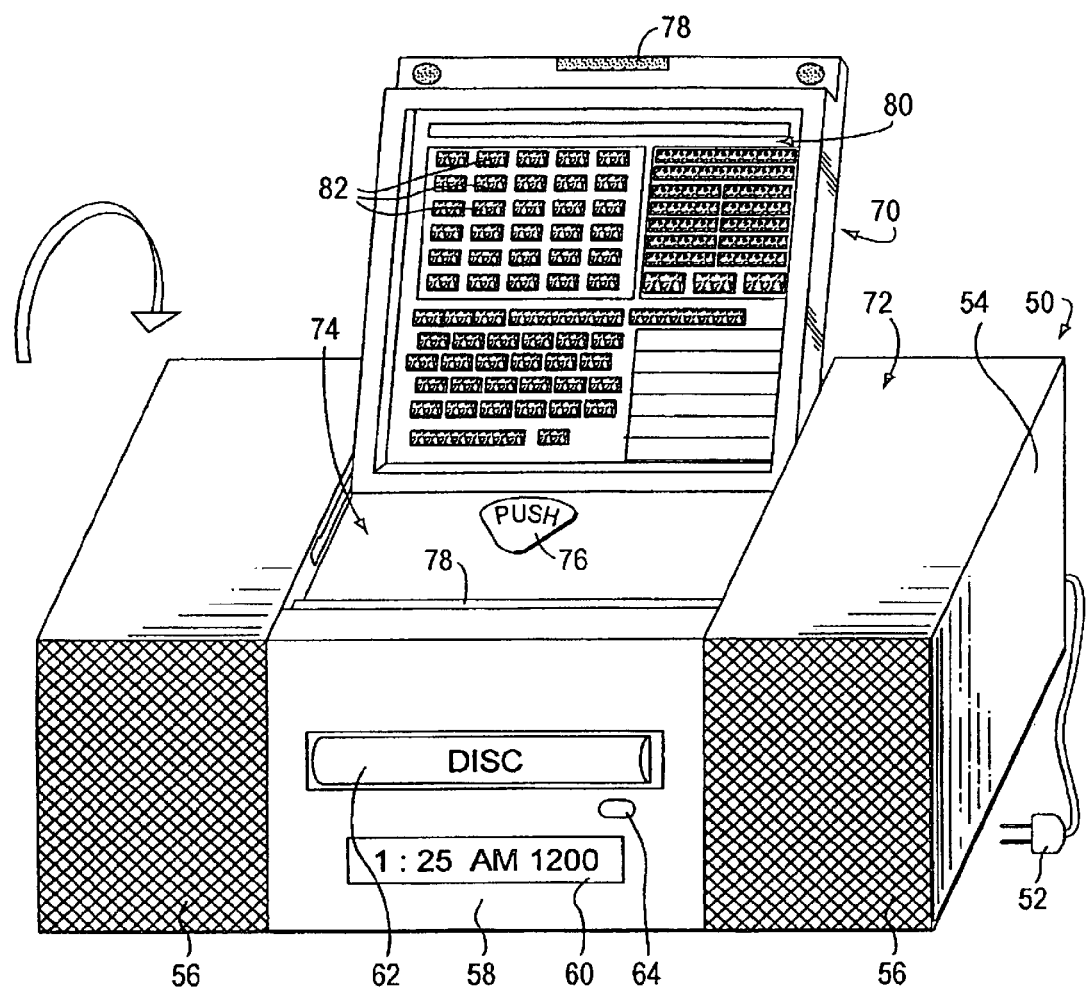
FIG. 1 is a perspective view of an exemplary media organizer and entertainment center according to an embodiment of this invention.

A generalized embodiment of a media organizer and entertainment center 50 is detailed in FIG. 1. For the purposes of this description the term "center" will be used to describe any of the media organizer and entertainment center systems described herein. Media includes music or songs, video, films, books, etc. Music or songs will be described in the embodiments, but it is understood other types of media could be used. The center 50 is a stand-alone unit powered by household current using a conventional power cord 52. According to a basic embodiment it can be a personal computer, as evidenced by the conventional components to be described below. Alternatively it can be a custom unit as also described below. The chassis 54 of the center includes at least two integral speakers 56 to provide stereo sound. A variety of horn-folding and acoustic enhancement techniques can be used to increase the performance of the speakers. Alternatively, separable speakers can be used, placed at remote locations in a room. The front panel 58 of the center can include a variety of knobs, switches and displays. In this embodiment, a basic LCD display 60 is shown and a retractable tray mechanism for receiving an optical data or music compact disc is also provided 62. This tray 62 is conventional according to this embodiment, extending outwardly and retracting inwardly based upon a switch 64. The transport mechanism and reading mechanism can be conventional. The center includes a flip-up type display 70 according to this embodiment. The display is located on the top 72 of the center and is retractable into a recess 74. A large button 76 is provided to support the display 70 in an upright position. This button can be spring-loaded. When it is pushed downwardly, it allows the display to be adjusted into different position. A latch mechanism 78 can be provided to the display 70 and to the recess 74. The latch mechanism allows the display to be locked into a close position, or, alternatively, released for deployment as shown. The display, itself, includes a screen 80 having any acceptable size, format and display technology. For example, a color active-matrix screen, such as that found in a laptop computer can be used. The pixel dimensions are generally comparable to those of a laptop computer display. The display itself includes a graphically user interface with a series of displayed graphical user interface "buttons" 82 that can be actuated using a touch-screen layer applied to the display 80. The touch-screen hardware and controller software are conventional and commercially available. Alternatively, a mouse or other cursor-moving mechanism, such as a track ball, can be provided to the chassis 54.

Figure 2:
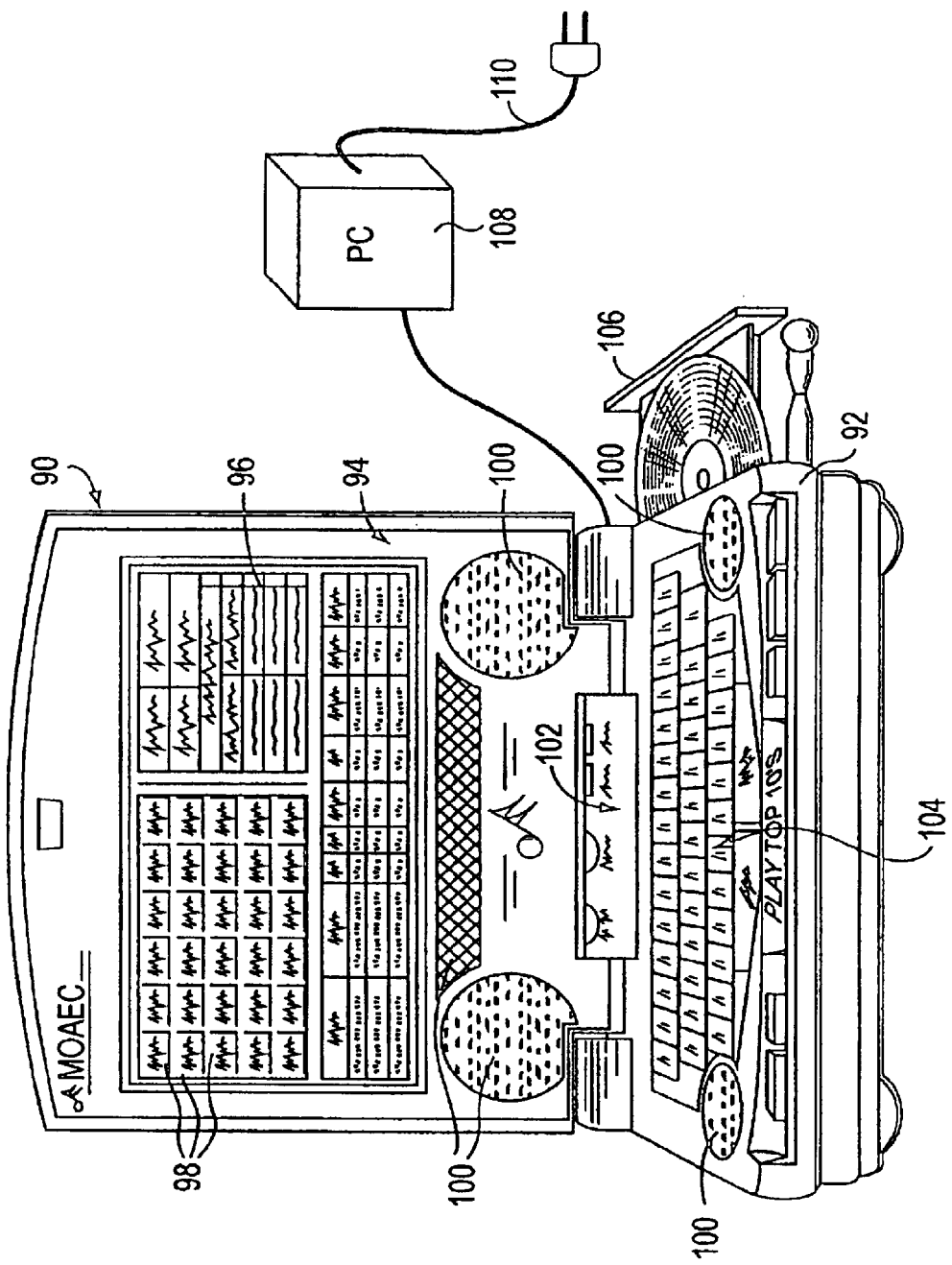
FIG. 2 is a perspective view of an exemplary media organizer and entertainment center designed for portability according to an alternate embodiment of this invention.

With reference to FIG. 2, an alternate embodiment of a center 90 is detailed. This center comprises a laptop arrangement having a base 92 and a foldable display section 94. This center can comprise, in essence, a modified laptop computer with all the basic components of a modem multimedia computer system. Certain personal computer components not specifically required for the purposes of this embodiment can be omitted. For example, a display 96 having buttons 98 as described above can be provided. A plurality of speakers 100 can also be provided representing base, midrange, tweeters, etc. Volume and screen display controls 102 can also be provided as well as a basic alphanumeric keyboard 104 of conventional design. A retracting compact disc tray and reader 106 can also be provided. An onboard battery (not shown) provides power while an AC/DC converter 108 recharges the unit based upon household current provided by a power cord 110. Note that automotive DC current can also be used.

Figure 3:
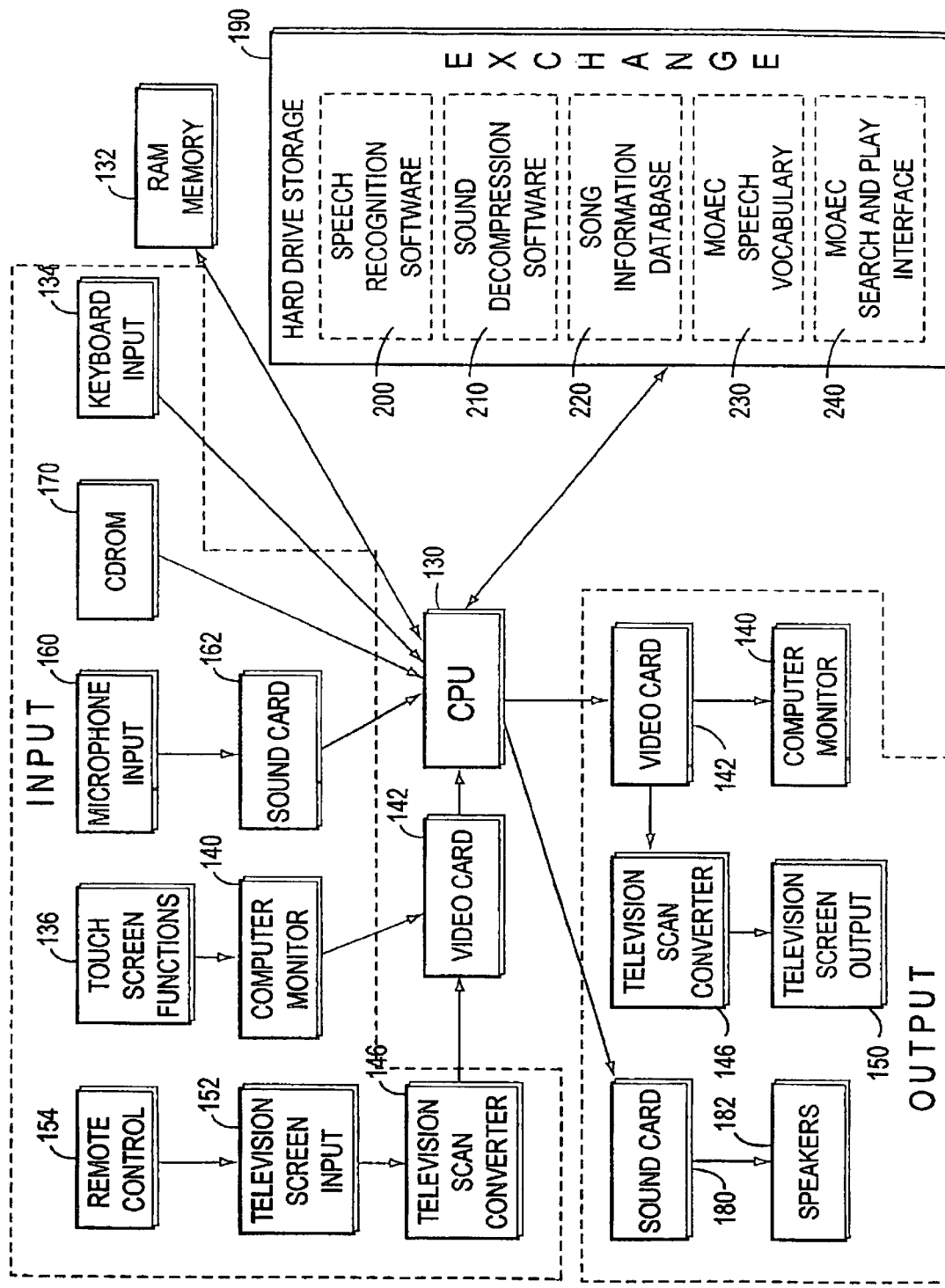
FIG. 3 is a schematic block diagram of the hardware architecture of an exemplary media organizer and entertainment center.

The generalized architecture of a center is further detailed in FIG. 3, complete with optional components. The "heart" of the center is its central processing unit or CPU 130. The CPU, in a preferred embodiment comprises a Pentium® II microprocessor having an operating speed of 266 MHz or greater available from Intel. The architecture of this microprocessor is well-known. It is adapted to accept inputs from a variety of hardware components. These hardware components are, themselves, commercially available and can be interfaced with the CPU 130 by those of ordinary skill. In summary, the components involved in a complete center will now be described.

A random access memory (RAM) 132 is provided to support the CPU 130. This RAM typically provides twenty megabytes of storage or greater. A keyboard and/or cursor-moving mouse interface is also provided. The keyboard 134 can be omitted in certain embodiments where a touch-screen is used for all onboard functions. For example, the touch-screen, shown as a touch-screen interface 136, and used in conjunction with the monitor screen 140, can include a touch-keyboard thereon for entering alphanumeric characters. Where a monitor 140 is used, a video driver card 142 of conventional design is provided. A conventional television can also be utilized. Where a television screen is used for displaying data, a scan converter 146 can be provided. The scan converter 146 can be used for output 150 to the television screen and/or input 152 from, for example, a television remote control 154. In this manner both input and output via a television and/or computer monitor can be accomplished. A microphone 160 and appropriate voice recognition card 162 can also be provided in conjunction with the CPU. Additionally, a CD-ROM, with appropriate driver card 170 can also be provided. For output, a sound card, available from a variety of commercial sources such as the Soundblaster® driver 180 can be employed and appropriate amplifiers and speakers 182 can be provided. The amplifiers and speakers are conventional and receive inputs from the sound card in the form, typically, of analog audio signals.

Input/output exchange of data is provided through a hard drive storage 190, also of conventional design. As will be described further below, the hard drive storage interacts with the CPU 130 using onboard software. This software includes a speech recognition software block 200 a sound decompression software block 210, a sound information database 220 the center's proprietary speech vocabulary 230 and the center's search and play interface 240.

A significant feature of the center, to be described in greater detail below, is the organization of media/data, such as individual songs or selections, according to specific categories, that are determined ahead of time, on a partially subjective basis, by the service provider. These categories are carried in a database, along with the raw digital music data, and allow the user to playback each of the individual selections based upon specific categories in a random or ordered manner. The use of categories for storage and playback empowers the user in an entirely new way. Songs can be chosen based upon a specific desire or mood that relates to categories such as music age, energy, speed, style, dance, or rating. Experienced listeners can enjoy new convenience in music playback. Newer listeners typically find their use of the center to be highly educational, as they quickly learn to associate certain types of categories with specific selections, artists and songs, and can enjoy the benefit of a full display of the song data via the center's screen.

With reference to the above-described architecture, the procedure by which individual songs become categorized and eventually made available for a user to playback according to particular categories will be described in summary:

1. Musical source material is first purchased or otherwise acquired by the service provider that services the music organizer and entertainment center of this invention. This music is typically obtained in standard Red Book compact disc format on individual music albums and singles.

2. A standard compact disc player, DAT or other audio playback medium is used by the service provider in conjunction with a main computer having a large database. A hard drive rated at five gigabytes or larger is used in conjunction with the database.

3. Music is played by the playback device into a data compression card commercially available from, for example, Dialog Four™. This data compression card compresses the music into the commercially available MPEG3 format A CPU, similar to that shown in FIG. 3 stores the music in the hard drive of the service provider in compressed form. Individual songs are each given their own file identifier for later processing.

4. Compressed music is subsequently catalogued using a conventional database program such as Microsoft Access® 2.0 in this embodiment. The following categories, among others can be used in conjunction with the database program to catalog each individual musical selection-song title, artist, date, main music category, sub-main music category, special music category, sub-music category, music style, dance type, music speed and a subjective music "energy level" determined by the service provider. These categories are used subsequently by the center's operating system as described below. All categories are stored in the service provider's hard drive for subsequent retrieval.

5. A master list of available music, in the form of individual selections or songs, is complied by the service provider. Individual customers or subscribers are solicited to select songs or groups of songs or selections from a service provider. According to a preferred embodiment, the selected songs are copied from the service provider hard drive to a writable data compact disc in MPEG3 compressed format. The center operating system software and Access® 2.0 database program available from Microsoft, Inc. of Redmond, Wash. can also be loaded unto this compact disc when the playback device does not already contain these software packages.

The package of data compressed songs and other software if applicable, is tagged with a distinct serial number or other identifier and/or format that matches a pre-loaded serial number or format in the subscriber's particular center. This serial number or format has been pre-loaded in the center from software made available by the service provider. For example, a commercially private or public key encryption algorithm can be provided to the subscriber. The data in the compact disc includes an appropriate encryption key that matches one already present in the center. Compressed data can be decrypted and "unlock" based upon a match between the key provided by the service provider and the key provided by the center. In any case, a technique for locking information so that only a desired center can read the information and, hence, play the songs, is provided. This prevents copyright infringement and unauthorized playback of songs by other units that have not paid appropriate license fees for receiving the music.

6. As noted above, a formatted, data-compressed disc is provided to the subscriber via a physical transfer of the disc. In other words, the disc is mailed or otherwise delivered to the subscriber. It should be noted that, while an optical disc is the preferred form of data transfer according to an embodiment of this invention, another form of storage media such as tape, hard drives, flash sticks, microchips, memory cards, circuit chips, removable hard drive, or any other acceptable high-volume data storage can be used to transfer song data. Likewise, the formatted compressed data can be transferred via a radio, satellite or telephone network link, naturally including various file transfer techniques using the well-known Internet, assuming that appropriately wide bandwidths is available to enable the transfer to occur in a sufficiently short period of time. All these techniques of transferring formatted, compressed, customized song data are expressly contemplated according to this invention. It is desired primarily that the data include various categories as described above with reference to step 4.

When the subscriber receives the customized song data on the disc or other medium, the customer installs the disc in his or her center by following conventional installation and instructions provided with the disc. As noted, the center either includes well known CD-ROM installer routines, such as those found in popular Windows® operating system available from Microsoft or, alternatively, specialized installation software is included with the disc transferred from the service provider. All data on the disc is typically transferred into the high-volume hard drive or other storage media provided with the center. The song data, therefore, resides in the center formatted in the Access® 2.0 database as described above. The categories appended to each song as part of the database program also reside in the center's hard drive at this time.

7. The center's software loads data related to individual song selections and categories into appropriate database locations.

8. The center polls data in the downloaded disc to determine whether the appropriate identification code and/or serial number, matching that of the center is present. If not, then the downloading process in terminated, and the user is advised to contact the service provider.

9. If downloading of song data is completed successfully, then the data becomes resident on the center's disc drive or other high-volume random access memory storage unit. New songs are appended to a list that contains any previous songs. This information is displayed in a manner to be described further below.

10. The CD-ROM is subsequently removed from the center and stored for backup purposes. At this time, the user can select various songs downloaded in the previous steps using various graphical user interface and/or voice commands to be described further below.

11. Upon playback, song data is decompressed from its stored format using MPEG3 data compression. The decompressed song data is then played in a standard "wave" format using, for example, Winplay 3® available from Microsoft, or another data-to-sound software procedure. It is contemplated that the software procedure be compatible with an appropriate sound card, as described above. Speakers and an amplifier are used to deliver music to the user, as also described above.

Reference will now be made to the flow diagrams illustrated in FIGS. 4–10, and corresponding graphical user interface display screen illustrations will also be referenced. These display screens are shown in FIGS. 11–17.

Figure 4:
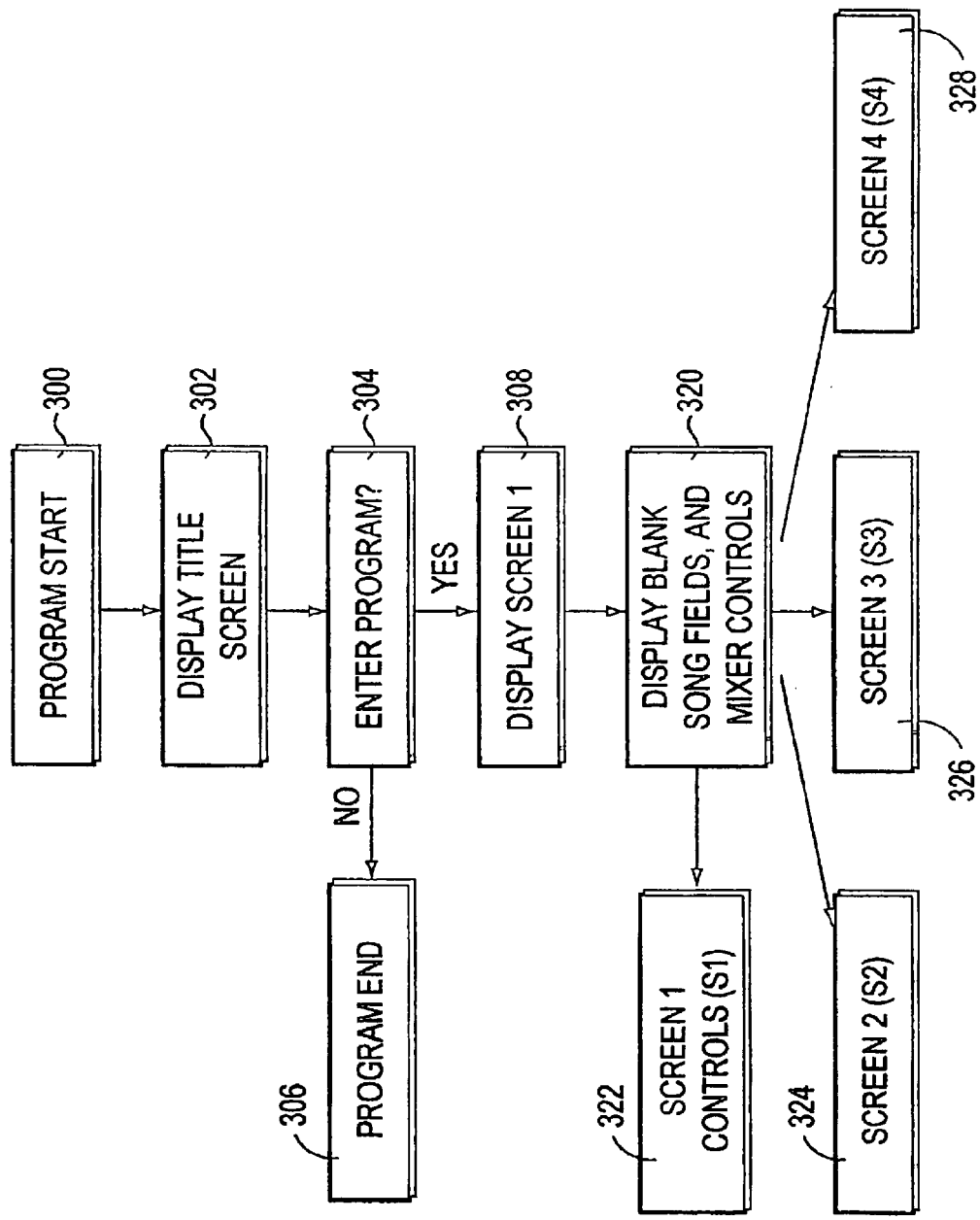
FIG. 4 is a schematic flow diagram illustrating a basic control data path for the media organizer and entertainment center of this invention.

Referring first to FIG. 4, the user initializes the program in a program start step 300. A title screen, not shown, is displayed 302. Any acceptable title screen can be used. The title screen prompts the user to enter the program in step 304. If the user does not desire to enter the program, it ends in step 306. If the user enters the program, then Screen1 is entered in step 308. Screen 1 is shown in the display 310 in FIG. 11. Note that the various screens, entitled Screen1, Screen2, Screen3 and Screen4 are denoted respectively by buttons S1 (312), S2 (314), S3 (316) and S4 (318). These buttons appear on the bottom of all display screens used herein so that a user can quickly select between different control screens. The blank control fields are displayed in step 320. Based upon these fields, a user selects between Screen1 controls in step 322, Screen2 controls in step 324, Screen3 controls in step 326 and Screen4 controls in step 328.

Note that the Screen2 display 330 is shown in FIGS. 12, 13, 14 and 15. Likewise, Screen3 displays 332 are shown in FIG. 16 and Screen4 displays 336 are shown in FIG. 17. These screen displays will be described further below.

Figure 11:
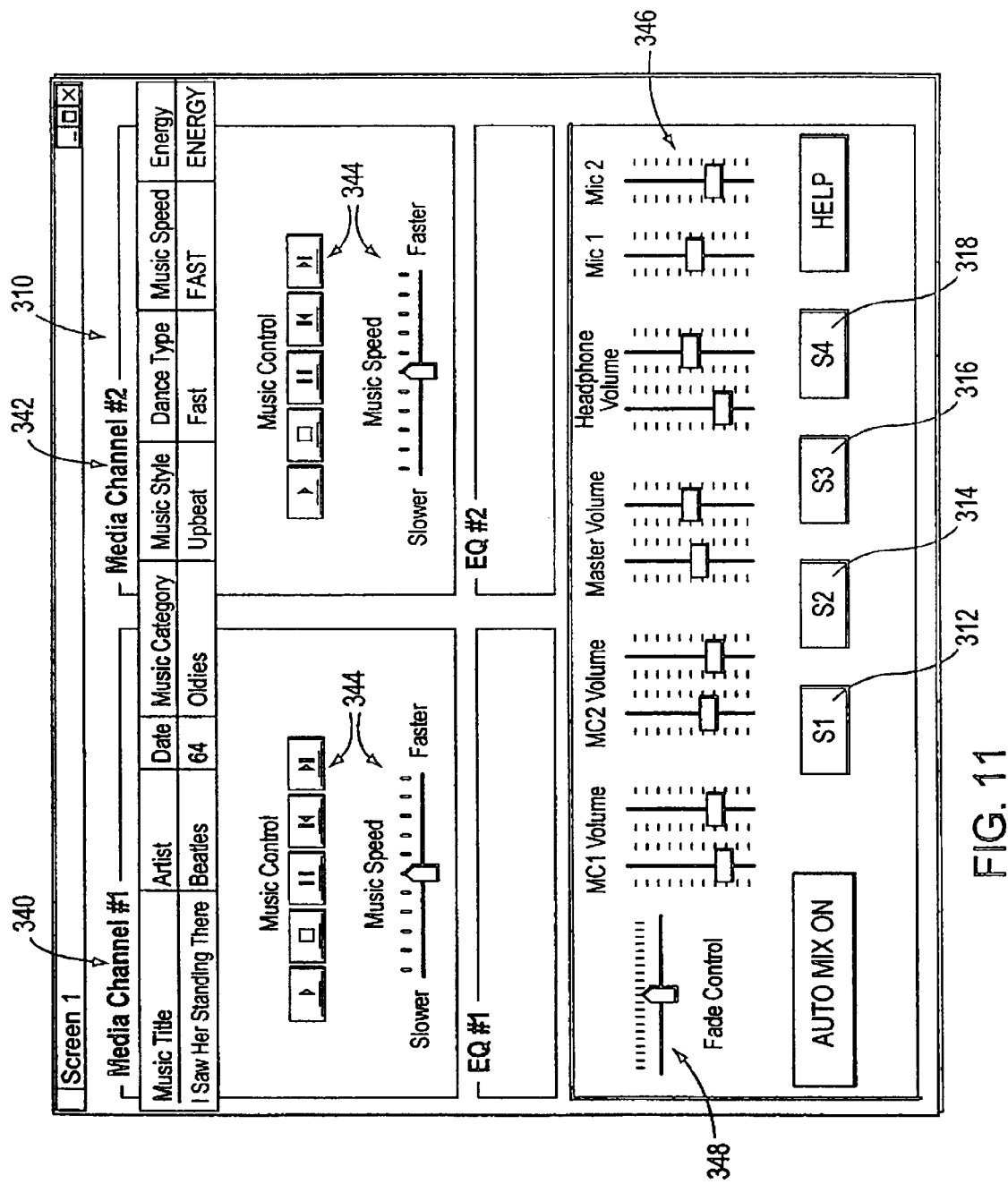
FIG. 11 is a plan view of a first graphical user interface screen.

With reference to Screen1, as shown in FIG. 11, various media channels for playing back music can be established. In this example, Channel1 340 and Channel2 342 are provided. Each channel includes an individual set of speed and playback buttons 344 having conventional control symbols allowing, for example, play, stop, pause, forward and reverse. Additional controls 346 can also be provided for the channels and can be used, for example, for specialized functions such as mixing of songs and overriding of songs using, for example, external microphone inputs. Note that, in particular, a fade control 348 is provided.

Figure 5:
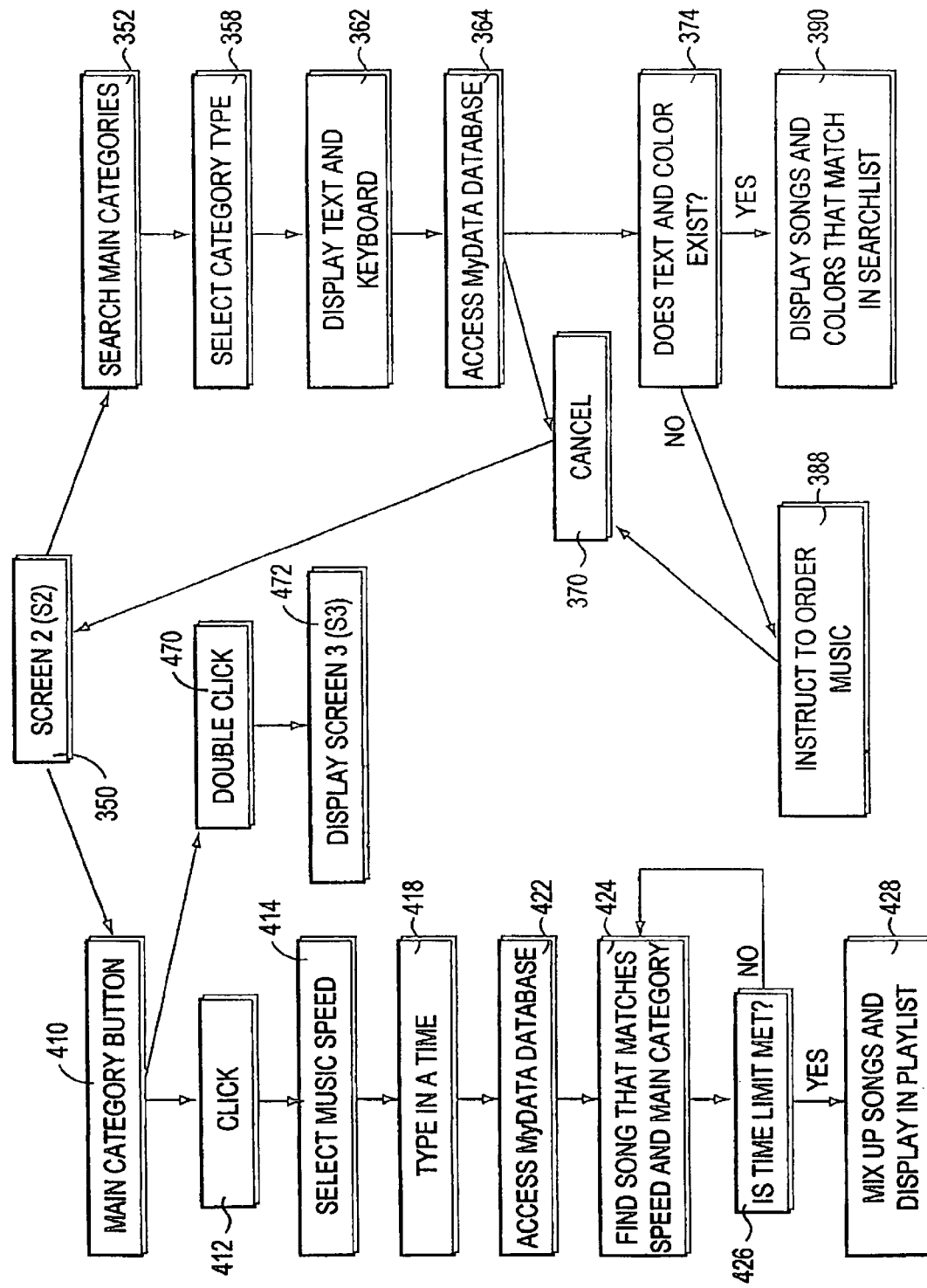
FIG. 5 is a schematic flow diagram illustrating the use of a graphical user interface screen selected according to the flow diagram of FIG. 4.
Figure 12:
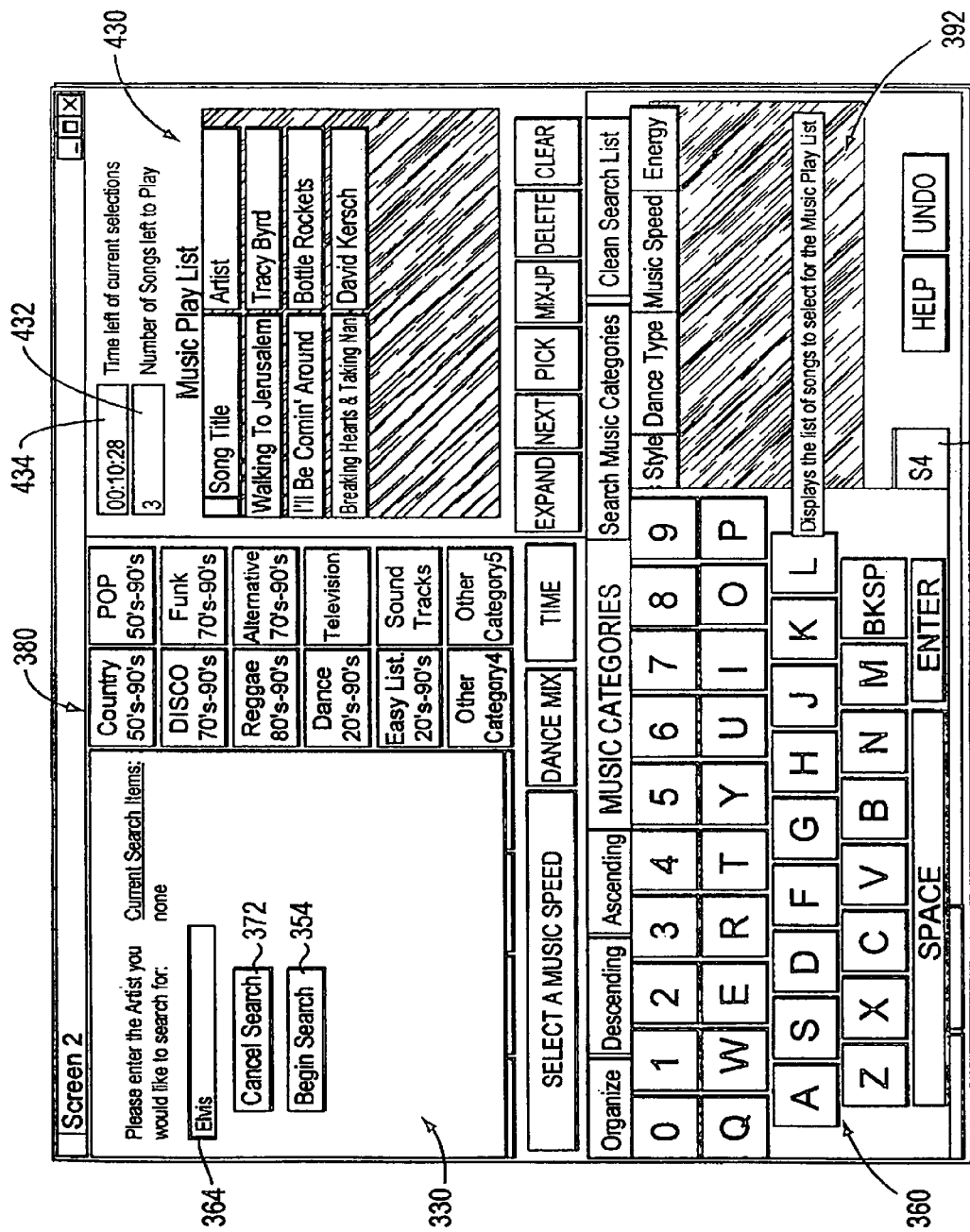
FIG. 12 is a plan view of a second graphical user interface screen.

FIG. 5 details user operations utilizing Screen2 after branching from step 350. Screen 2 is shown generally in FIG. 12, as noted above. By branching to the searching step 352, a user can search the main categories of music recognized by the system. The Begin Search button 354 (FIG. 12) controls the searching of main categories. As noted, a variety of categories such as artists, as shown in FIG. 12, can be searched. The selection of an appropriate category is noted in block 358. Various text can be entered using a keyboard 360 (FIG. 12) according to the block 362. The particular element being searched as shown in the window 364 causes the system program to access a main song database entitled MyData in block 364. The request can be canceled in block 370, which causes a branching back to the initial screen block 350. The button 372 enables cancellation.

Figure 13:
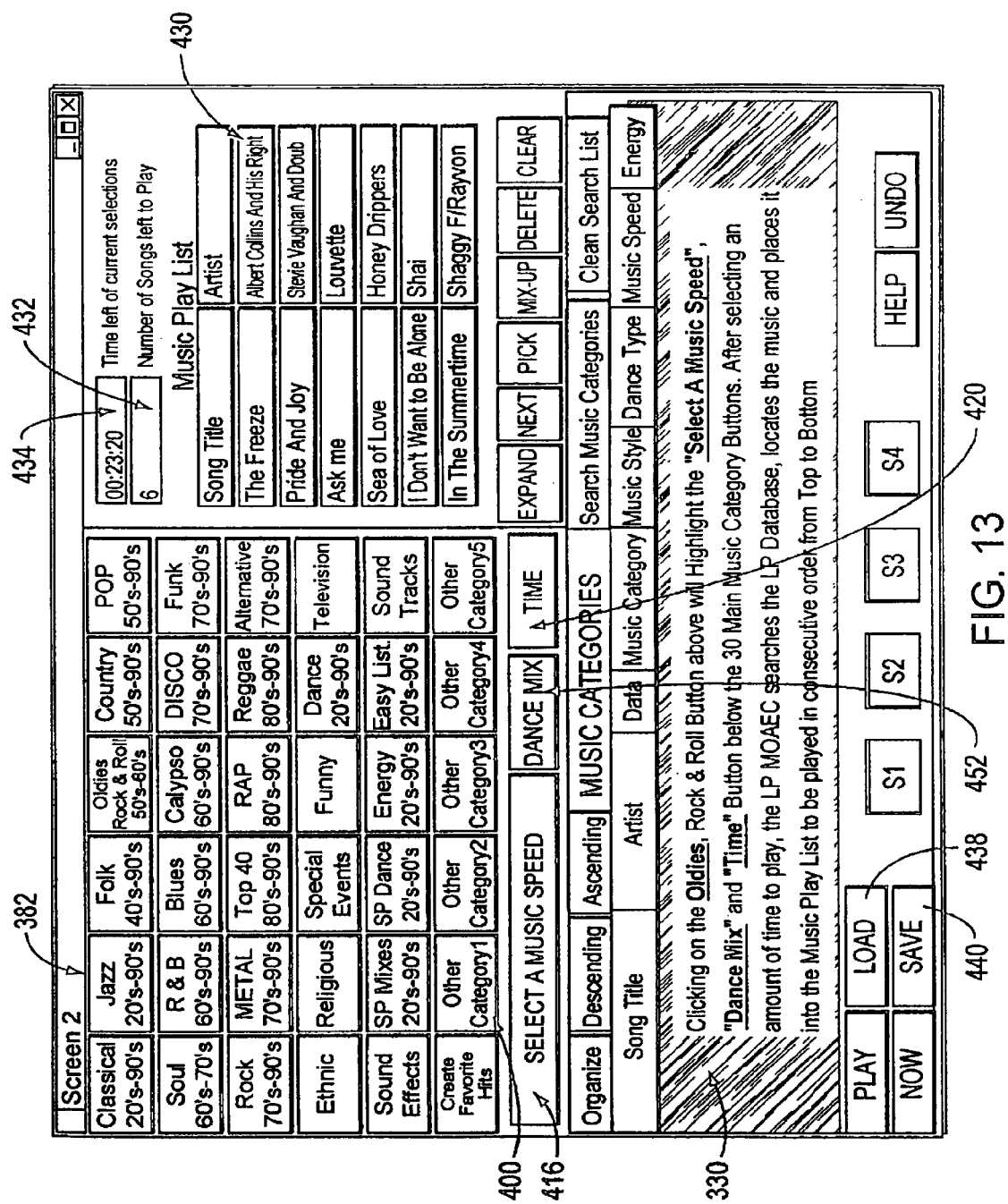
FIG. 13 is a more-detailed plan view of the second graphical user interface screen of FIG. 12.

If no cancellation occurs, then block 374 determines whether the requested category and text within the category exists. In addition, categories and information can be characterized according to a variety of colors, as displayed in the partial window of categories 380 and the more complete window, as shown in FIG. 13 as window 382. If the particular category and/or text does not exists, then block 388 notes its absence and suggests ordering the desired music. This block then branches to the cancellation block 370. Conversely, if the particular categories and/or text exists, then the appropriately organized songs are displayed according to block 390 in the window 392.

Screen2 acts generally, as a main control screen for searching and playing any selections within the center. The illustrated window 382 in FIG. 13 shows some of the possible categories that can be organized by the service provider and cross-referenced within the database with respect to each individual selection. "Other category" buttons 400 are provided for future expansion. If one of the main category buttons in the window 382 is selected, as shown in block 410, then the routine determines whether a single or double "click" of the user interface has occurred. If a single click occurs as shown in block 412, then the system prompts the user to select a music "speed" in block 414 according to Screen button 416. The user is then prompted to input an appropriate time duration within which music will be played in block 418 based upon button 420. Given these parameters, the system accesses the database in step 422 to determine music matching the selected criteria for time and category. Songs are entered in a play list according to the categories based upon blocks 424, 426 and 428. In particular, according to block 428, the songs can be randomized after the time and category criteria have been met to provide a "disc-jockey" type playback, which is somewhat arbitrary. The play list for the given time is detailed in window 430. The number of songs in the play list currently remaining as shown in window 432 and the time remaining is shown in window 434. Time values are based upon pre-entered time values provided by the service provider in the original database. Like other criteria, time of a song can be determined as an individual criteria Conversely, the time of song can be measured based upon the size of the data file and upon other criteria well known to those of ordinary skill.

At any time, a portion of the current search list 451 is displayed, showing the various depicted categories such as title, artist, publication date, music category music style, dance type, music speed and energy in row-and-column form. The search list represents the selections located by pressing one or more category buttons. Songs from the search list can be appended to the end of the play list 430 by, for example clicking on their entry in the search list 451.

Figure 14:
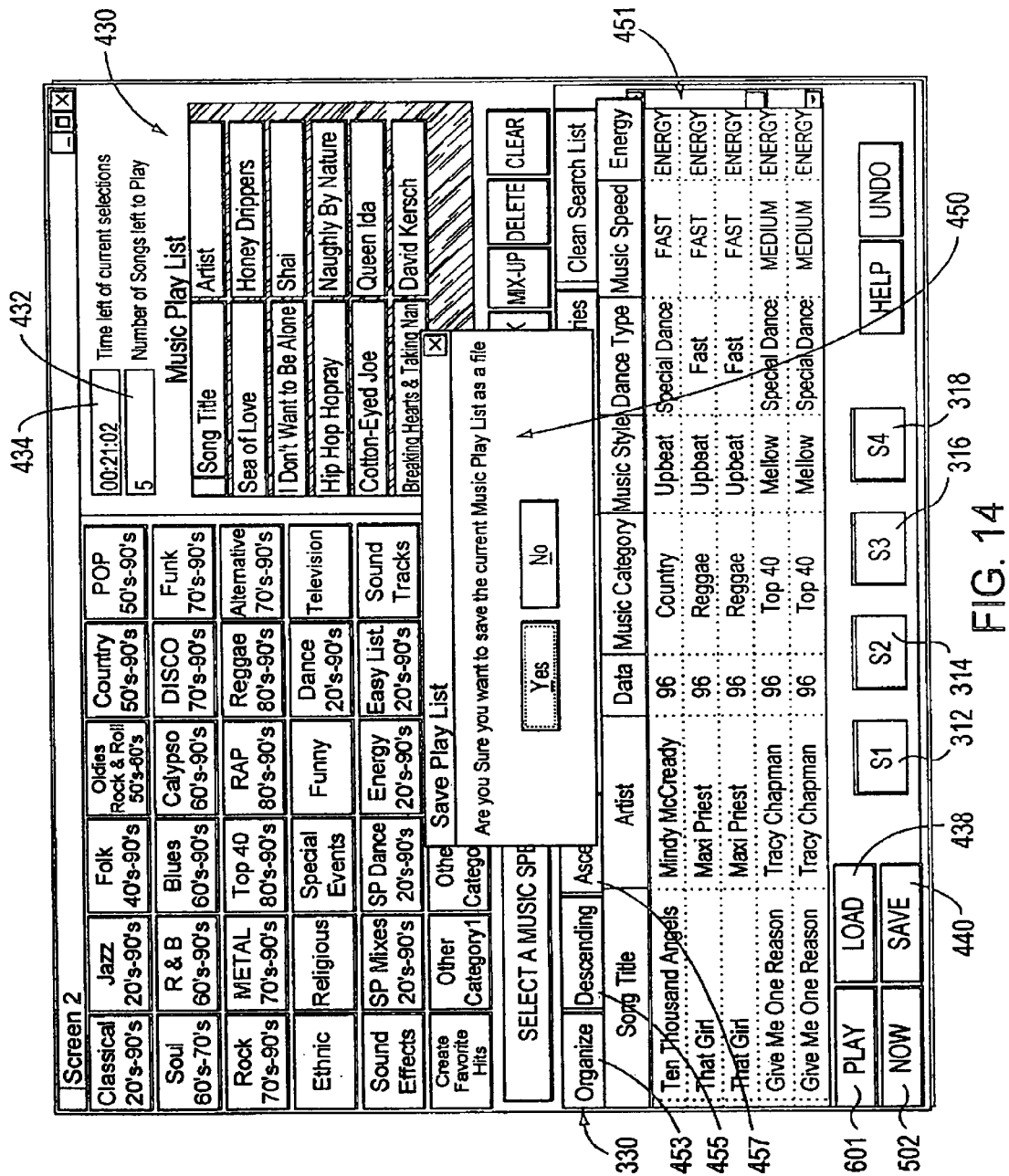
FIG. 14 is a more-detailed plan view showing the saving of music play list selections using the graphical user interface screen of FIG. 12.

Once a selected play list is created, the user has the option to load and/or save the play list using respective buttons 438 and 440. If the save button 440 is pressed, then a confirmation window 450 is displayed as shown in FIG. 14. This particular play list is assigned a name and can be replayed at any give time by calling up the particular play list from a menu.

A set of buttons of particular interest are used to organize the search list 451 so that the song titles therein are displayed in a desired manner. The Organize button 453 allows displays to be refined. In particular, by pressing either ascending or descending buttons 455 and 457, respectively, the search results can be displayed in corresponding order.

Another button of interest as detailed in FIG. 13 is the Dance Mix button 452. This button is a default selection button that selects and searches for dance music having a particular speed. In a preferred embodiment, this function specifically selects, at random from the MyData database, three dance category songs with a fast speed category followed by two dance category songs having a slow speed category. These songs, the order three fast and then two slow are placed in the music play list for playback at the earliest available time.

Figure 15:
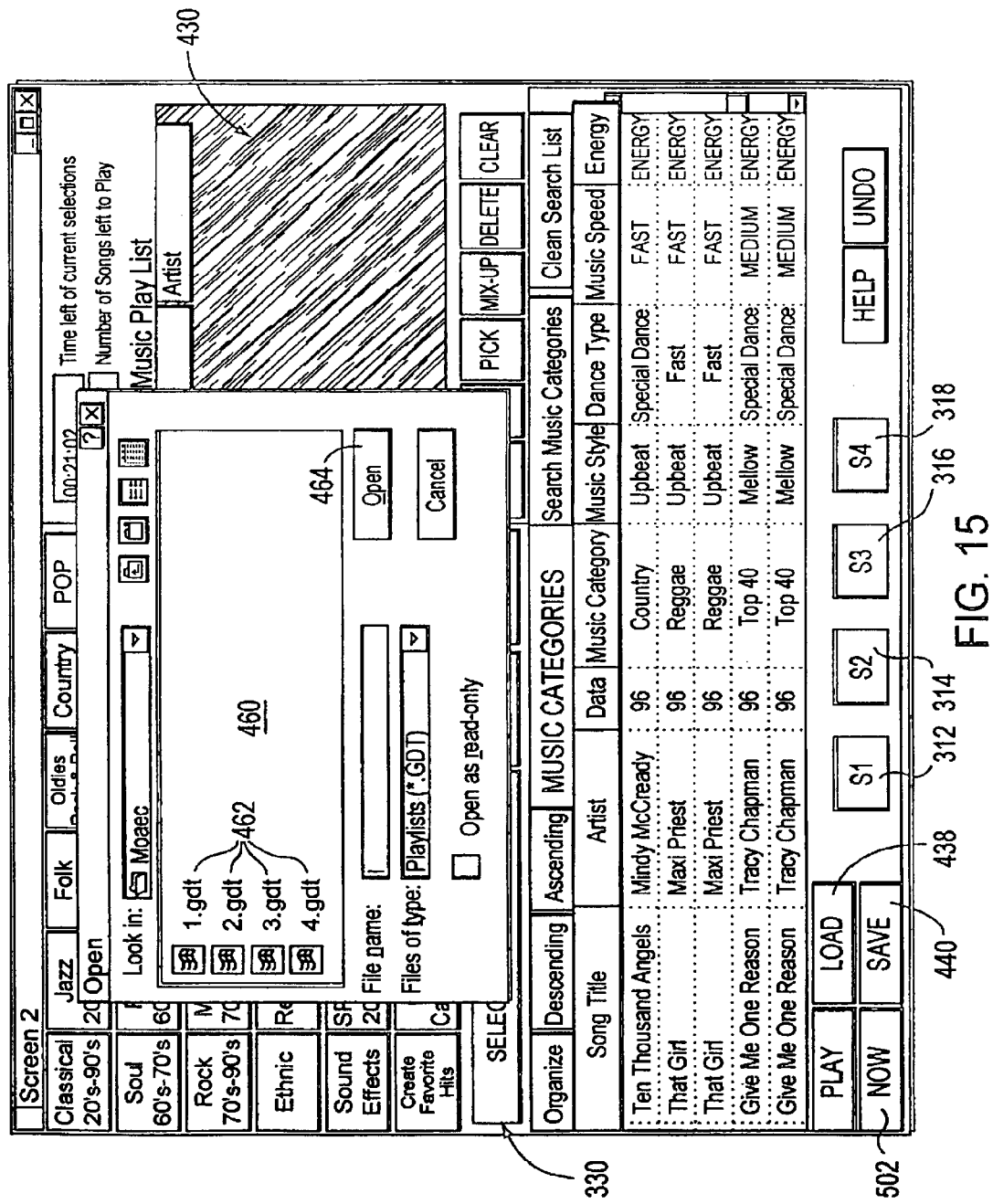
FIG. 15 is a more-detailed plan showing the loading of a music play list using the graphical user interface screen of FIG. 12.
Figure 16:
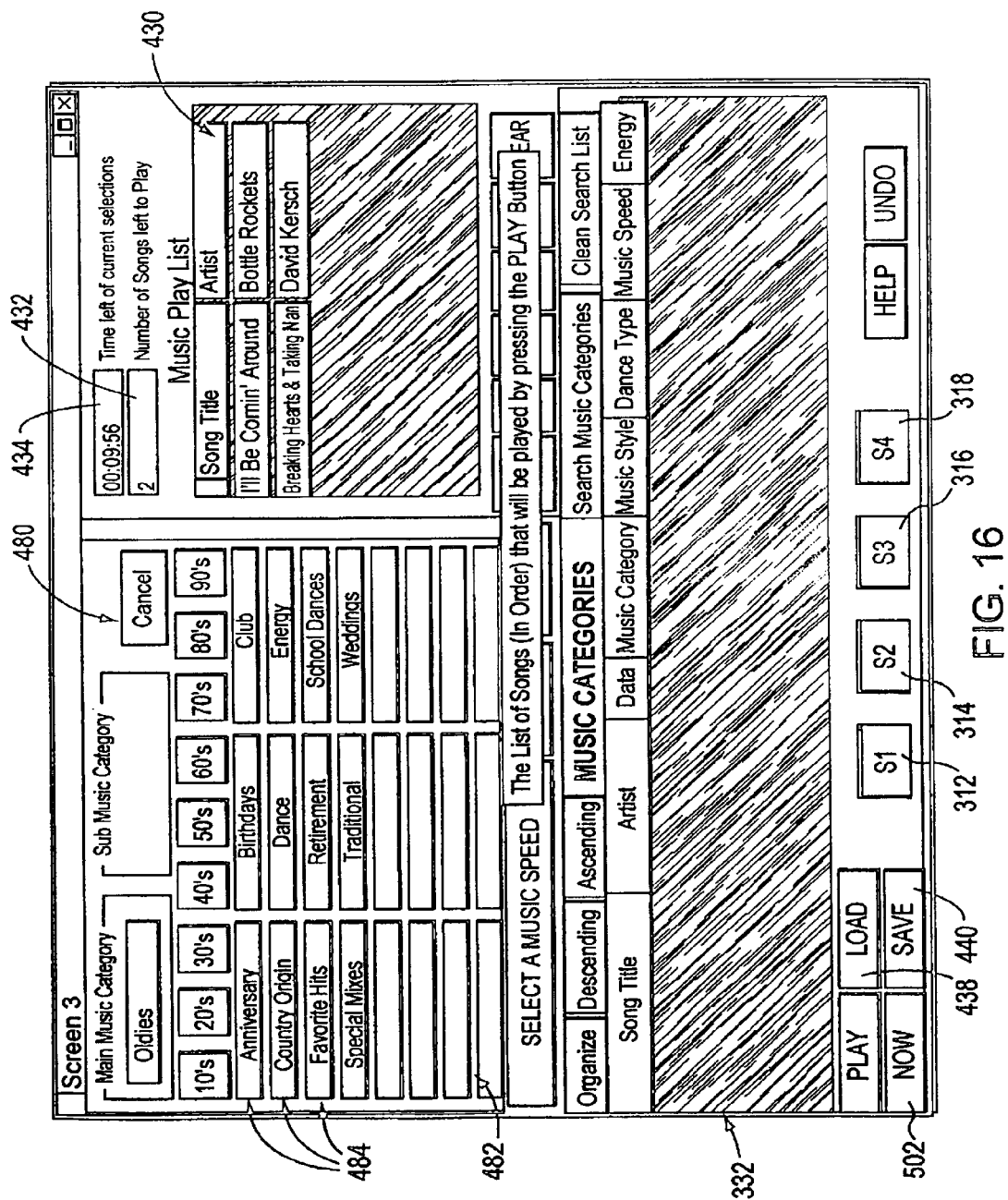
FIG. 16 is a plan view of a third graphical user interface screen.

FIG. 15 shows a file listing window 460 having a four separate play list files 462 that can be selected. The selected play list file 462 can be transferred to the main music play list window 430 by pressing the open button 464 within the window 460.

Before discussing the system procedure further, it is noted that pressing the Category button as detailed in step 410 (FIG. 5) twice (e.g., "double click") as shown in block 470, causes the particular Category button to display Screen3 480 (FIG. 16). The display of Screen3 is detailed in block 472. Screen 3 provides a window 482 with sub-categories that fall under a particular music category. The sub-categories are listed as individual buttons 484. These categories can comprise a variety of parameters such as time frame, special occasions, type of music, etc. In addition, the basic categories such as speed or "energy" can be included as sub-categories under a particular category.

Figure 6:
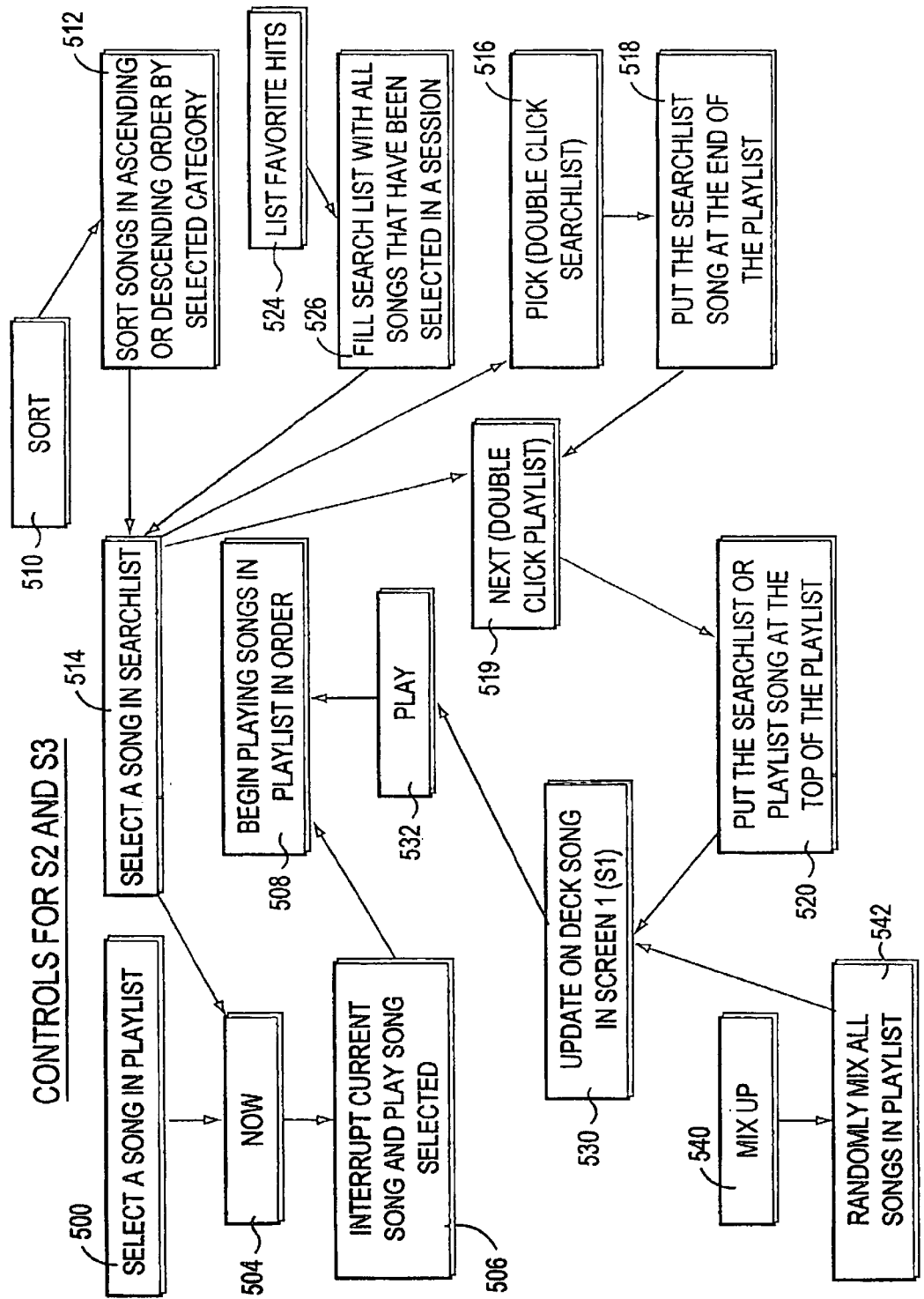
FIG. 6 is a schematic flow diagram showing the selection of a graphical user interface screen selected according to the flow diagram of FIG. 4.
Figure 7:
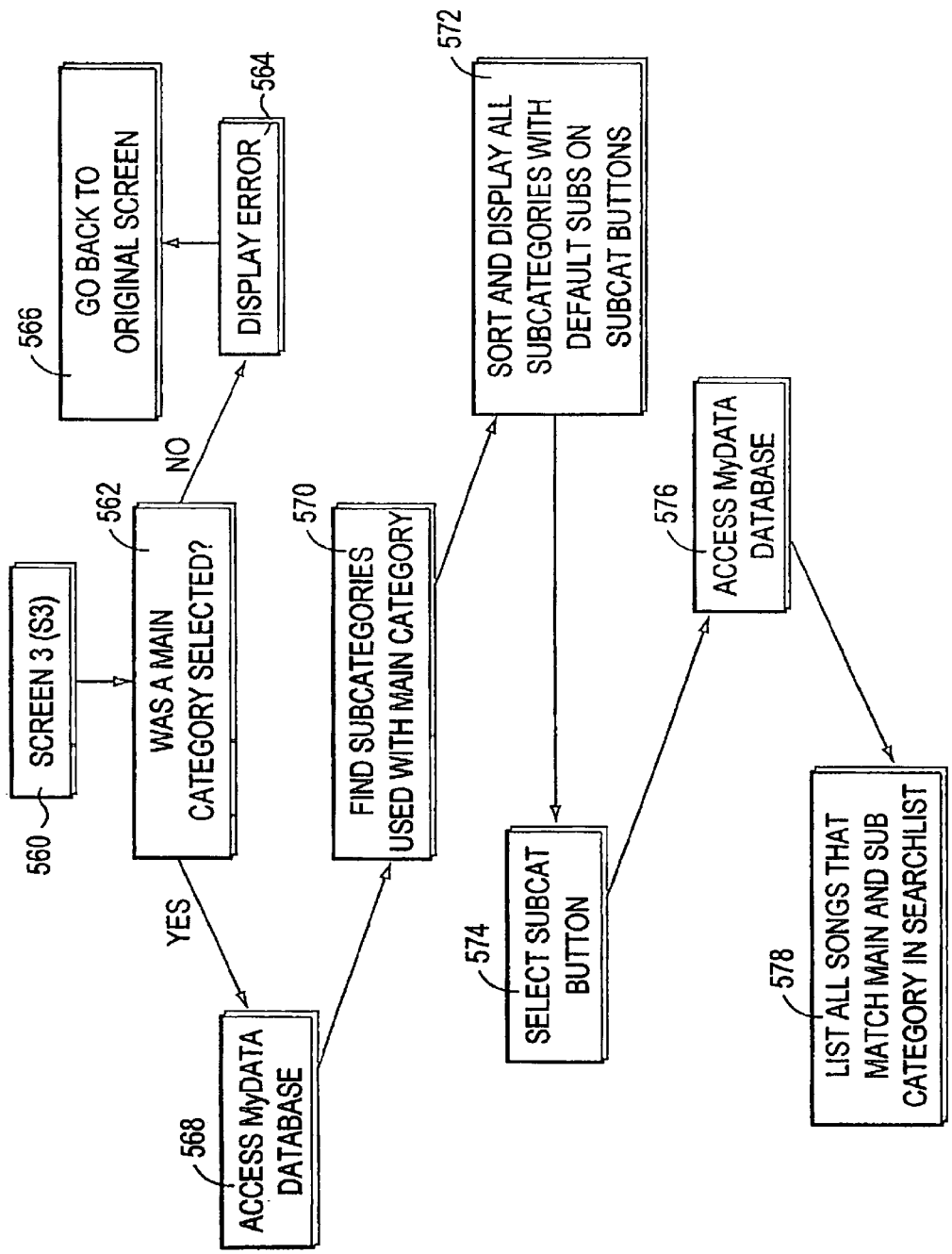
FIG. 7 is a schematic flow diagram showing the selection of a graphical user interface screen selected according to the flow diagram of FIG. 4.

Further reference is made to FIG. 6. The controls for screens 2 and 3 will be described first, in further detail. When a particular song in a play list is selected by, for example, highlighting a song with the cursor as detailed in block 500, the song can be played immediately by pushing the Now button 502 as detailed generally in block 504. Any current song being played is interrupted in block 506 and the selected song is played instead. Subsequently, the play list begins playing songs in the prior order in block 508. Conversely, if the sort command is given in block 510, then songs are sorted in ascending or descending order according to a selected category in block 512. A song in the search list is selected in block 514. The song selected can be played according to the Now block 504. Alternatively, the pick block 516 can be used to put the searched song at the end of a given play list as shown in block 518. If the play list song is "clicked" twice as shown in block 519 then the search list song selected is placed to the top of the play list in block 520. In addition, a listing of favorite hits/selections can be requested by the user in block 524. This causes the search list to be filled that have been pre-selected in block 526 and a song from the search list is selected in block 514. Block 514 then branches to the now block 504 and continues as described.

Referring again to block 520, if a song is placed at the top of the play list the song is updated in Screen1 in block 530. The song is then played based upon the play block 532. If the mix up command is entered by the user in block 540, then songs in the play list are randomly mixed in block 542 and Screen1 is updated in block 530. As described above, the play command 532 causes songs to be played in the play list order selected in block 508.

The selection of Screen3, shown in block 560, then the system determines whether a main category was selected in block 562. If not, then an error message is displayed in block 564 and the original screen is re-displayed in block 566. If a main category is selected in block 562, then the system accesses the MyData database of songs and categories in block 568. Any appropriate sub-categories are listed based upon that particular main category in block 570. Sub-categories are sorted and displayed on appropriate default sub-category buttons 572 shown in the window 482 in FIG. 16. The user can select appropriate sub-category buttons by "clicking" on them as shown in block 574. The MyData database is accessed in block 576 based upon the selected sub-categories and all songs that match the main and sub-category selections are listed in block 578. This listing is shown in the search window 332. Note that the search window 332 displays various category information such as title, artist, date, music category, music style, dance type, music speed and energy. Of course, this can also be included as desired by the service provider who originally formats such categories. In addition, custom category information can be included based upon the user's desires.

Figure 8:
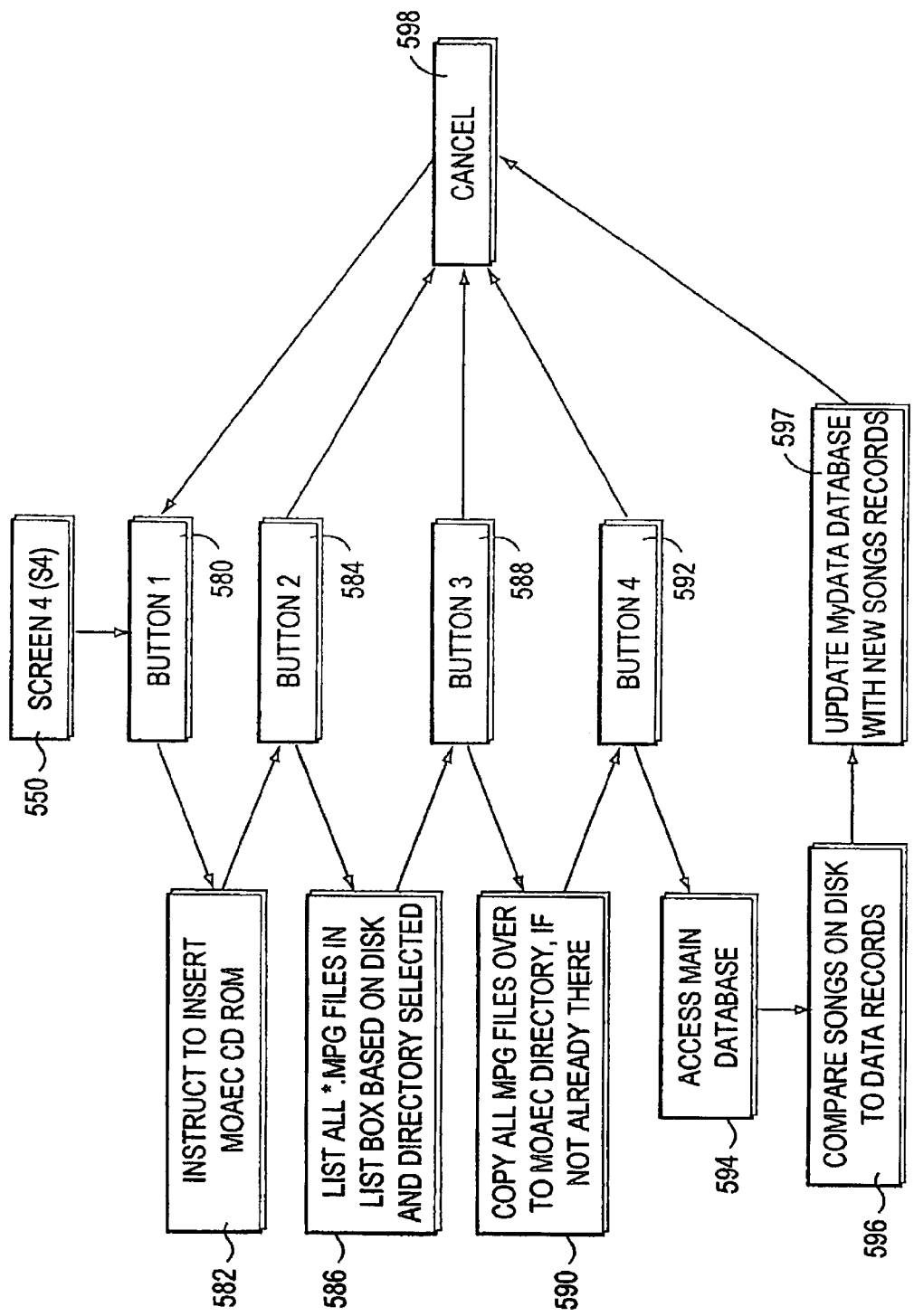
FIG. 8 is a schematic flow diagram of a graphical user interface screen selected according to the flow diagram of FIG. 4.

FIG. 8 relates to the selection of Screen4 as shown in block 550. Screen 4 is also illustrated generally as the display 336 in FIG. 17. The display is organized to display all songs within the user's library and the broader service provider's library. The display 336 includes columns showing data test status 552, song identification number 554, disc number (e.g., the disc on the service provider on which the song resides 556) the catalog song number 558, the title 590, the artist 592, the music style 594, the dance type, if any, 596, the speed 598, the time in seconds 570, the energy level, if any, 572 and any other appropriate category.

The entire library of the service provider can be provided in this format to the users, so that the user can select the songs that it wishes to order at later times. A series of buttons can be provided within Screen4. The first button, Button1, shown in block 580 instructs the user to insert an appropriate CD-ROM containing music and category data in block 582. The user is then prompted to use Button2, shown in block 584. This button lists all compressed data files based on the particular disc and directory selected in block 586. The user is then prompted by Button3 in block 588. Activating this button causes the copying of all compressed files from the disc over to the directory if these files are not already present in block 560. The user is then prompted by Button4 in block 562. Activating this button accesses the main database in block 564. Songs on the CD-ROM are compared to the data records within the center in block 566. The MyData database is updated with new songs in block 567. At any time, the canceled button can be pressed as shown in block 598, which returns to the Button1 prompt of block 580.

Figure 9:
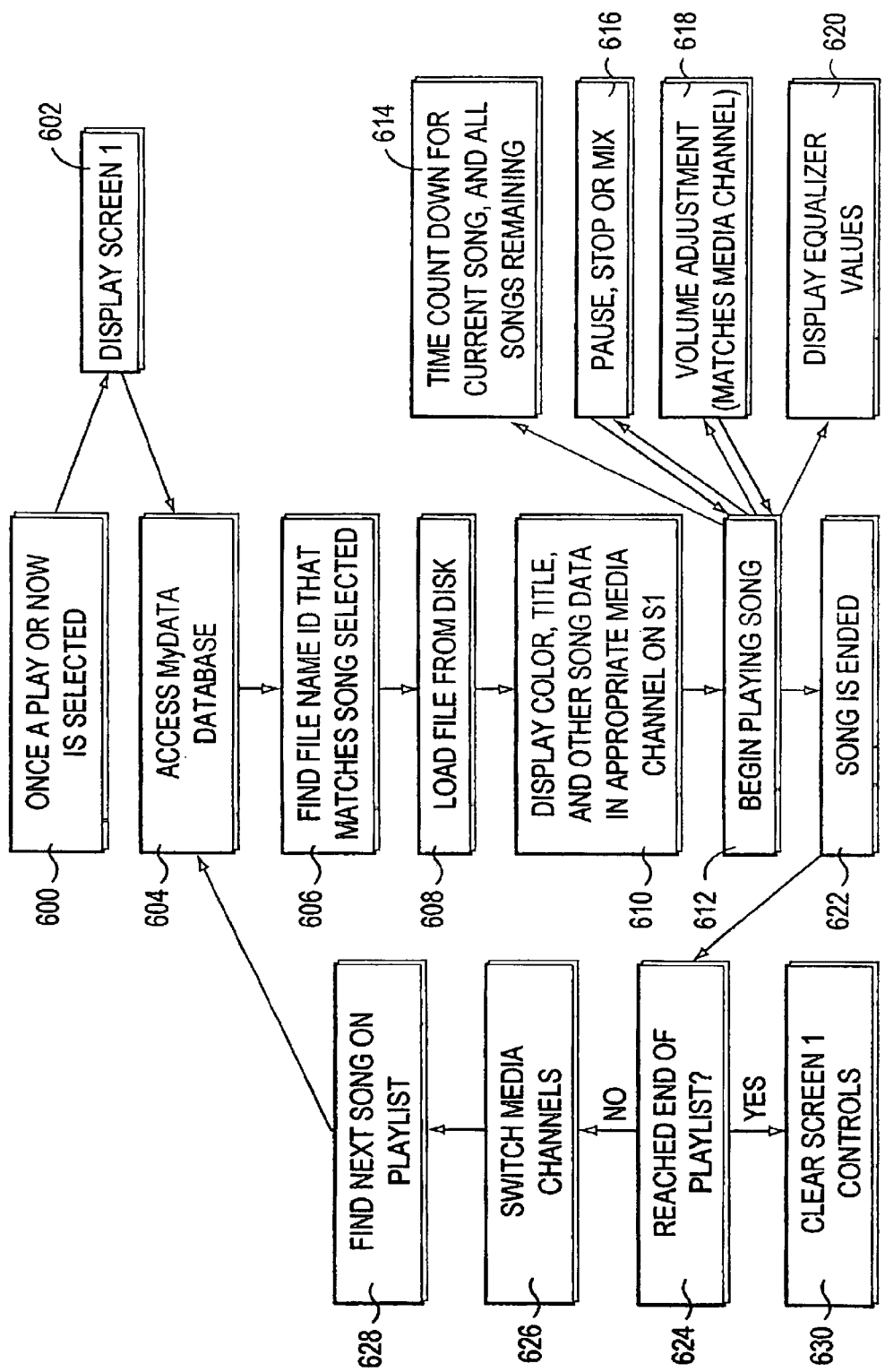
FIG. 9 is a schematic flow diagram of the playback process using the graphical user interface screens selected according to the flow diagram in FIG. 4.

Reference is now made to FIG. 9. If a Play (see button 601, FIG. 14) or Now button on the screen is selected in block 600, Screen1 is displayed showing the various playback controls in block 602. The MyData database is accessed in block 604. The file MID that matches the selected song is searched for by the system in block 606. The file is loaded from the disc in block 608. Again, this file is retrieved from the disc in MPEG3 data compressed format. A particular color for the song, which may correspond to a given set of categories, as well as a title and other data are provided to one of the media channels in Screen1 in block 610. The song begins playing in block 612 as soon as the data is ready. A time countdown for the song is initiated using known techniques in block 614. If a pause, stop or mixed command is received in block 616 then these steps, is described above, are carried out. In particular, a pause or stop ends playing of the song either temporarily (e.g., until pause is pressed again) or permanently, in case of a stop command.

Volume adjustment and other equalizer values can be provided according to block 618 and 620. These act upon the playback of a song using known techniques. When the particular song has ended in blocks 622 the system checks whether it has reached the end of the current play list in block 624 if not, media channels are switched in block 626 and the next song on the play list is located in block 628. This song information is transferred back to block 604 and the name of that new song is located in block 606. The process continues as described above.

If the end of the play list is reached in block 624, then Screen1 controls are cleared in block 630. The system awaits further instructions at this time.

Figure 10:
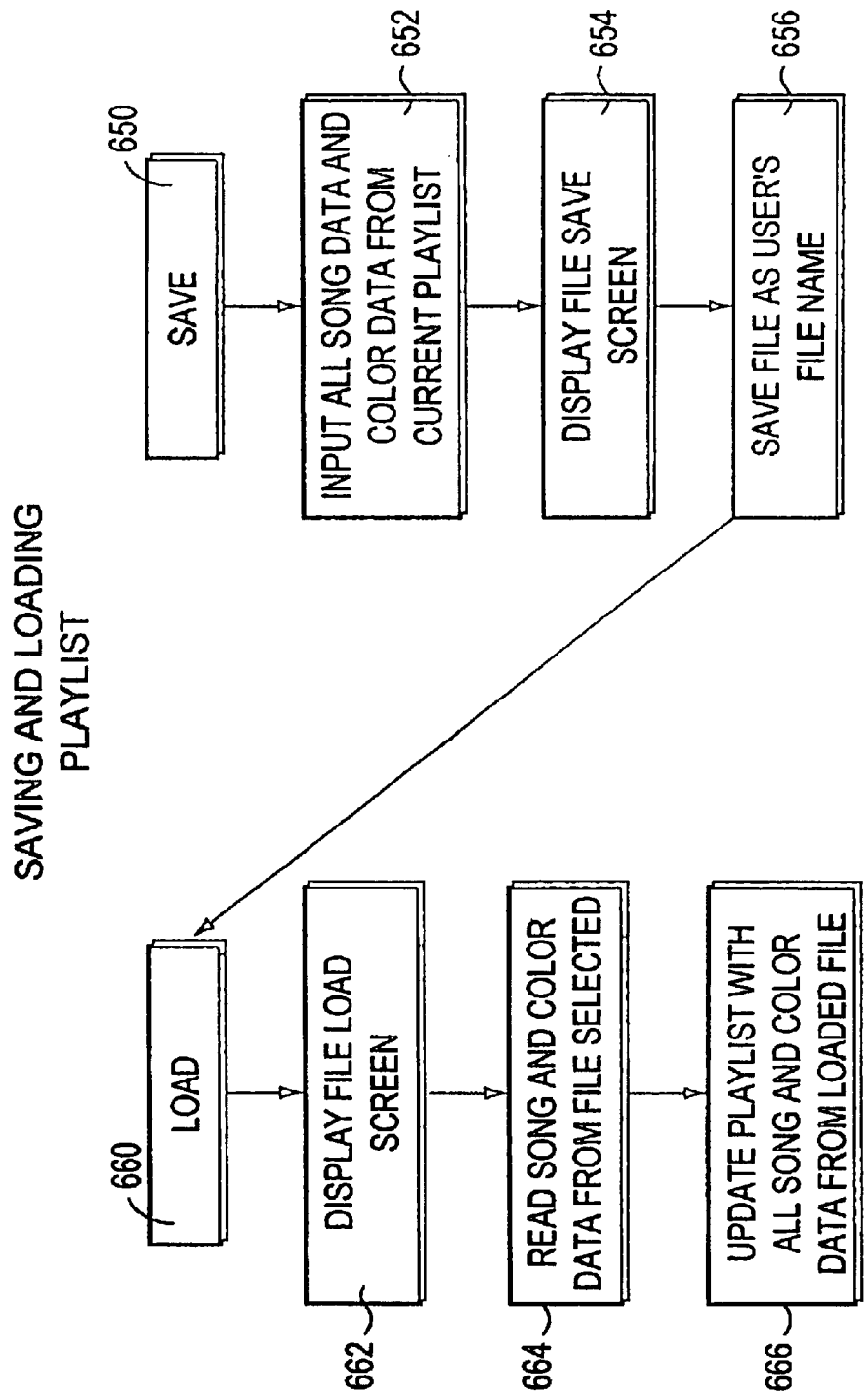
FIG. 10 is a schematic flow diagram showing the saving and loading of play lists using the media organizer and entertainment center according to this invention.

FIG. 10 describes the saving and loading of play list in more detail. If a save command is initiated by the user in block 650, then all song data and associated colored data for the display from the current play list is collected 652. The file save window is placed on the screen in block 654. The user can select an appropriate file name for saving the particular play list file in block 656. Again, the display for this procedure is detailed in FIG. 14

If a load command is entered by a user as shown in block 660, then the file load window is displayed in block 662. The display for this window in shown in FIG. 15.

Song and color data are read from the selected file in block 664 and the current play list is updated and/or replaced with all song in color data from the loaded file in block 666.

It is specifically noted that category information is provided by the service provider appended to each song in the database. The accessing of songs having such data appended thereto occurs according to applicant's unique graphical user interface based upon provider categories. The association of various database identifiers to each song is implemented using conventional database programs such as the above-described Microsoft Access® 2.0. The association of category objects to song data should be conventional to those of ordinary skill. The storage of MPEG3 data compressed song files is accomplished in the same manner as other data stored as files in a database. The Microfiche Appendix included in the subject application pursuant to 37 CFR 1.96(c) contains a listing of program commands in the commercially available Visual Basic language for implementing various functions of the center according to this embodiment.

Using the hardware and software elements described above, FIGS. 18 and 19 detail a docking mechanism in which music is stored on a hard drive or other electronic medium in a main data handling unit 700 with a flip-up display 702 and associated keyboard 704 that can include playback controls 706 (e.g., play, stop, pause, forward and reverse). The unit 700 can be "docked" to a base unit 708 that includes a connector 710 for interfacing with an associated connector in the unit 700. A cable 712 can interconnect the base unit 708 with appropriate speakers or amplifiers. The unit 700, hence, can include the music data for the system and can be moved from location to location so that there is no need to purchase additional playback units to play music provided from the service provider with the particular code.

Figure 20:
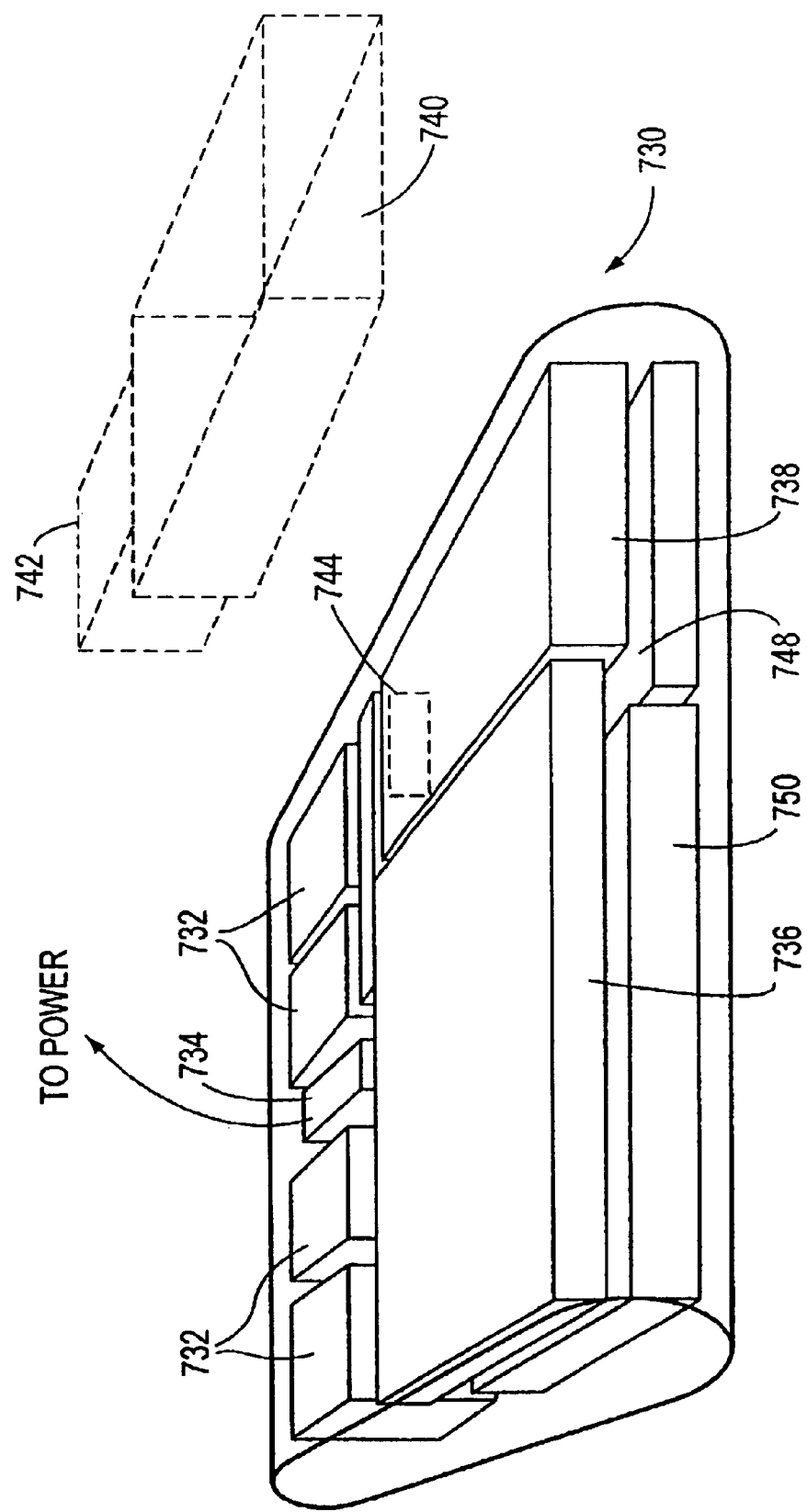
FIG. 20 is yet another alternate embodiment of a media organizer and entertainment center utilizing a docking principle for a main hard drive.

FIG. 20 illustrates and alternate embodiment for docking unit in which a base unit 730 includes speakers 732, a power coupling 734, a flip-up display 736 and a removable memory storage device, such as a compact hard drive 738. The hard drive is shown removed in phantom 740. A connector 742 can interface with an associated connector (shown in phantom) 744 on the base unit. The hard drive, itself, it moved from base unit to base unit so that, again, there is need to purchase music only once, and that music is identified to a particular hard drive. The base unit can also include a CD-ROM shelf 748 for reading music during the original loading process. In certain remote units, the CD-ROM may be omitted, since all music is contained on the hard drive and loading of music is accomplished with the base unit 730. A motherboard 750 controls the operations of the unit.

Figure 21:
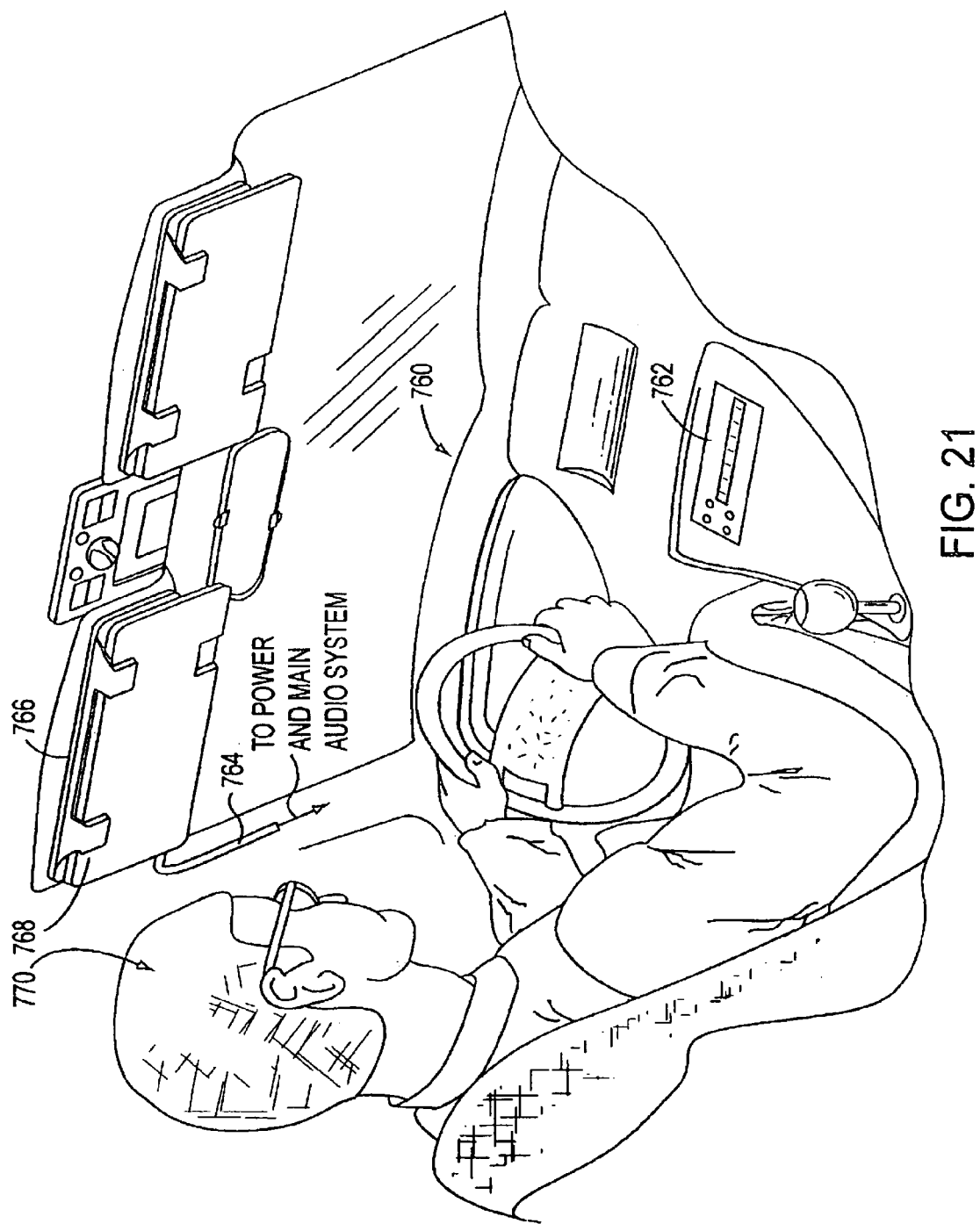
FIGS. 21 and 22 are perspective views of yet another exemplary media organizer and entertainment center for use in mobile environments including, for example, the docking element shown in FIG. 20.
Figure 22:
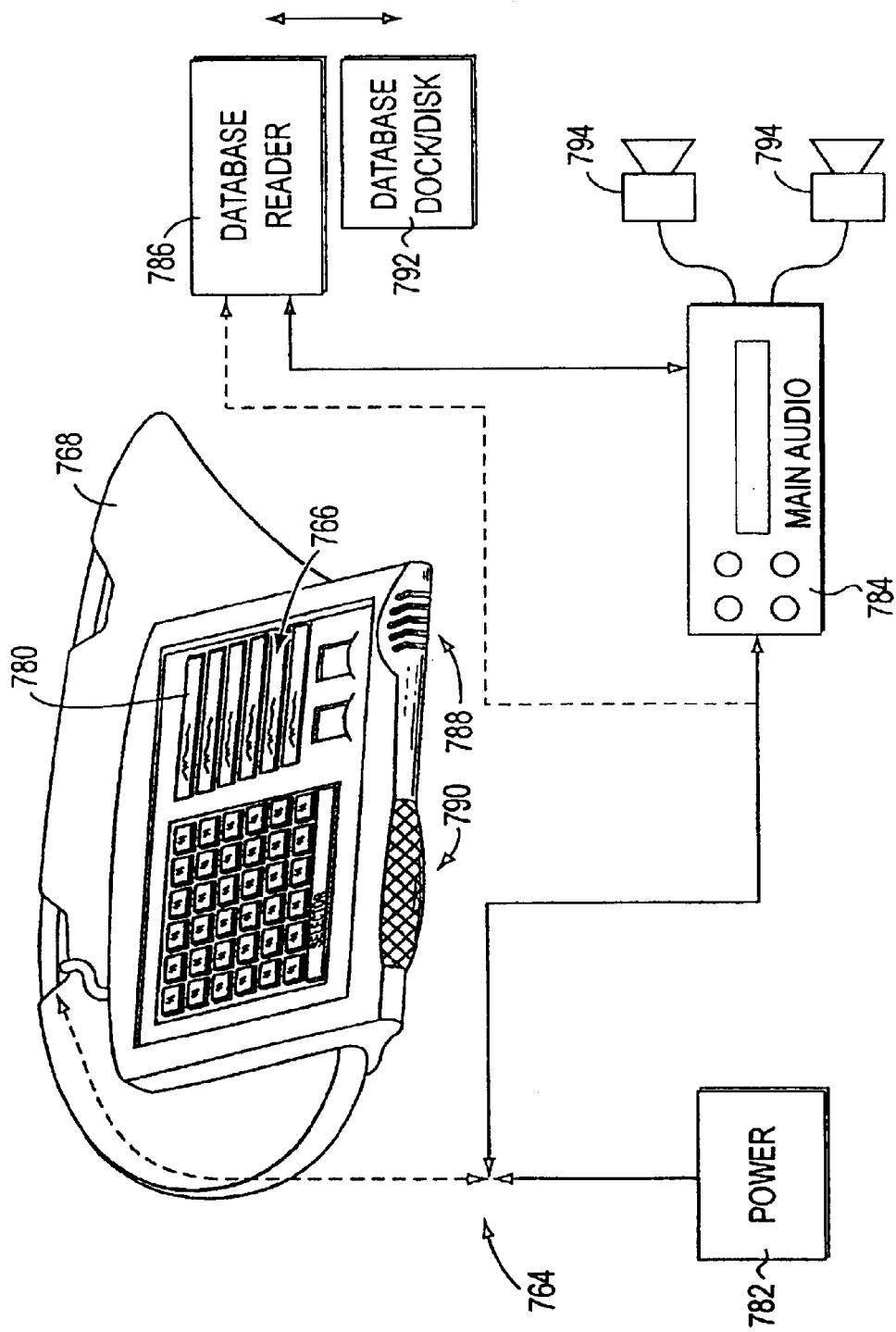

FIGS. 21 and 22 illustrate a mobile playback system according to this invention. The above described docking units in FIGS. 19 and 20 can be utilized in conjunction with this unit. In other words, an entire hard drive or unit can be interfaced with an onboard automotive base unit to enable music in the hard drive or docking unit to be played within a car or other vehicle. In this embodiment, the automotive interior 760 is provided with a main audio system 762. Various cords 764 interconnect the main system to a contact display unit 766 that, in this embodiment, is located on the sun visor 768 where the driver 770 can easily access it. It is contemplated that the display unit can be located at any acceptable location. Alternatively, the unit can be entirely operated by voice commands, with no display unit, and instead, a voice response system implementing conventional voice-generating software. With further reference to FIG. 22, the sun visor 768 is lowered to reveal the display 766 having a screen 780. The wires 764 interconnect the display with a power source 782, that can be part of the main audio system 784 or can be separate. The wires also connect the display 780 with the main audio system 784, or alternatively, can be routed directly to the vehicle's onboard database reader 786. The database reader is any microprocessor-based system as described above. It can be exclusively a disc drive or other high-volume data reader or can include many of the processing functions performed by the center. Alternatively the processor functions can be performed within the display 766. The display 766 includes a microphone 788 for voice activation. As described above, conventional voice-recognition software can be used in conjunction with the center. A hand grip 790 is provided for moving the display to an acceptable position. The database reader interfaces with an onboard docking unit or disc 792, as described above. This can be removed when not in use for placement in another database reader, such as the base unit 730 shown in FIG. 20. Music is routed from the database reader 786 or the display 766 depending upon where the microprocessor are located, back to the main audio unit 784 where amplification occurs. The music is played back on appropriate speakers 794.

Figure 23:
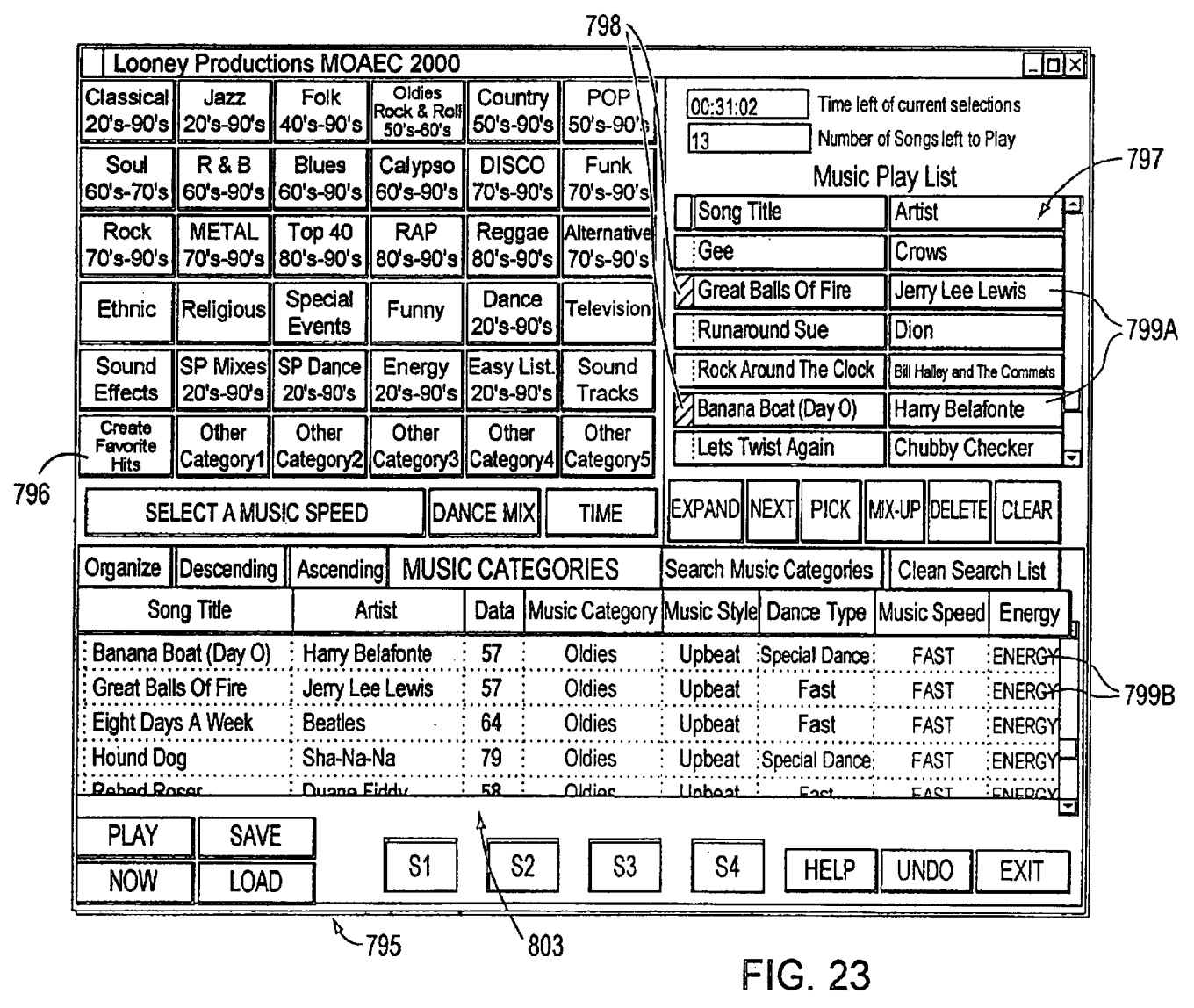

Reference is now made to additional features that can be implemented according to certain embodiments of the invention. FIG. 23 details a favorite hits function that can be applied to Screen2. The display 795 includes a favorite hits Category Creation button 796. Favorite hits, when identified by a user on the current play list 797 can be flagged by "clicking" on the individual titles. A colored flag 798 appears next to flagged songs. Unflagging can involve a second click on a flagged song or a separate Delete button on the screen. The flagged songs 799A appear as top selections 799B on the current search music categories list 803. By clicking on the Create Favorite Hits button 796, these favorites can be saved, so that they always appear at the top of the search categories list 803. In this manner, they can be retrieved to place on the play list within seconds. Again, any song on the search categories list 803 can be transferred to the play list for playback in a desired order (typically first-in-first-out) by simply clicking or-double clicking on the specific search list song entry.

Figure 25:
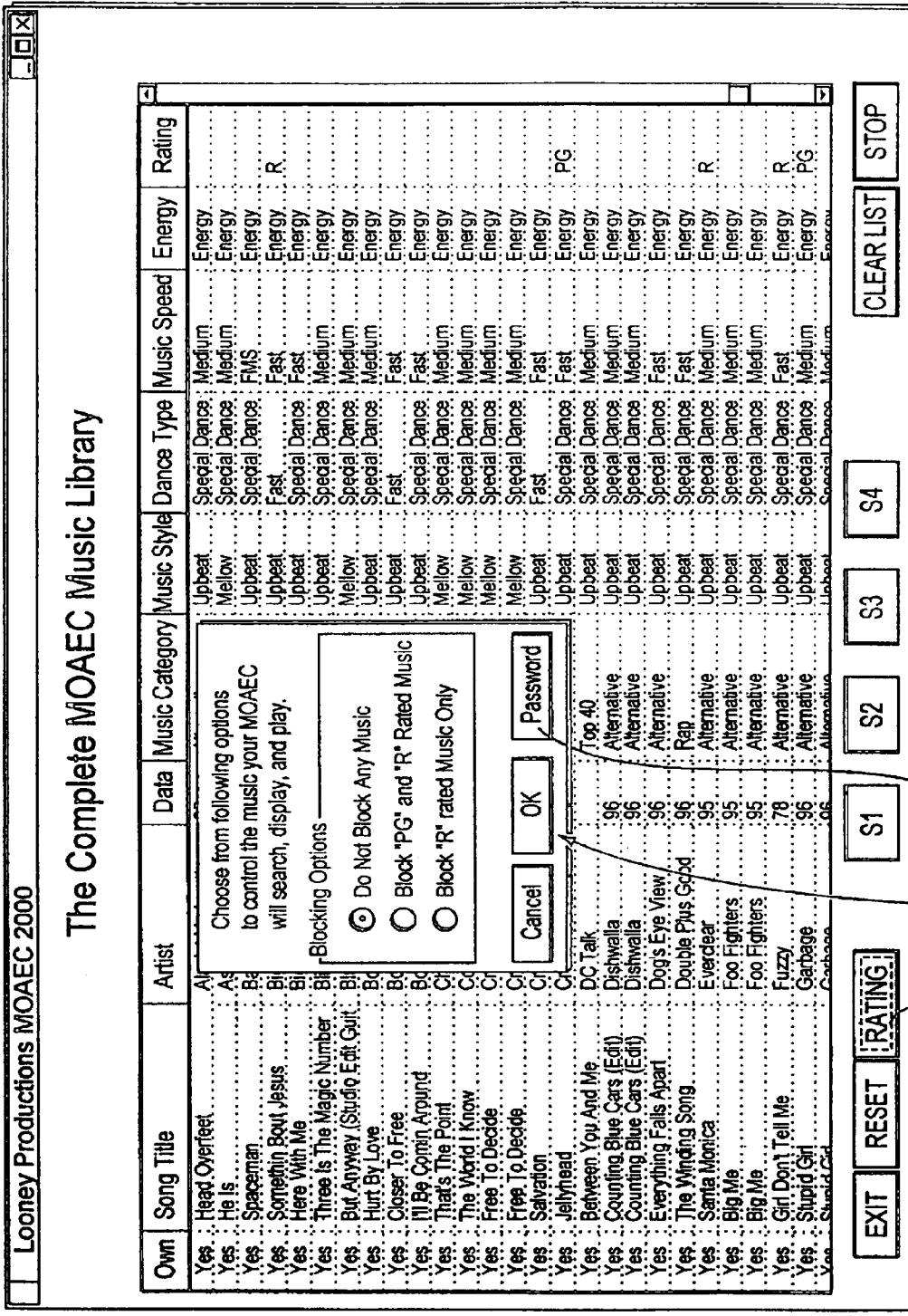
FIG. 25 is a plan view of the graphical user interface screen of FIG. 24 showing the use of a rating category.
Figure 26:
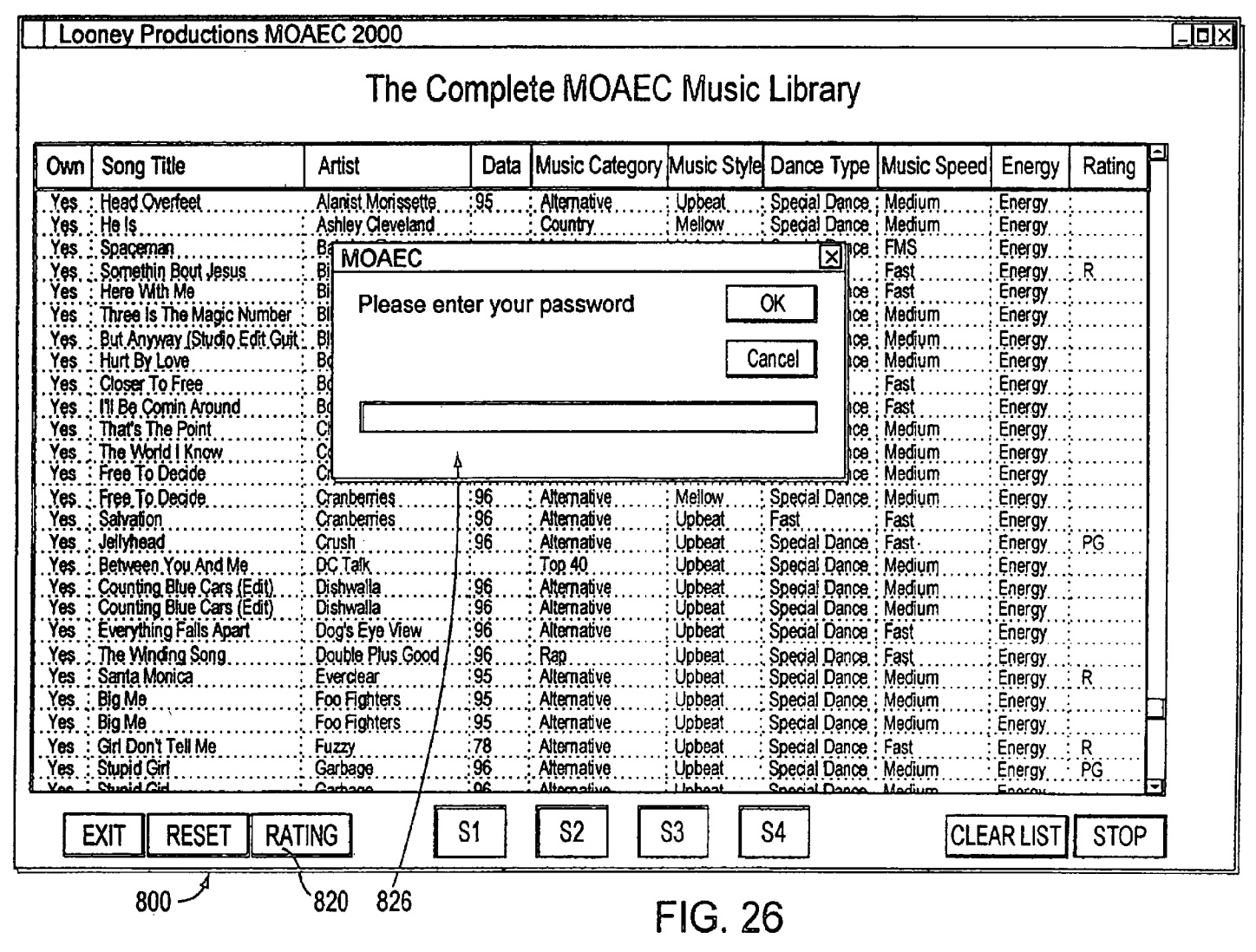

FIGS. 24, 25 and 26 detail an alternate view of Screen4, as discussed above. The display 800 includes an overall listing of the selections available from the service provider. A list of over one hundred thousand titles can be included in the MyData database, as selections are delivered from the service provider. The category fields described above are provided for each title 801—namely, artist 802, date of publication 804, specific music category 806 (e.g. "rock," "jazz," "alternative," etc.), music style 808, dance type 810, music speed 812 and energy 814. In addition, an ownership column 816 is provided that indicates whether the music data accompanying the title is present in the users own database. If so, the entry states "yes," otherwise a "no" indication is provided to the column 816 next to the particular title. In addition a rating column 818 is now provided with an appropriate entry field in the database. In this example songs that the service provider may not think are suitable for certain listeners due to content are appended with a rating, as appropriate. In this example, all songs not rates are acceptable to all. A specific rating letter such as "G" can also be placed next to such songs in the column 818. Higher rated songs can include the rating letter PG, or stronger rating letter R, on their particular title row. The depicted ratings are exemplary only. The actual song titles shown should not be taken to have these actual ratings. The music selection list of Screen2 would also display ratings when they are used. Note that a variety of levels of rating and rating criteria can be used. In general such ratings are defined and appended to individual songs be the service provider.

FIG. 25 illustrates the activation of Screen4's rating button 820. This button calls a window 822 that prompts the blocking of R and/or PG-rated songs. In this manner, higher rated song titles cannot be viewed or played. This function is enable and disabled using a password that is entered after striking the Password button 824 in the window 822. This button calls a password-entry window 826, detailed in FIG. 26. Once an initial password is entered, it must be reentered to change the rating blocking function or to change the password itself.

Figure 27:
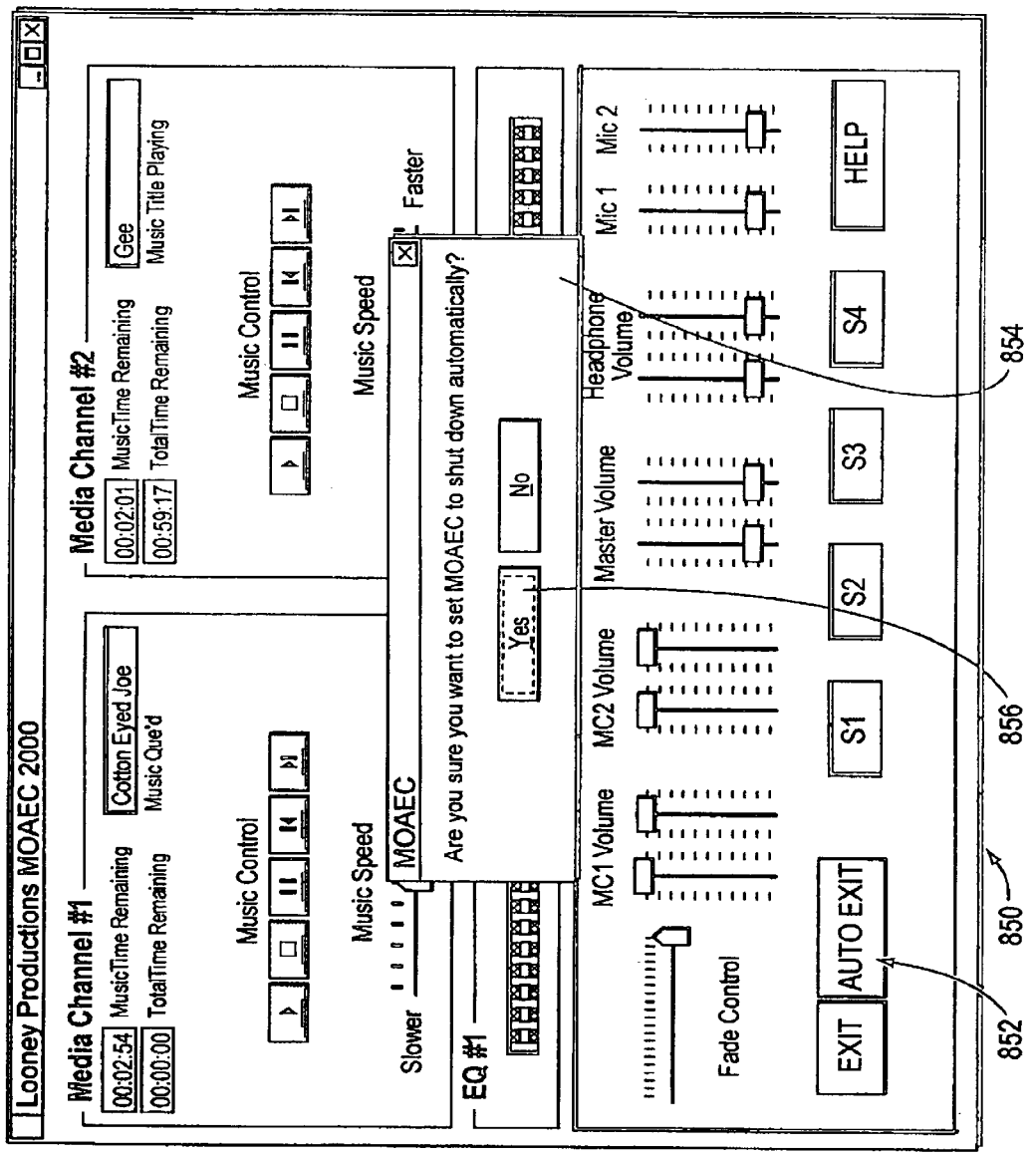
FIG. 27 is a plan view of a modified first graphical user interface screen according to another embodiment of the invention, including an auto-exit function.
Figure 28:
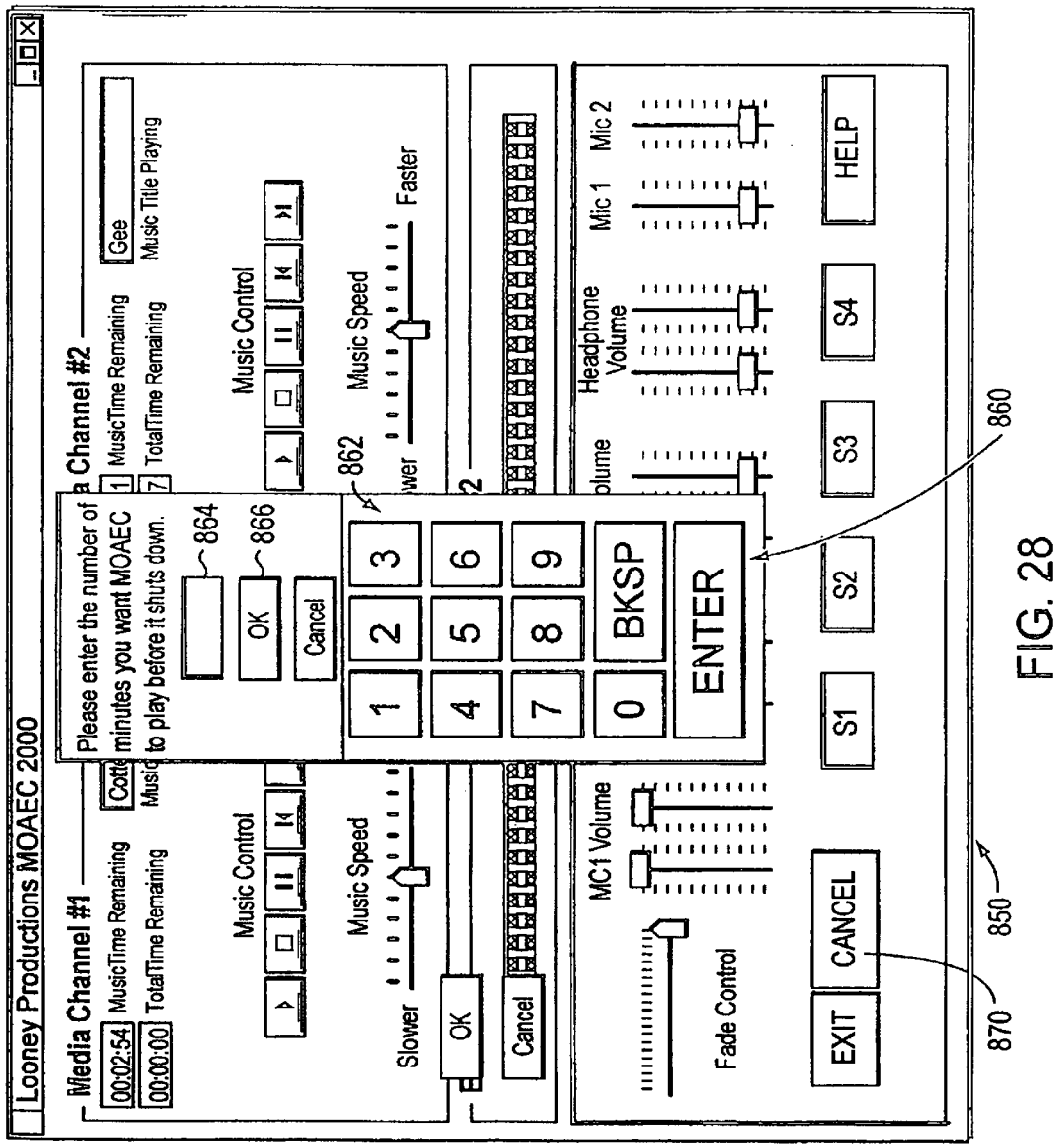
FIG. 28 is a plan view of the graphical user interface screen of FIG. 27 showing a shut-down time control window.

FIGS. 27 and 28, finally, illustrate an auto-exit option appended to the display 850 of Screen1 in this embodiment. An Auto-Exit button 852 can be clicked to call an automatic shut-down window 854. By clicking a Yes button 856 in this window, the center calls another window (FIG. 28) with an auto-shutdown keyboard 860. The window 860 includes a numeric keyboard 862 for entering shutdown time in minutes. A time box 864 indicates the selected time. Pressing the "OK" button 866 causes the shutdown time to be acted upon. Playback will occur until the time has been elapsed. At any time, the Cancel button 870 can be activated to cause the shutdown routine to cease and/or the window 860 to be removed from Screen1.

The architecture and database storage techniques, as well as the various graphical user interface functions described above can be readily adapted to handle images and full motion video as well. The primary addition to the above-described embodiments would be a screen capable of playing back video of appropriate size interconnected to the center's processor by an appropriate video driver card that is typically commercially available. In addition, appropriate data compression/decompression routines applicable to full motion video and/or images is desirable. In substance, the data for video packages is stored with various categories similar to or the same as those applicable to music described above. The graphical user interface is organized identically, as is control and manipulation of playback. In the case of movies, videos, books or other media custom categories can be created.

A sufficiently large hard-drive can be used to store a large database of movies, books and/or other video data. Where storage is problematic, one example contemplates that the center's processor can interface with a commercially available, multi-disc CD-ROM or DVD (Digital Versatile/Video Disc) drive. The drive is interfaced to the processor using commercially available interface hardware. The raw video data can be retrieved as needed from the play-ready optical discs according to a request by the user entered via the MyData database which carries the underlying video category data associated with each video title in its list. Any tides not currently held in the optical unit, can trigger a load-optical-disc message, prompting the user to load-in the optical disc containing the desired date. Of course, this is only one example of a system that handles video data using the underlying interface and organizational structure of the present invention.

Note that the graphical user interface herein has been described in terms of its primary functions. Any buttons on the display screens detailed herein not expressly described can be assumed to perform functions that are straightforward, and particularly noted on the buttons themselves, such as "OK and "Cancel." All functions not specifically described should be clear to those of ordinary skill.

The foregoing has been a detailed description of a preferred embodiment of the invention. Various modifications and additions can be made without departing from the spirit and scope of this invention. For example, a variety of colors can be used for different keys and buttons, categories can be identified based on certain colors. Voice recognition and voice-playback functions can be provided to any of the embodiments described herein. Various interface devices can be used, such as touch screens, light pens and the like. In addition, the database, data compression and playback systems and software described herein can be substituted for any other acceptable system or software. The particular layout the graphical displays and content of various buttons in the display can also be varied. Again, it is expressly contemplated that particular Category buttons on Screen2 are displayed in different colors, shapes, sizes or descriptions and that specific colors can be used to highlight certain windows or underlying selections in a display, as well as the status of various functions. Accordingly, this description is meant to be taken only by way of example and not to otherwise limit the scope of the invention.

Figure 29:
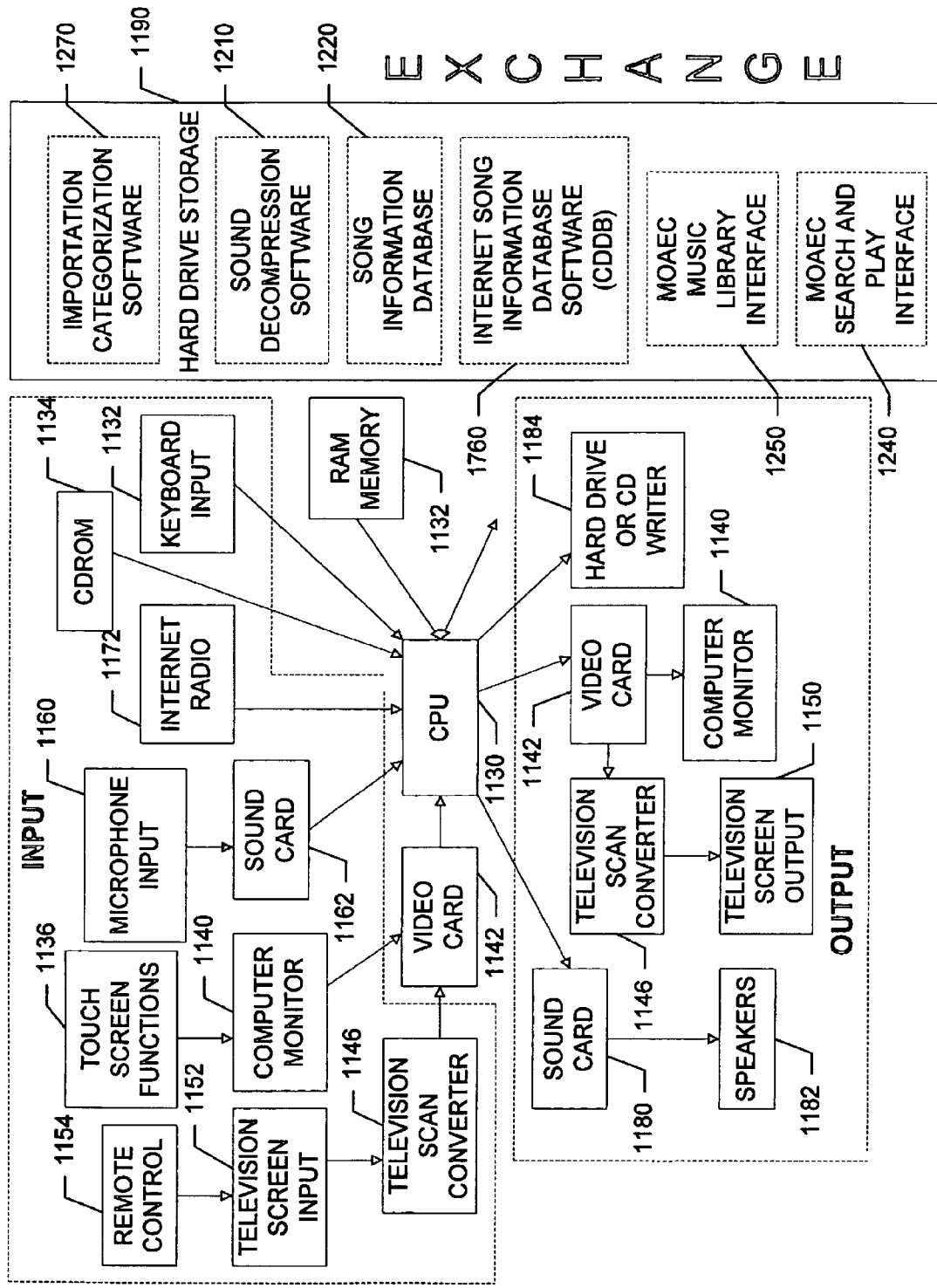
FIG. 29 is a schematic block diagram of the hardware architecture of an alternate exemplary media organizer and entertainment center.

The generalized architecture, similar to FIG. 3, of an alternate center 1000 is further detailed in FIG. 29, complete with optional components. The "heart" of the center is its central processing unit or CPU1130. The CPU, in a preferred embodiment comprises a Pentium® II microprocessor having an operating speed of 450 MHz or greater available from Intel. The architecture of this microprocessor is well-known. It is adapted to accept inputs from a variety of hardware components. These hardware components are, themselves, commercially available and can be interfaced with the CPU1130 by those of ordinary skill. In summary, the components involved in a complete center will now be described.

A random access memory (RAM) 1132 is provided to support the CPU 1130. This RAM typically provides sixty-four megabytes of storage or greater. A keyboard and/or cursor-moving mouse interface 1134 is also provided. The keyboard 1134 can be omitted in certain embodiments where a touch-screen is used for all onboard functions. For example, the touch-screen, shown as a touch-screen interface 1136, and used in conjunction with the monitor screen 1140, can include a touch-keyboard thereon for entering alphanumeric characters. Where a monitor 1140 is used, a video driver card 1142 of conventional design is provided. A conventional television can also be utilized. Where a television screen is used for displaying data, a scan converter 1146 can be provided. The scan converter 1146 can be used for output 1150 to the television screen and/or input 1152 from, for example, a television remote control 1154. In this manner both input and output via a television and/or computer monitor can be accomplished. A microphone 1160 and appropriate voice recognition card 1162 can also be provided in conjunction with the CPU 1130 can be provided. Additionally, a CD-ROM, with appropriate driver card 1170 can also be provided. Further an Internet Radio 1172 (or satellite)for output, a sound card, available from a variety of commercial sources such as the Soundblaster® driver 1180 can be employed and appropriate amplifiers and speakers 1182 can be provided. The amplifiers and speakers are conventional and receive inputs from the sound card in the form, typically, of digital or analog audio signals. Additionally, an output medium 1184 such as a hard drive, CD writer 1184 to burn compact discs, or a flashcard, can be provided to transfer media/data selections for use outside of the center 1000. (Media/data refers, as discussed above, to various types of media such as films, videos, music songs, books. The drawings and discussion below may refer to music or songs, but it is understood that other types of media may be implemented.)

Input/output exchange of media/data is provided through a hard drive storage 1190, also of conventional design. As will be described further below, the hard drive storage 1190 interacts with the CPU 1130 using onboard software. This software includes a speech recognition software block (not shown) a sound decompression software block 1210, a song information database 1220, the center's proprietary speech vocabulary (not shown), the center's search and play interface 1240, the center's Music library interface, 1250, the Internet song info database software (CDDB) 1260 and importation/categorization software 1270.

A significant feature of the center 1000, to be described in greater detail below, is the organization of individual media/data selections according to specific user-defined categories, that are assigned manually or automatically at time of import or at a later time. These categories are carried in a database, along with the raw digital media/data, and allow the user to playback each of the individual selections based upon specific categories in a random or ordered manner. The use of user-defined categories for storage and playback empowers the user to choose media/data based upon his specific desire or mood that relates to categories such as artist, tide, producer, year, main category, energy, speed, style, type, rating or favorites.

With reference to the above-described architecture, the procedure by which individual media/data selections become categorized and eventually made available for a user to playback according to particular categories will be described in summary:

1. Media/data source material is first purchased or otherwise acquired by the user. This media/data is typically obtained by downloading over the internet or otherwise acquiring or purchasing or obtaining commercial compact discs or compression data files in standard Red Book compact disc format on individual albums and singles.

2. The media/data selections are then brought into (i.e. imported) to the database by one of several methods. For example:

A. a compact disc is placed in the CD-ROM. Media/data is played by the CD-ROM into a data compression card commercially available, such as Dialog Four™, which compresses the media into the commercially available MPEG ("MP3") format, or other compressed format. The CPU stores the media in the hard drive.

B. Digital media/data files, such as MP3 files, already resident on the hard drive (such as those down-loaded over the internet) are selected by the user.

3. Compressed media/data selections are subsequently catalogued using a convention database program such as Microsoft Access® in this embodiment. The following categories, among others, can be used in conjunction with the database program to catalog each individual media/data selection- title, artist, producer, year, category, style, type, speed, energy and favorites. These categories are used subsequently by the center's operating system as described below. All categories are stored in the user's hard drive for subsequent retrieval.

4. The categorization software, as described further below, obtains and utilizes bibliographic data associated with a media/data selection, if provided, to automatically fill in appropriate database locations in the information database with this data.

5. The categorization software, as described further below, also scans the digital (MP3 or other) files to automatically determine categories related to the beats per minute of the media/data selection to automatically fill in appropriate database locations in the information database with this data.

6. The categories associated with each media/data selection can be changed by the user at any time.

7. Additional media/data selections can be imported and categorized at later times and the appropriate database locations are filled in as described above. Media/data selections can also be removed from the database.

8. Upon playback, data is decompressed from its stored format using data decompression technology, such as MPEG3 technology. The decompressed media/data selection is then played in a standard "wave" format using conventional data-to-sound software technology. It is contemplated that the software procedure be compatible with an appropriate sound card, as described above. Speakers and an amplifier are used to deliver media/data to the user, as also described above.

Reference will now be made to the flow diagrams and corresponding graphical user interface display screen illustrations.

Figure 30:
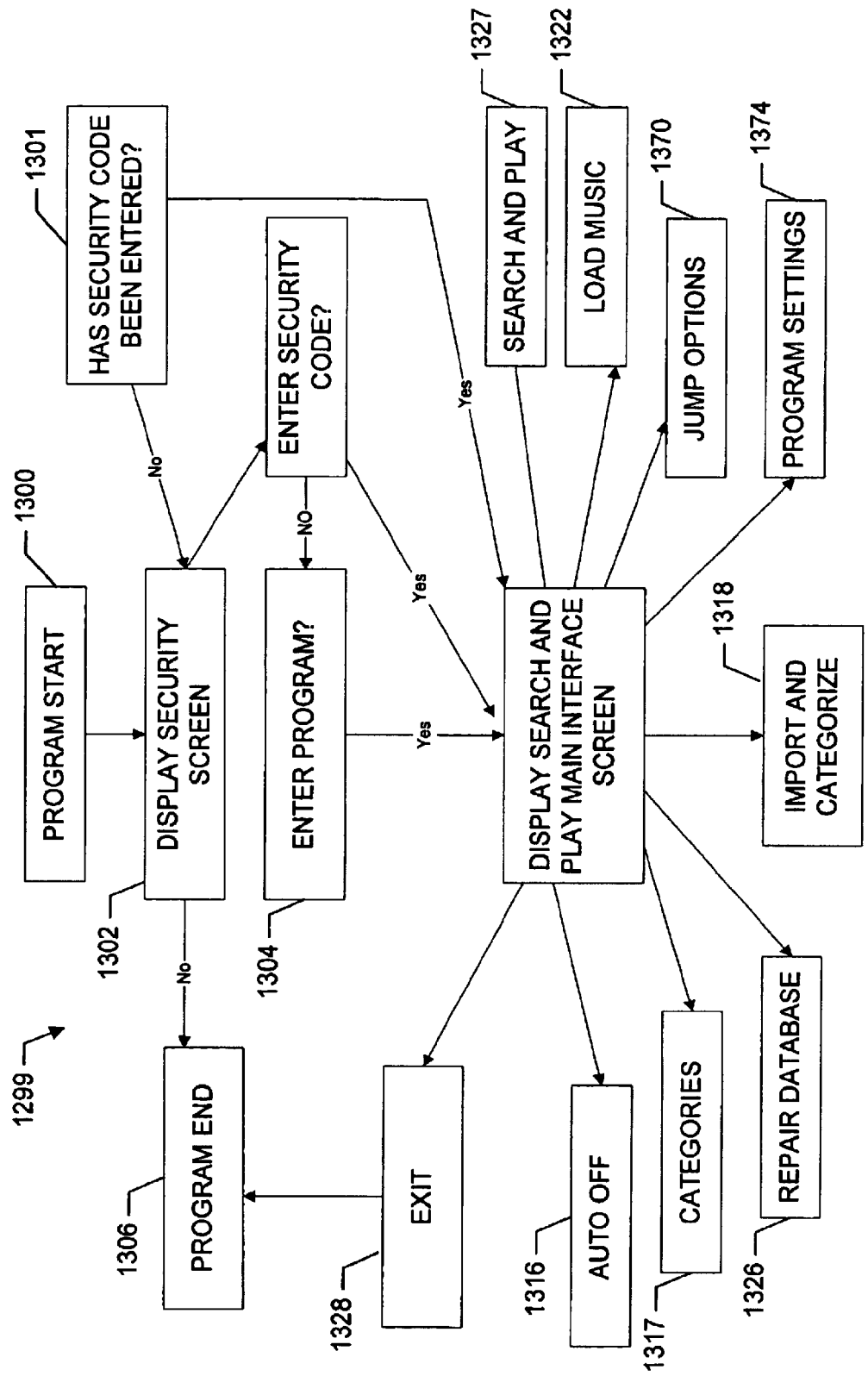
FIG. 30 is a schematic flow diagram illustrating a basic control data path for the media organizer and entertainment center of FIG. 29.
Figure 31:
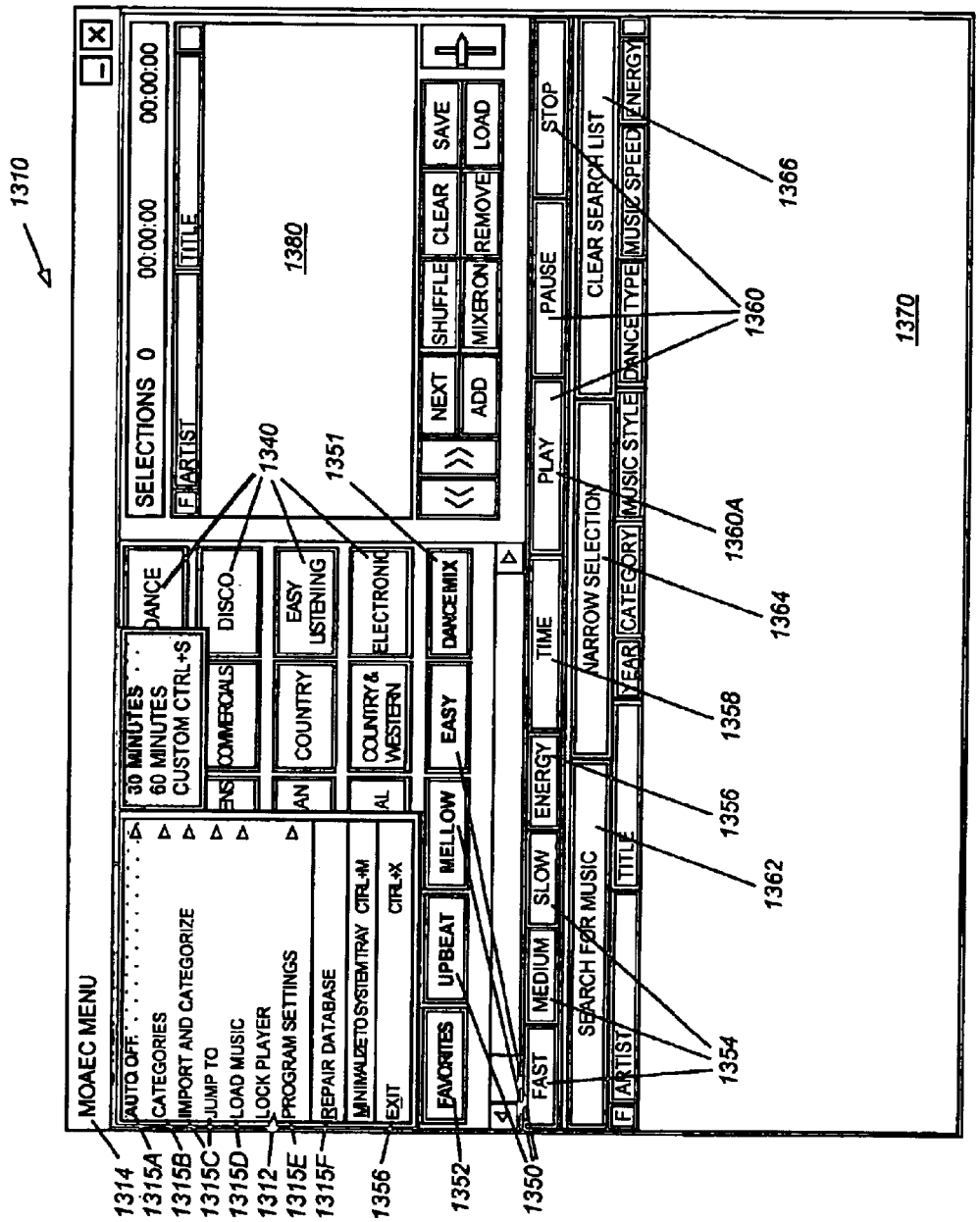
FIG. 31 is a plan view of a Search and Play Main Interface Screen of the center.

Referring first to FIG. 30, the user initializes the program in a program start step 1300. The program determines if a security code, such as a registration number or license key, etc. has been entered in step 1301. If a security code has previously been entered, the program is entered in step 1308. A security screen, not shown, is displayed 1302. Any acceptable security screen can be used. The security screen prompts the user to enter a security code in step 1303 the program in step 1304. If the user does not desire to enter the program, it ends in step 1306. If the user enters the program, then a Search and Play Main Interface Screen 1310 is displayed in step 1308. This screen 1310 is shown in FIG. 31.

From screen 1310, a drop down menu 1312 can be accessed by clicking on a Menu button 1314. (Clicking refers to using the keyboard and/or cursor moving mouse interface 1134 or using touchscreen functions 1136 in a conventional manner). A variety of routines 1315 can be accessed by clicking on routine buttons 1315A–G in the drop down menu 1312. Referring to FIGS. 30 and 31, the appropriate routine is selected by clicking on the routine buttons: Auto Off 1315A (step 1316), Categories 1315B (step 1317), Import and Categorize 1315C (step 1318), Jump To 1315C (step 1320), Load Music 1315D (step 1322), Program Settings 1315E (step 1324), Repair Database 1315F (step 1326), and Exit 1315G (step 1328 which ends the program in step 1306).

Additionally a Search and Play routine (step 1327) can be accessed. In this regard, screen 1310 also includes a plurality of main category buttons (for searching) 1340, mood buttons (for searching) 1350, a dance mix button 1351, favorites button 1352, Speed Buttons 1354, Energy button 1356, a Time button 1358, Playback buttons 1360, Search buttons, 1362, 1364, 1369, a Searchlist Window 1370 for displaying selections found in a search, a playlist window 1380 for displaying selections to be or being played, and play list buttons 1382 for controlling the order of playback and other playback functions. Thus substantially all the functions of the center 1000 can be controlled from one screen 1310.

Figure 32:
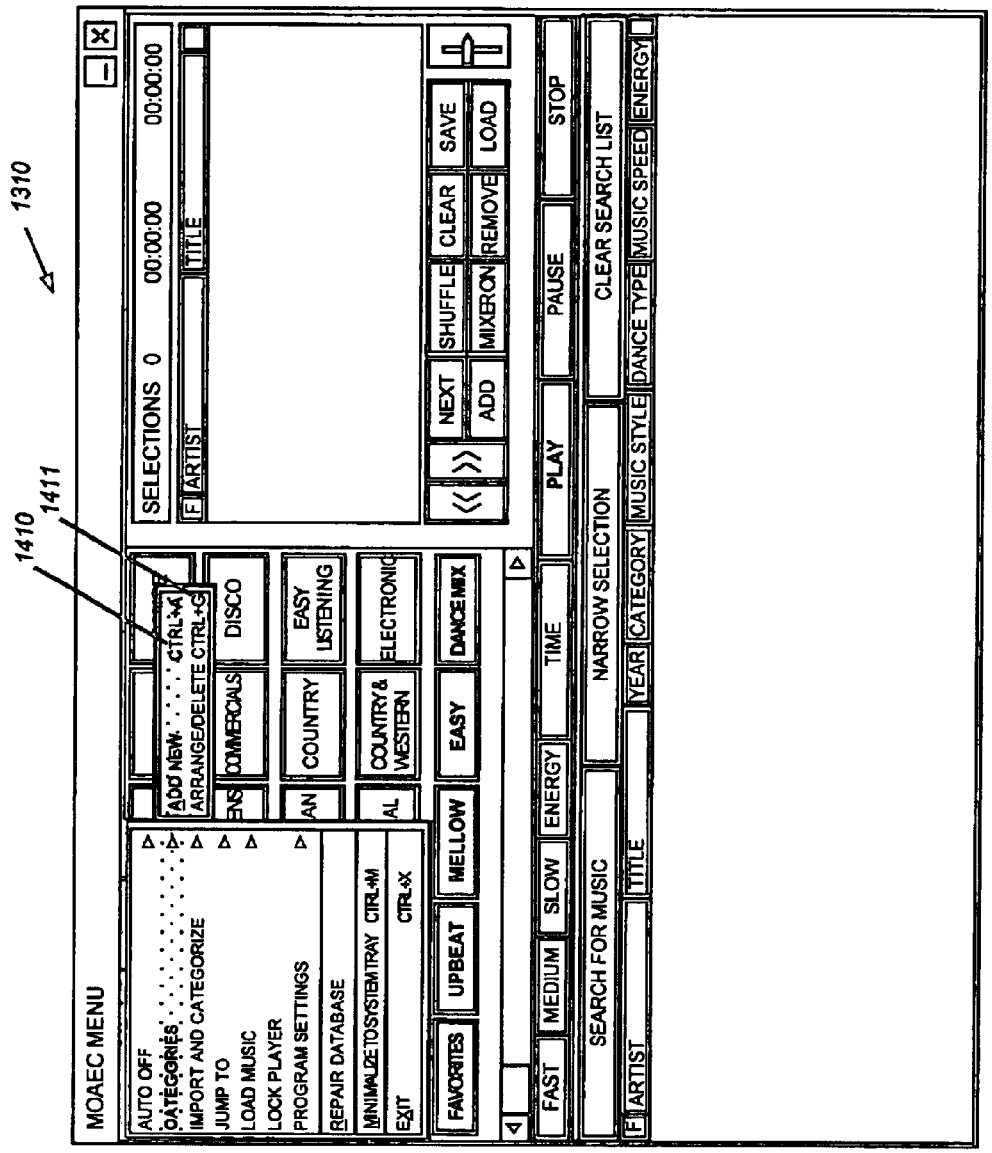
FIG. 32 is a plan view of Search and Play Main Interface Screen illustrating a further operation mode.
Figure 33:
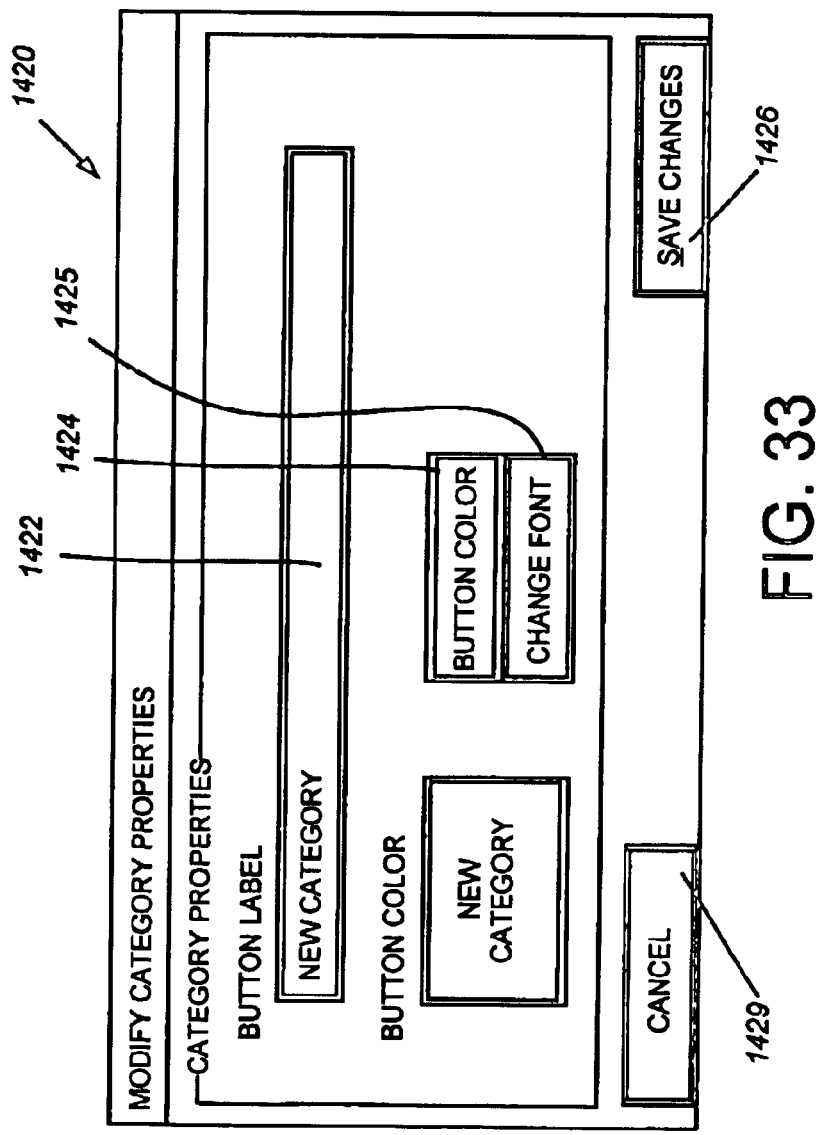
FIG. 33 is a plan view of the Modify Category Screen.
Figure 34:
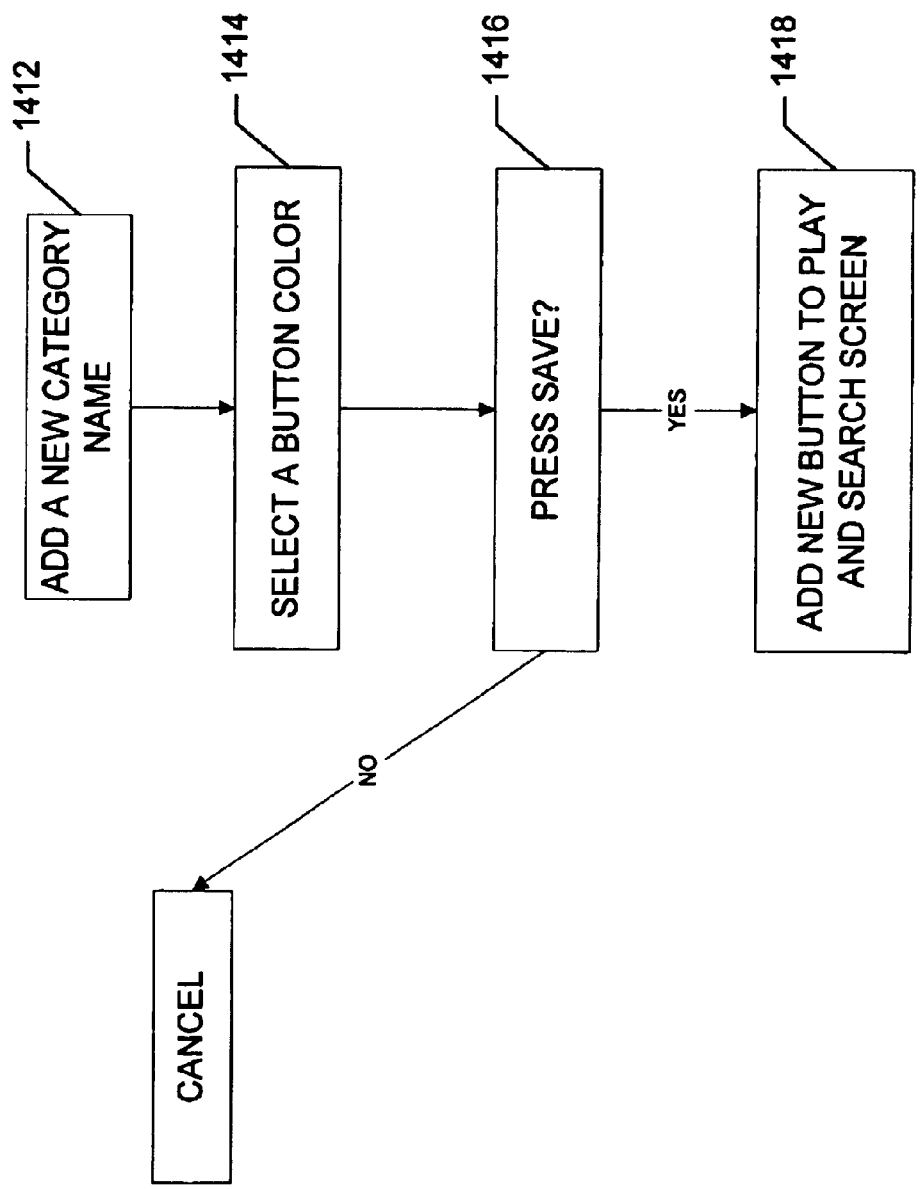
FIG. 34 is a schematic flow diagram illustrating a basic control path for adding new categories.

As discussed above, the user can define or assign categories to be associated with the media/data selections. The category values or information are stored in the database in records for each selection. The user can define a main category by clicking on the Categories routine 1315B (FIG. 31) from the drop-down menu 1312. The main category refers to different media selections such as rock, folk, country, horror films, action movies, love stories, etc. Each main category has an associated main category button 1340 labeled with the name of the main category. As seen in FIG. 32, from this routine, the user clicks on an "add new" button 1410 causing screen 1420 to appear on the display (FIG. 33). According to the flow chart of FIG. 34, a new main category name can be written (step 1412) by typing on keyboard 1134 (all typing can be presumed to take place on keyboard 1132 unless noted elsewhere) in button label window 1422 of screen 1420. A button color can be selected (step 1414) by clicking the Button color button 1424 (similarly the font of the categories name can be selected by clicking on a Change Font button 1425. Additionally, though not shown, the font color of the main category name may also be similarly changed. If a Save Changes button 1426 is pressed according to step 1416, then a new main category button 1340 is added to the main screen 1310 bearing the main category name and color selected according to step 1418. If not (saved), the routine may be canceled according to step 1419 by clicking on the Cancel button 1429.

Figure 35:
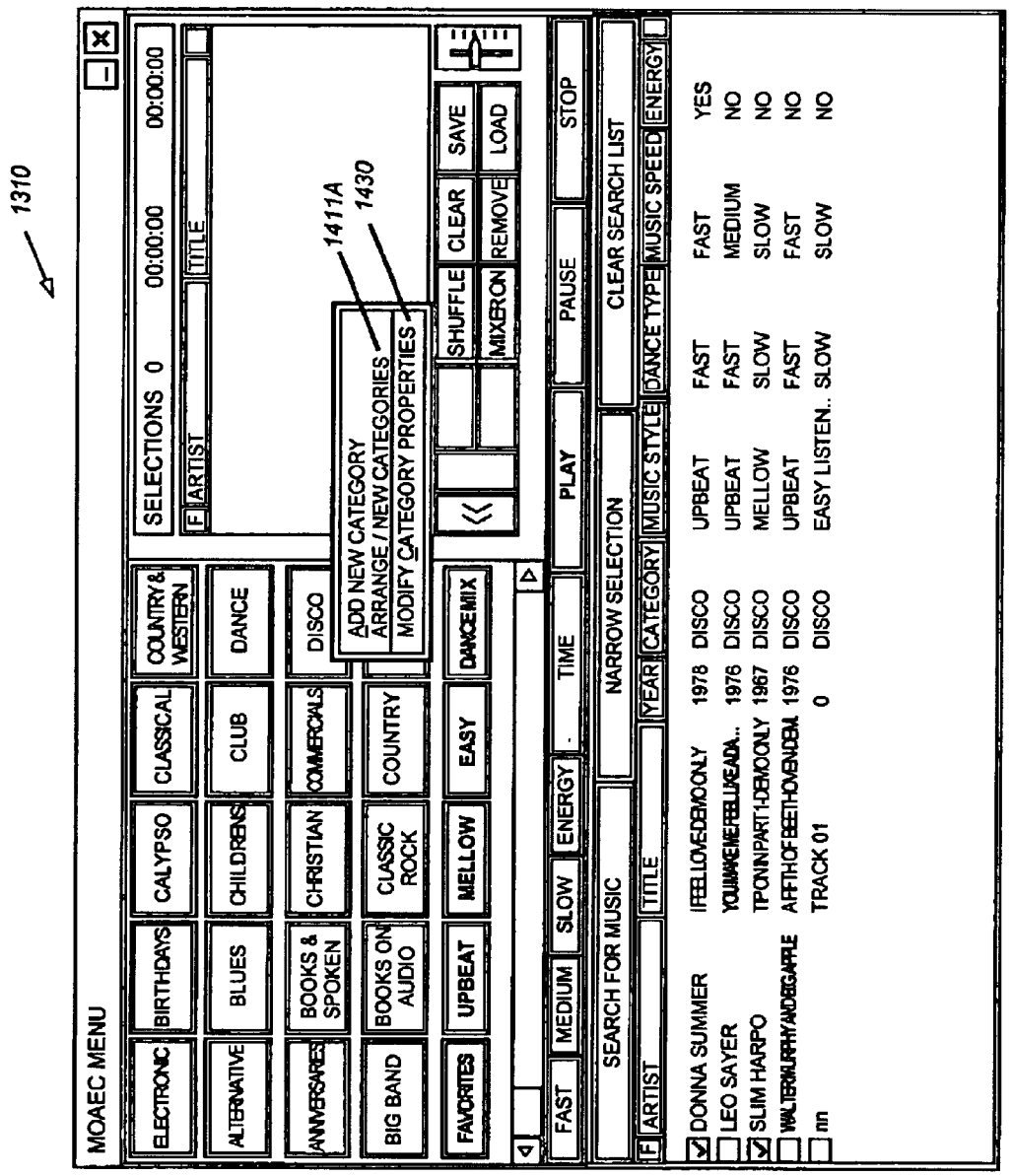
FIG. 35 is a plan view of the screen of FIG. 31 in a further operation mode.
Figure 36:
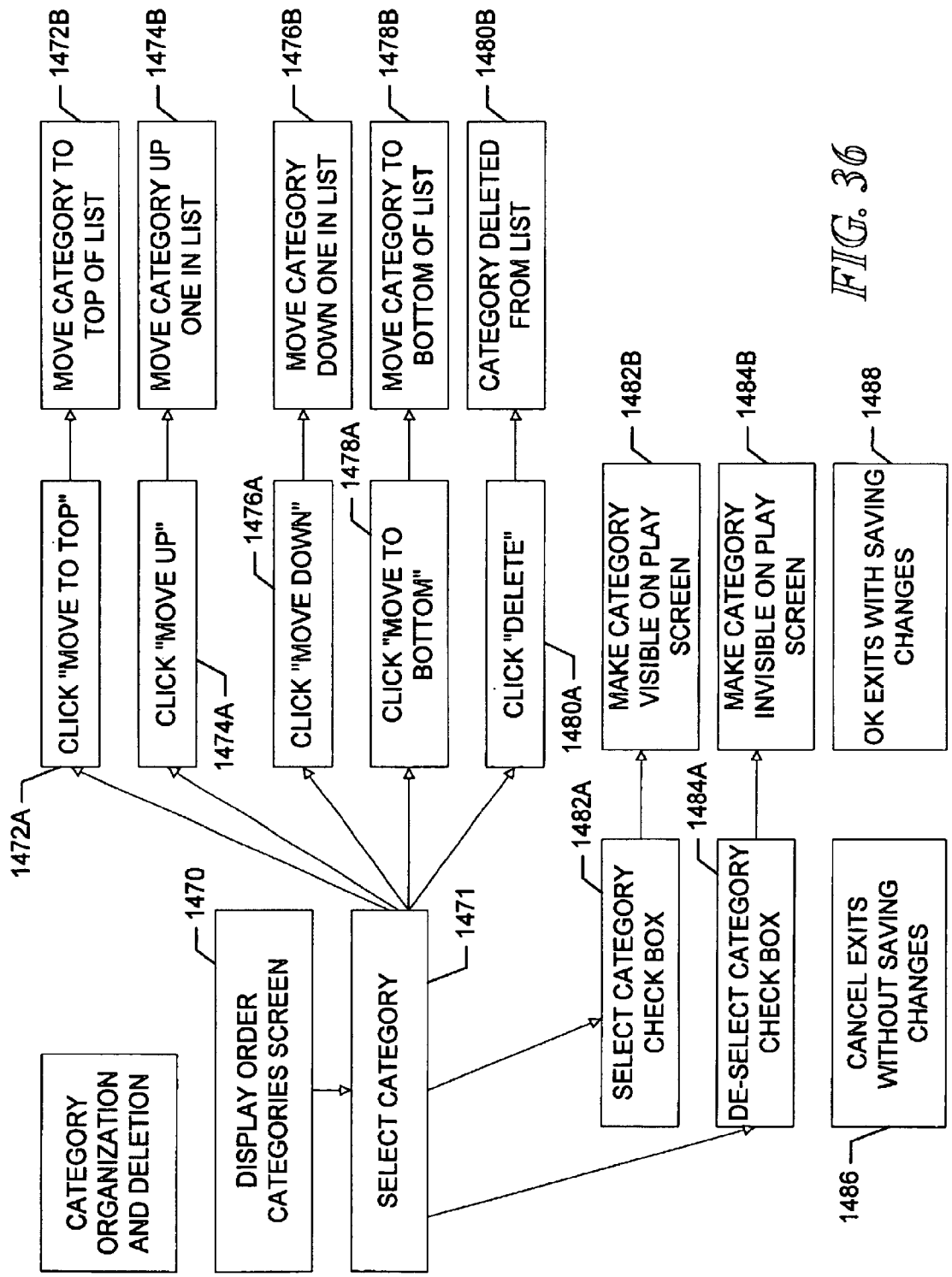
FIG. 36 is a schematic flow diagram illustrating a basic control path for the category and organization and deletion functions.

Existing main categories may be modified by right clicking on the Category button 1340 to be modified as seen in FIG. 35. A screen substantially identical to screen 1420 will be displayed when a Modify Category Properties button 1430 (FIG. 35) is clicked on. The only difference is that the button label window 1422 will have the preexisting category name. The name, color, and font can be changed in a procedure similar to the procedure outlined with respect to FIGS. 33 and 34.

Figure 37:
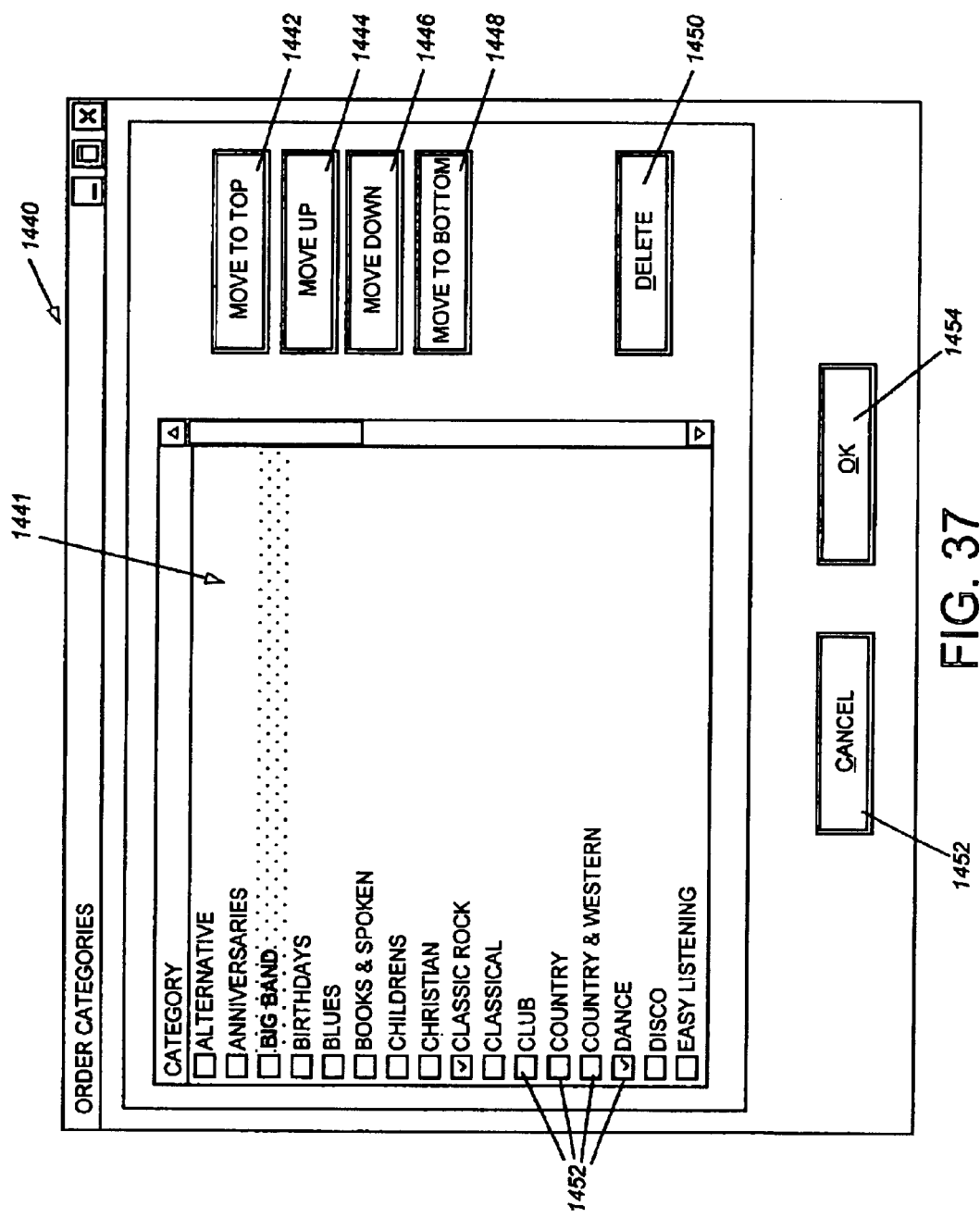
FIG. 37 is a plan view of the Order Categories Screen.

The main categories can also be organized on the screen 1310 and elsewhere. When an Arrange/Delete button 1411 is clicked on in FIG. 32 (or an arrange/delete button 1411A in FIG. 35 is clicked on), an Order Categories Screen 1440 according to step 1470 is displayed (FIG. 37) which has a categories window 1441 in which all the categories are able to be listed (some scrolling may be necessary). When a main category is selected (step 1471) (by clicking on the main category in window 1441), several category organization routines are possible by clicking on one of several buttons on screen 1440. The Category buttons 1340 are listed in columns of four on main screen 1310. A conventional scroll bar 1342 allows various columns to be in the category window 1341. If a Move to the Top button 1441 is clicked on, the main category is moved to the top of the list in window 1442 according to steps 1472A, B and the main corresponding main category button 1340 is moved to the top of the first column. If a Move Up button 1444 is clicked, then according to steps 1474A, B the category is moved up one in the list. For example, if the Big Band category is selected in screen 1440 and the Move Up button 1444 is selected, the Big Band category would be displayed above the Anniversaries category. Similarly in FIG. 35, the Big Band category button 1340 would be placed about the Anniversary category button 1340. If a Move Down button 1446 is clicked, the main category is moved down one in the list according to steps 1426A, B. If a Move to Bottom 1448 is clicked, then the selected categories is moved to the bottom of the list according to steps 1478A, B and the associated category button 1340 is moved to the bottom of the last column in screen 1310. If a Delete button 1450 is clicked, the category button 1340 is deleted from the category window.

The Order Categories Screen 1440 also includes a plurality of check boxes 1452, each next to a main category name. If the check box 1452 is selected (i.e., checked by left clicking the cursor therein), the associated category button 1340 is visible in the category window 1341 according to steps A, B. If the check box 1452 is deselected (not checked), the associated category button 1340 is not displayed in the category window 1341 of screen 1310 according to steps 1484 A, B.

If a cancel button 1452 is clicked, the organization modifications are not saved accordingly, to step 1486. Clicking on an OK button 1454 saves the changes according to step 1488.

Figure 38:
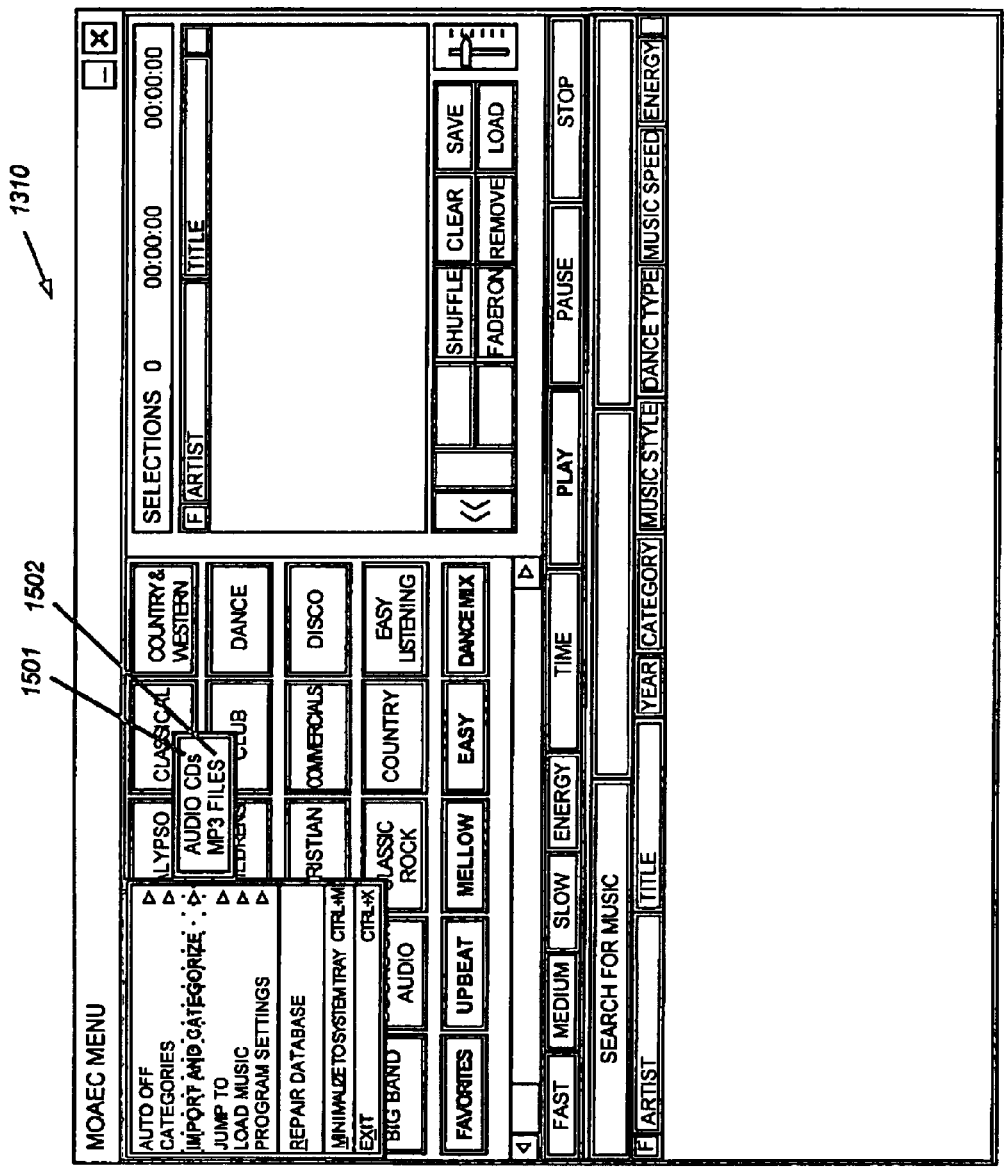
FIG. 38 is a plan view of the screen of FIG. 31 in a further operation mode.

The center 1000 advantageously automatically imports and categorizes selections from compact discs ("CD") or digital (such as MP3) files for later search and playback. Referring to FIG. 38, the user clicks on the Import and Categorize button 1315C from the drop down menu 1312. If an Audio CD button 1501 is clicked, the import and categorization process can start for compact discs.

Figure 39:
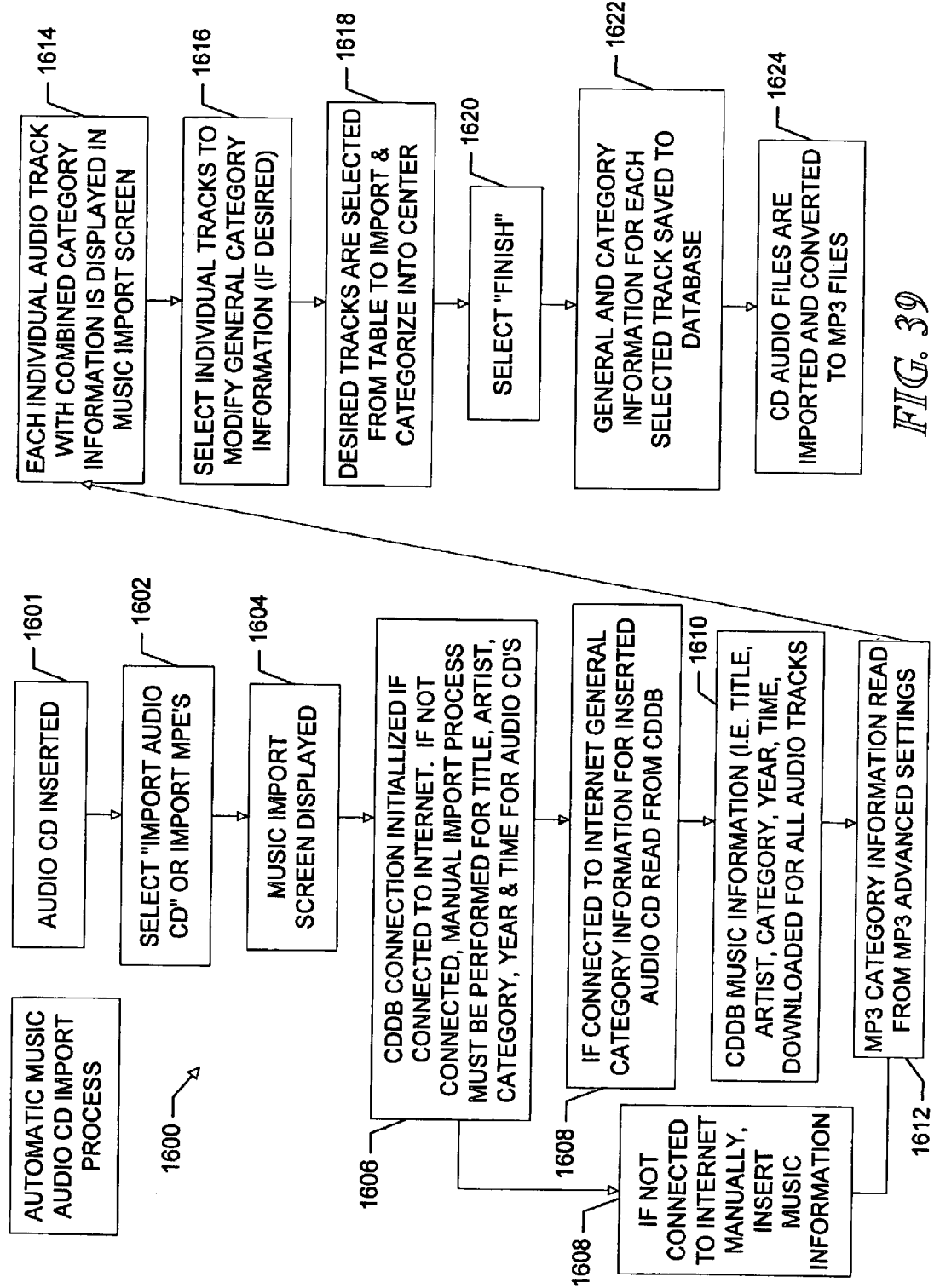
FIG. 39 is a schematic flow diagram illustrating a basic control path for the Audio CD import process.

FIG. 39 illustrates a flow chart for a CD importation program 1600 for CD's from the importation/categorization software 1270. First, according to step 1601, a user inserts a CD into the CDROM 1170. The user then selects to import the CD according to step 1602 by clicking on the Audio CD button 1501 as described above.

An importer screen (not shown) is then displayed, according to step 1604. If the system 1000 is connected to the Internet, according to steps 1606–1608, the Internet song Info Database software 1260 accesses an offsite database (such as CDDB Gracenote). The software 1260 automatically retrieves information (artist, album title, song length, track title, year, genre) from the offsite database for the selections on the inserted CD and downloads it to the system 1000 according to step 1610.

Figure 39A:
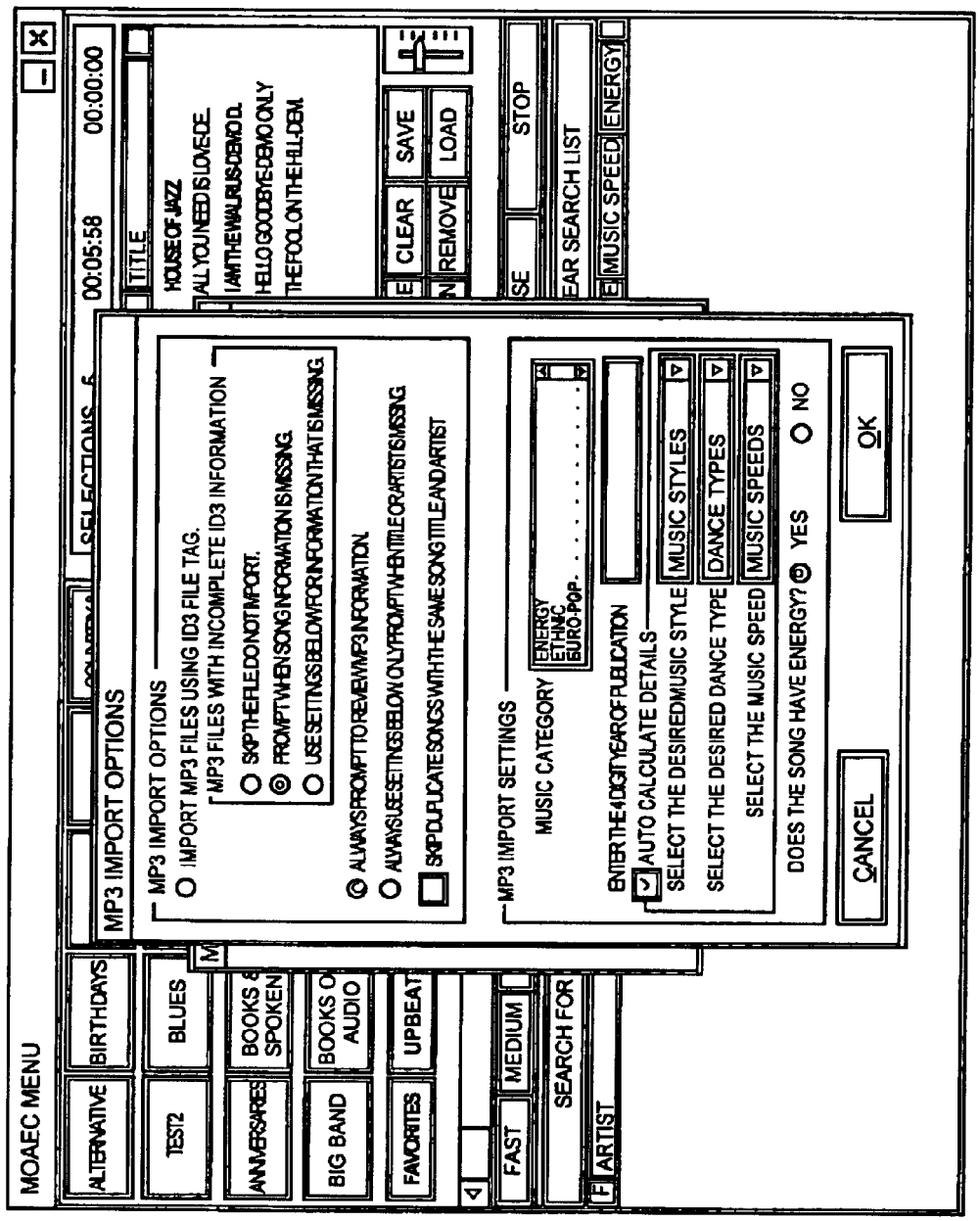
FIG. 39A is a plan view of an Import Options screen superimposed on a Search and Play Main Interface Screen.
Figure 40:
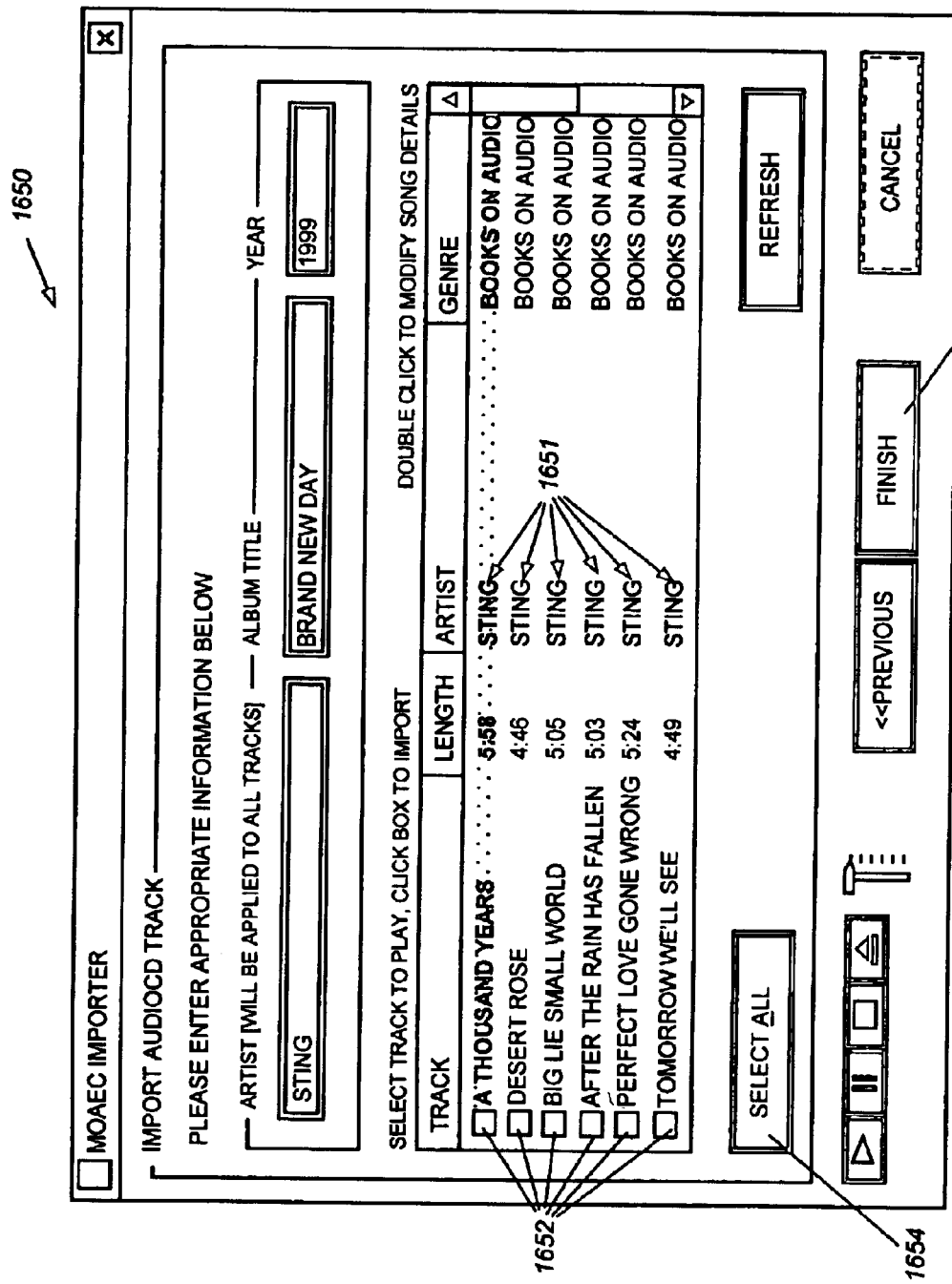
FIG. 40 is a plan view of a Music Import Screen.
Figure 41:
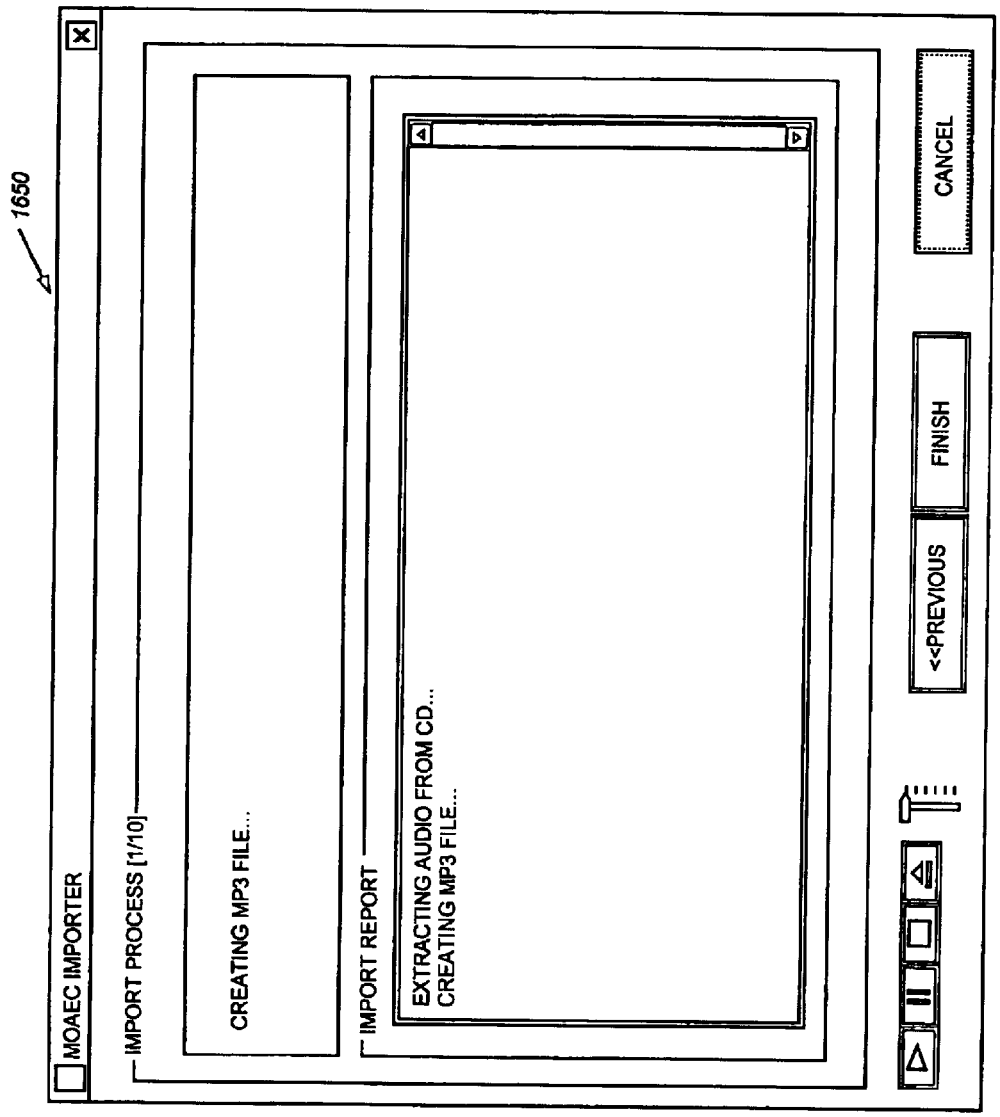
FIG. 41 is a plan view of the Music Import screen in another mode.

The import process 1600 then, according to step 1612, looks to see if the user has preset the values of any of the category information such as style, speed, year, main category, energy and insert these values to modify the values received from the offsite database. The user can preset these values by accessing an Import Options screen 1599, seen in FIG. 39A. The screen 1599 is accessed by clicking on the Program Settings routine button 1315E from the drop down menu 1314 (FIG. 31) and clicking on a "mp3 settings" button not shown and going to an advanced settings option on a screen (not shown). Each individual track (or selection) 1651 with its accompanying (category) information is displayed in an Importer Screen 1650, such as shown in FIG. 40 according to step 1614. According to step 1616, the information of individual track 1651 can be edited by clicking on the track 1651 to be edited, and then clicking again on the particular information to be modified (i.e. title, track, artist, genre). According to step 1618, the user selects individual track(s) 1651 to import from those listed on the screen 1650 by clicking on a box 1652 next to each track or clicking on a SELECT ALL button 1654 to select all the tracks listed on the screen 1650 to import the user then click on a FINISH button 1656 (Step 1620) which causes the information for the tracks to be imported and saved to the database 1220. The genre categories field is given the name of the saved to the main category field. If there is no main category with the same genre name, the category field is defaulted to OTHER. The CD audio file(s), of each selected track of the CD, are then sequentially extracted from the CD and converted to a "wave" or similar file and then compressed to a digital file (i.e. MP3, etc.) format according to step 1624. The importer screen 1650 (FIG. 41) is displayed with an import report during steps 1622–1624.

Figure 42:
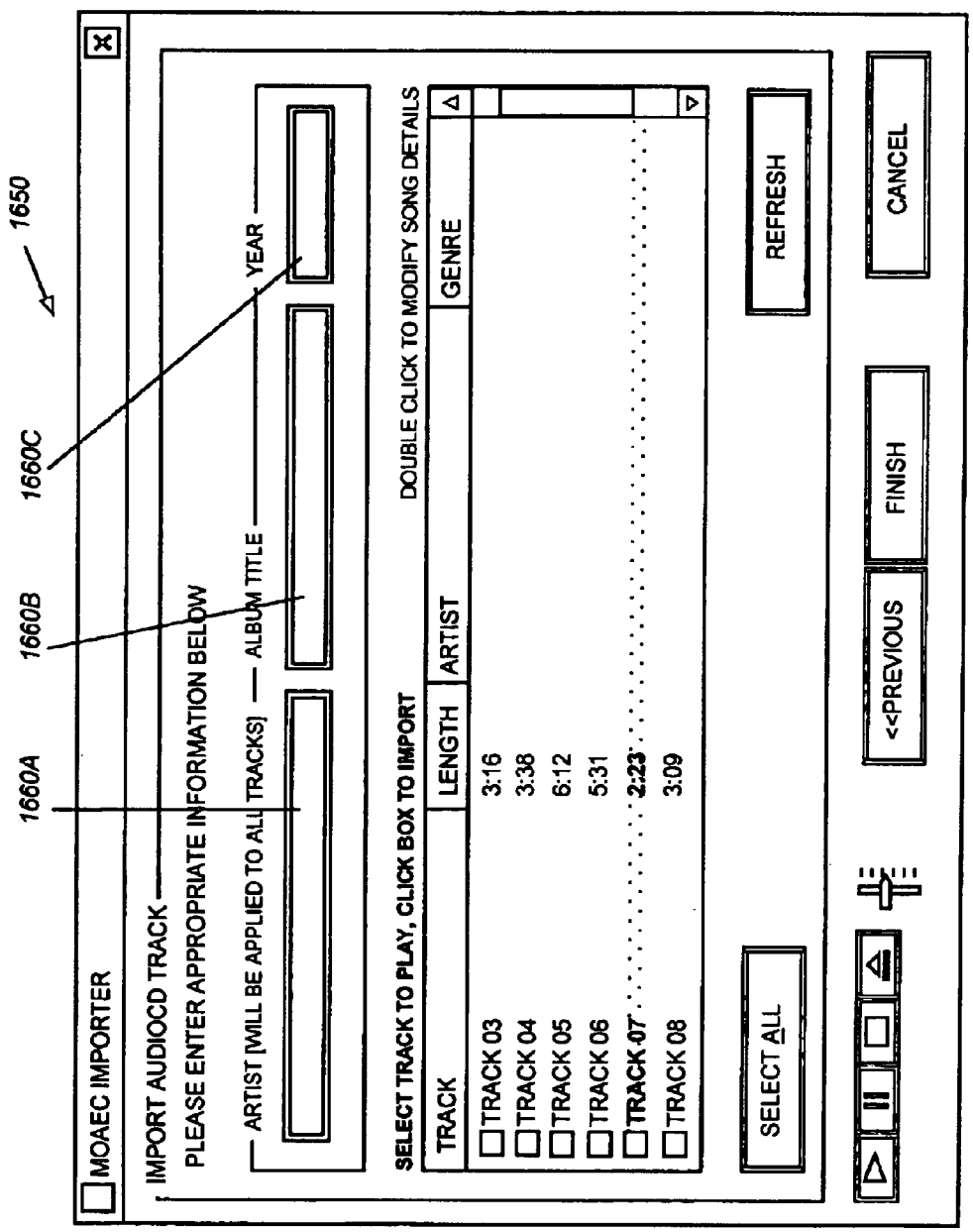
FIG. 42 is a plan view of the Music Import screen in a further mode.

If the system is not connected to the Internet, the information can be manually entered by the user. Rather than go from step 1606 to 1608, the program, an import screen 1650 such as shown in FIG. 42 will be displayed. The user can type in artist, album title, and year information in the spaces provided 1660 A–C for all tracks and double click on individual tracks to provide title, genre (main category) or artist in the same manner as step 1616 described above. The program 1600 then goes to step 1612 and continues in the same manner as when connected to the internet.

Figure 43:
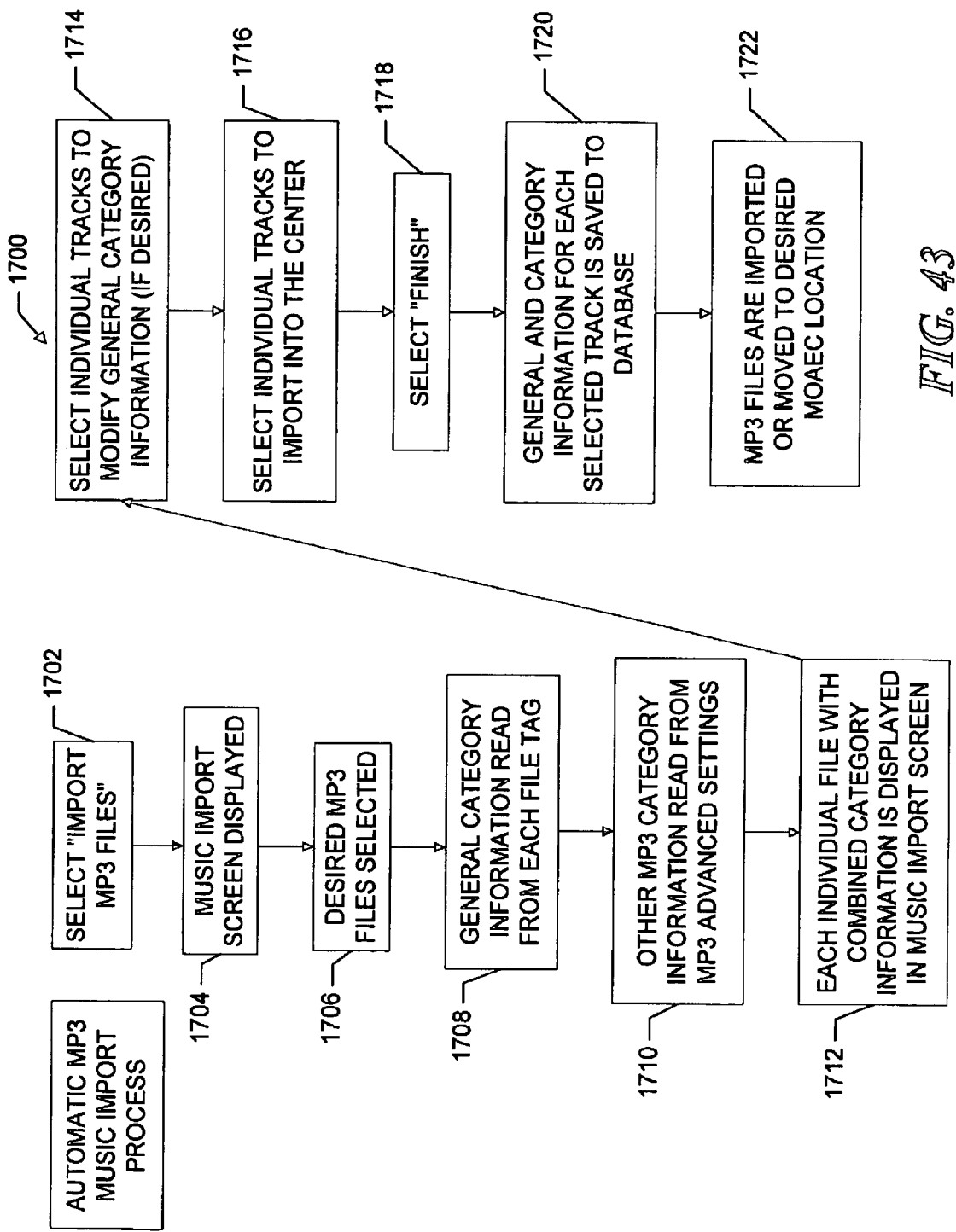
FIG. 43 is a schematic flow diagram illustrating a basic control path for the MP3 import process.
Figure 44:
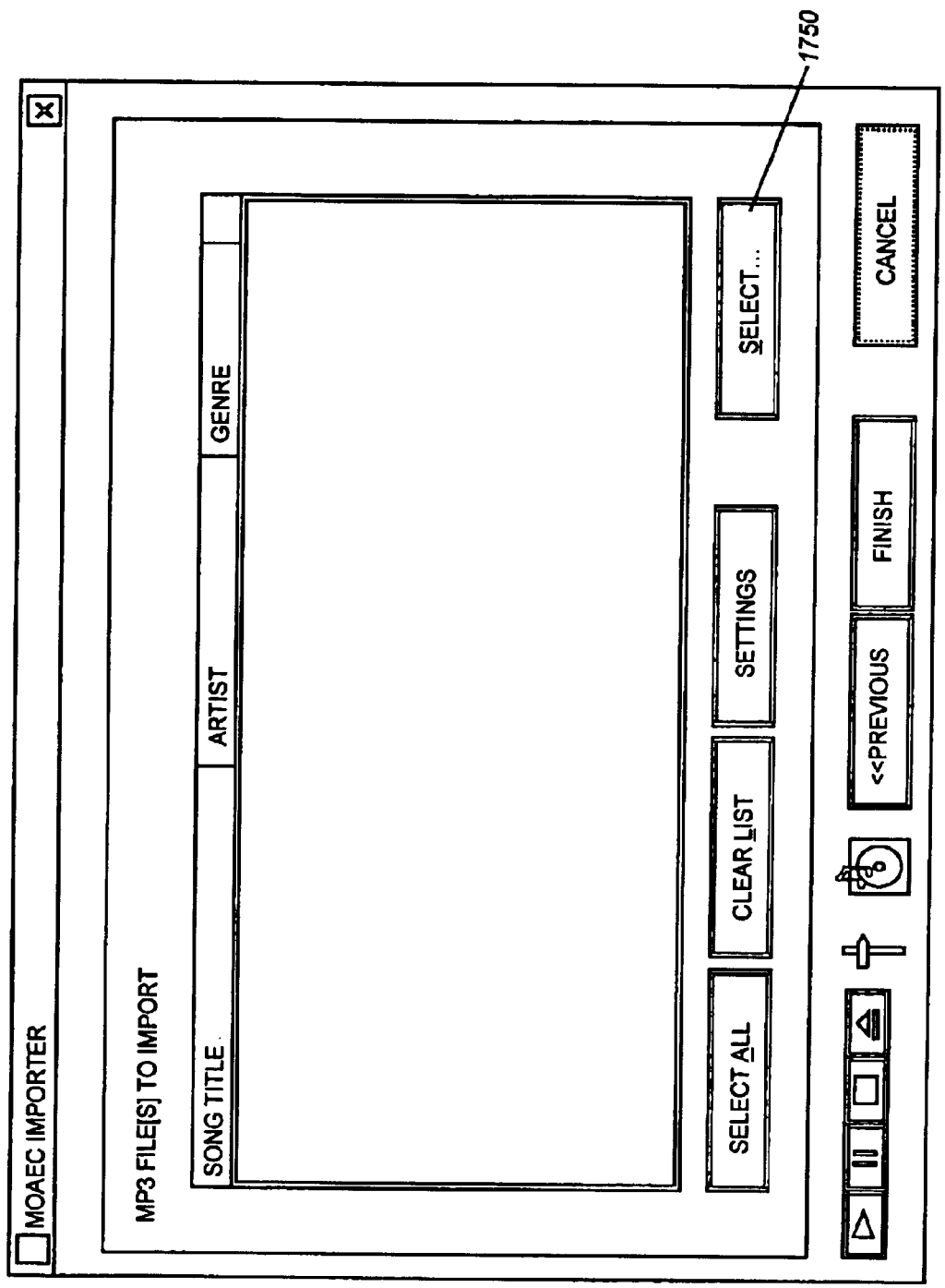
FIG. 44 is a plan view of the Music Import Screen in another mode.
Figure 45:
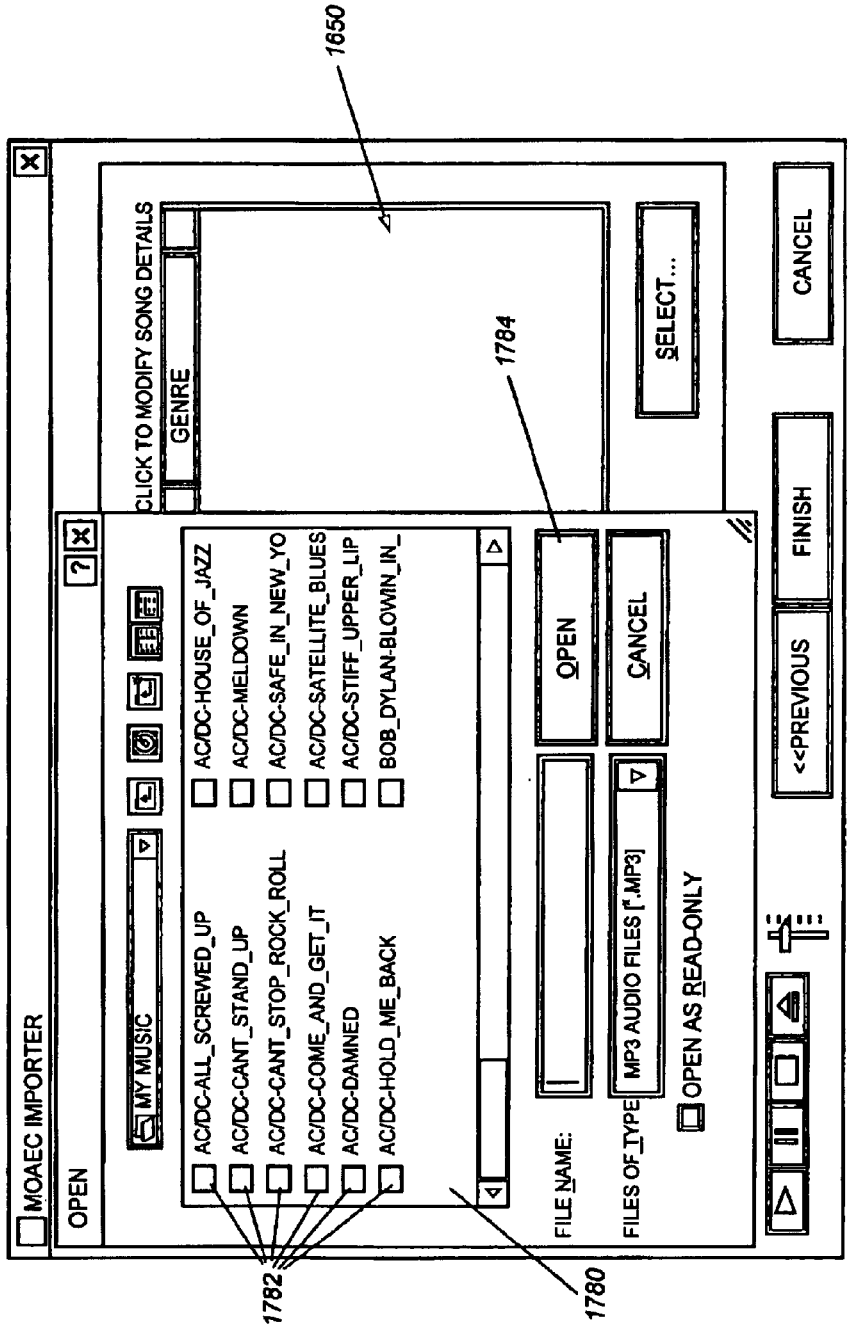
FIG. 45 is a plan view of a Music Listing Screen superimposed on the screen of FIG. 44.

The software 1270 also can import digital (i.e MP3. etc.) files already residing on the hard drive 1184 or other storage mediums such as flash sticks, etc. FIG. 43 illustrates a flow diagram of a digital MP3 importation process 1700. The user first clicks on the Import and Categorize button 1315 from the dropdown menu 1314 and then clicks on a MP3 Files button 1502 (FIG. 38) according to step 1702 which, according to step 1704, causes the Music Import screen 1650 in FIG. 44 to be displayed. By clicking on a select button 1750 the user causes the program to display, as shown in FIG. 45, a Music Listing Screen 1780 to be superimposed on the Music Import Screen 1650. The screen 1780 lists, according to step 1706, MP3 files 1782 of musical selections which can be selected to be imported by clicking an individual file 1782 and then clicking with the shift key depressed to respectively highlight individual and multiple MP3 files 1782 and then clicking on an open button 1784 which causes the program 1700 to read category information (step 1708) from an ID3 tag that is associated with each MP3 file including artist, title, year, genre. The import process 1700 then, according to step 1710, looks to see if the user has preset the values of any of the category information such as style, speed, year, main category, energy and insert these values to modify the values received from the offsite database. The user can preset these values by accessing an Import Options screen 1599, seen in FIG. 39A. The screen 1599 is accessed by clicking on the Program Settings routine button 1315E from the drop down menu 1314 (FIG. 31) and clicking on a "mp3 settings" button not shown and going to an advanced settings option on a screen (not shown).

Figure 46:
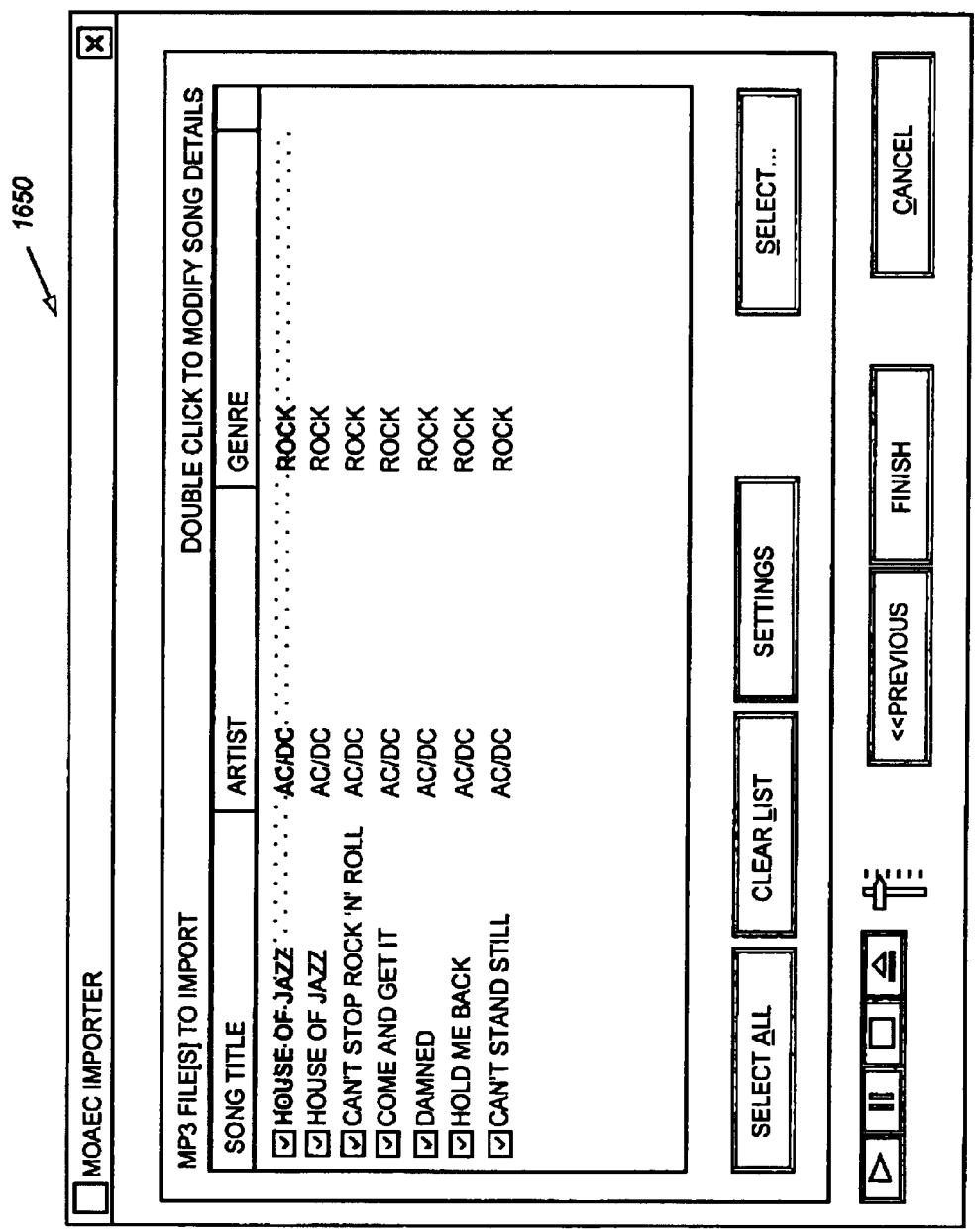
FIG. 46 is a plan view of the Music Import Screen in another mode.

According to steps 1714, 1716, 1718 and 1720, category information of the individual tracks may be modified. The tracks to be imported, according to steps 1714 and 1716, then may be selected in the same manner as with of steps 1616 and 1618 the CD import program 1600 steps 1616 and 1618. Once a Finish button 1754 is clicked (FIG. 46) (step 1620), the general and category information for each selected track is saved to the database 1220 and the MP3 audio files, are imported and have a pointer in the database 1220 pointing to their location according to step 1722.

Figure 47:
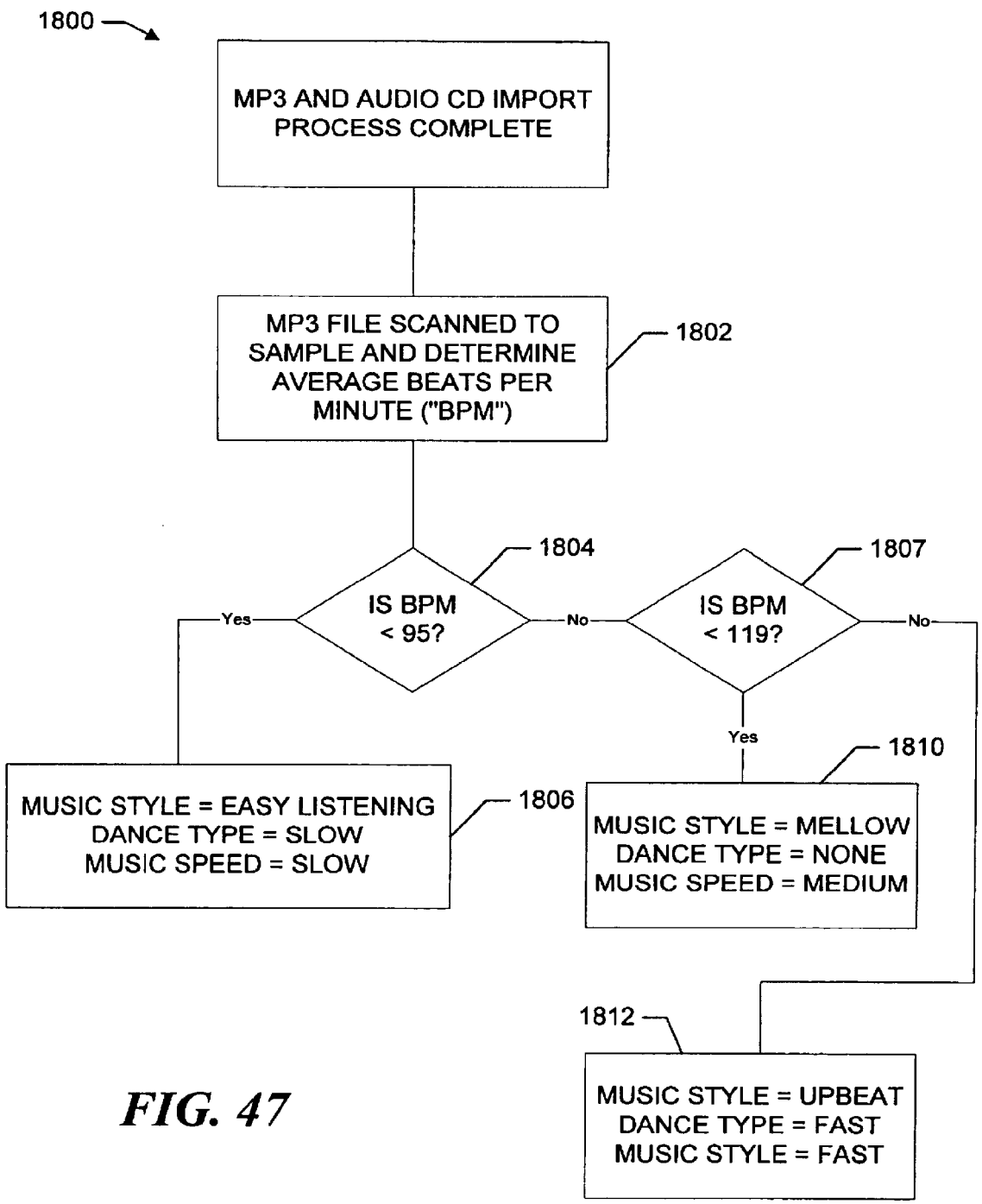
FIG. 47 is a schematic flow diagram illustrating a basic control path for the Automatic Music Style, Music Speed and Dance Type Categorization Program.

Once the Music Import Process for Audio CD's and MP3 Files have been completed, the importation and categorization software 1270 can automatically determine music style, dance type and music speed based upon a beats per minute determination for each individual musical selection. FIG. 47 illustrates an automatic music style, music speed and dance type categorization process 1800.

Figure 48:
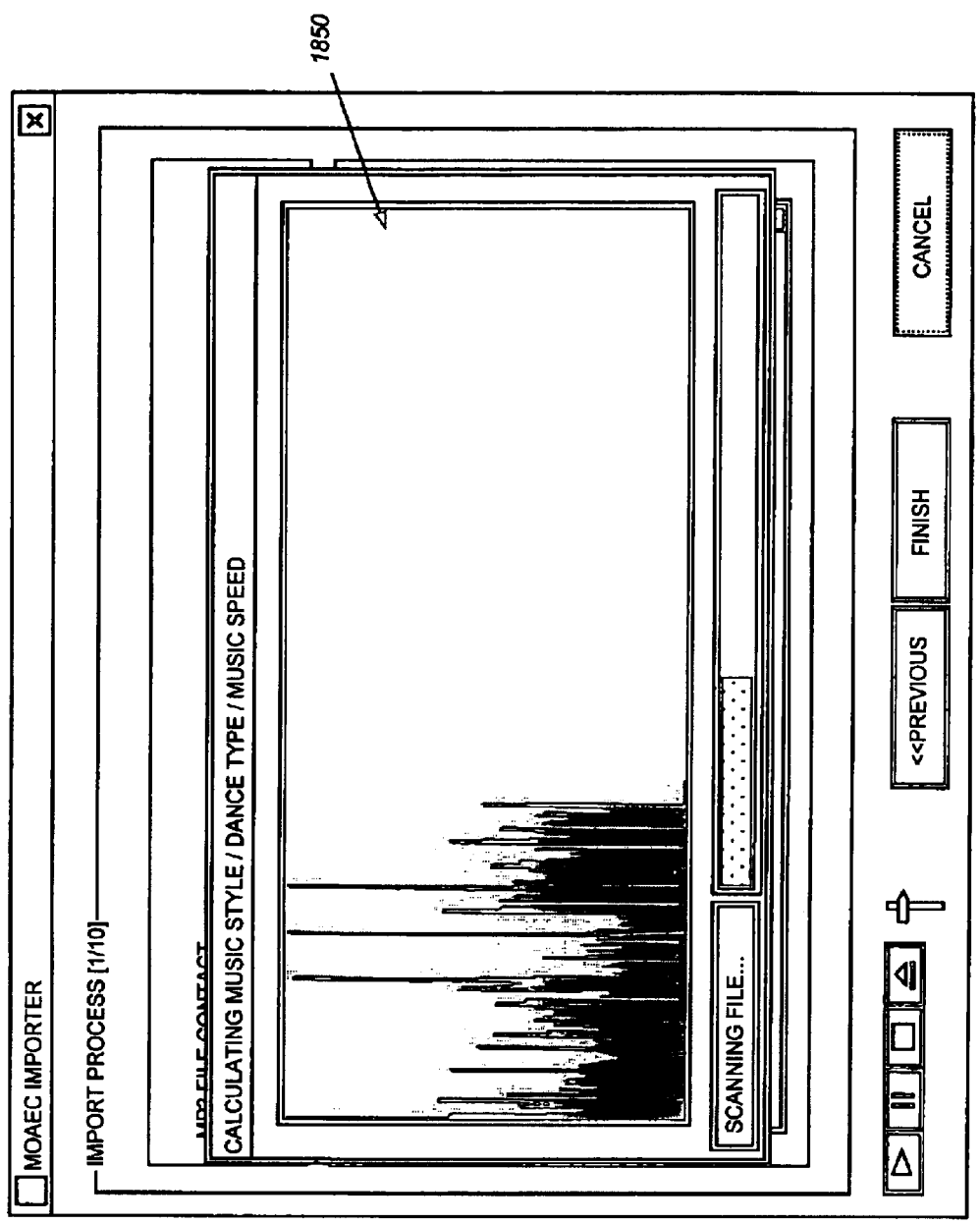
FIG. 48 is a plan view of a Scanning screen superimposed on the Import Screen of FIG. 41.

After encoding an audio CD to a digital (i.e. MP3, etc) file, or after a song is in a digital file (i.e. MP3, etc.) format, each song according to step 1802 is played in real time and sampled in three locations for a given time period, such as, 10 seconds. FIG. 48 illustrates a scanning screen 1850, superimposed over the Import screen 1650, which is displayed when the MP3 file is played and sampled according to step 1802. The three separate samples are used to obtain an initial data element summary of volume ratings. The settings are defaulted to a total sample of 30 seconds per song. (Other total sample lengths, such as 15, 30, 45, 60 seconds per song, could also be used). Each data element in the scanned sample has a volume rating between 0 and 255, 0 being the softest volume and 255 being the loudest volume. The entire thirty second sample is then smoothed using a fast fourier transform mathematical algorithm designed by Cooley and Tukey and described in a paper they wrote "An algorithm for machine calculation of complex Fourier series", Math. Comp. 19 (1965), 297–301, which is hereby incorporated by reference. The algorithm is used to clean the data to make it more accurate and usable to work with.

All data elements in the sample are totaled to attain a total average of volume level information. (A data element is a value representing a volume level). The average of the data elements is used as a baseline to determine peaks and valleys. A peak is based on a volume level above the calculated average. A valley is based on a volume level below the calculated average. Beats are determined based on valid peaks. One beat equals one valid peak. A valid peak is the highest point above the baseline after a valid valley. A valid valley is the highest point above the baseline after a valid peak.

Once the beats per minute ("bpm") of the sample is determined. The program 1800 (FIG. 47) determines if the bpm is less than 95 (step 1804). If so, the program assigns (step 1806) a music style of "easy listening," a dance type of "slow" and music speed of "slow." If the bpm is not less than 95, the program 1806 determines the bpm is less than 119 (i.e. the bpm is between 95 and 118) (step 1808). If so, the program assigns (step 1808) a music style of "mellow," a dance type of "none" and a music speed of "medium." If the program determines that the bpm is not less than 119, it assigns (step 1812) a music style of upbeat, a dance type of "fast" and a music speed of "fast." Each of the assigned values is saved to the database 1220 for the scanned musical selection.

It is understood that different bpm values (i.e. not 119 or 95) could be used to determine the music style, dance type and music speed. Additionally, as discussed later, the music style, dance type and music speed values can be user edited with a song editor to suit the user's taste.

It is contemplated that the importation process 1800 can be used to authenticate that the media being imported to the center is authentic. By comparing the peak and valley scans to, for example, scans resident on a database for original works, the user can tell if he is receiving an authentic version of the media he is importing.

Figure 49:
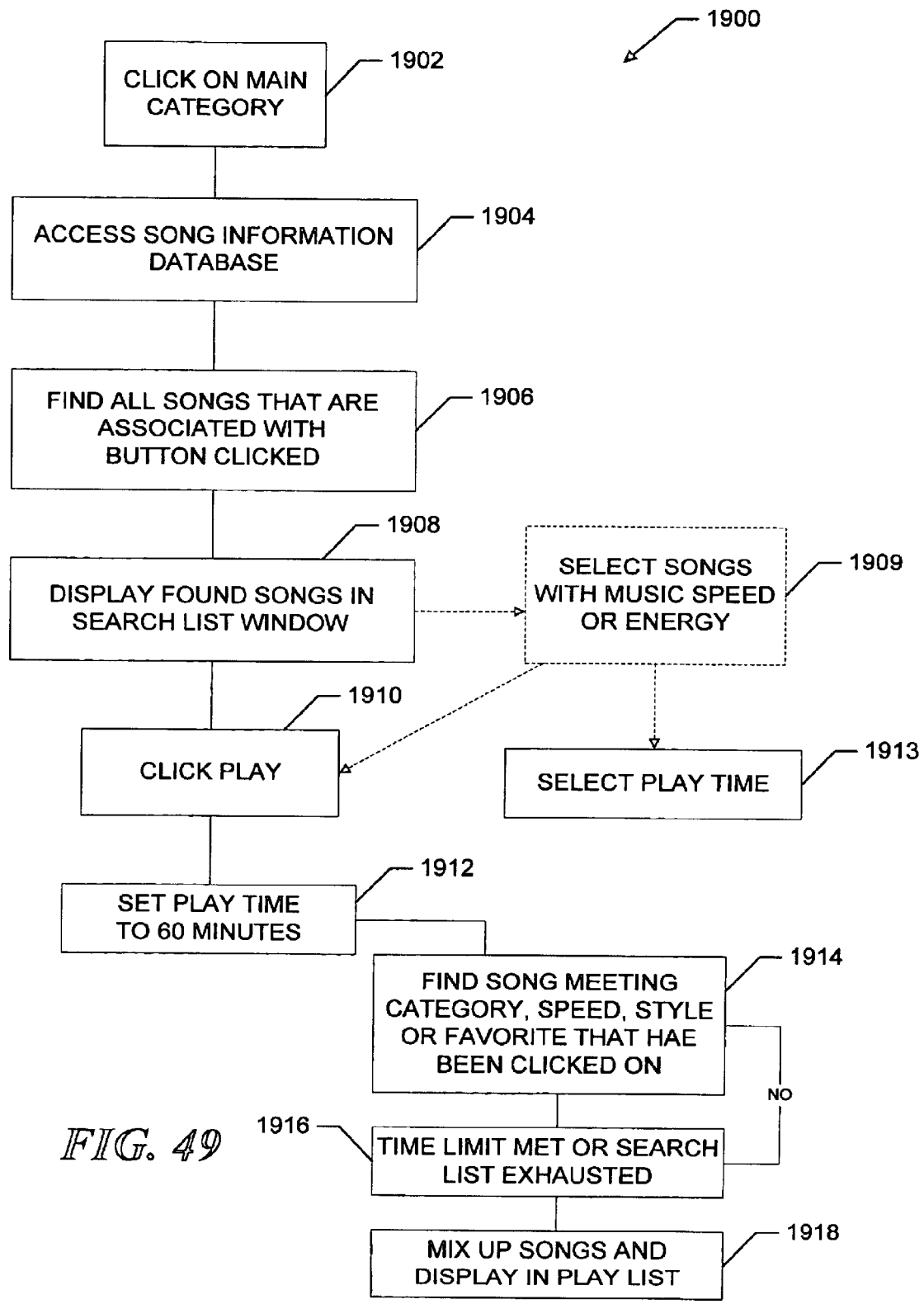
FIG. 49 is a schematic flow diagram for a search routine.
Figure 51:
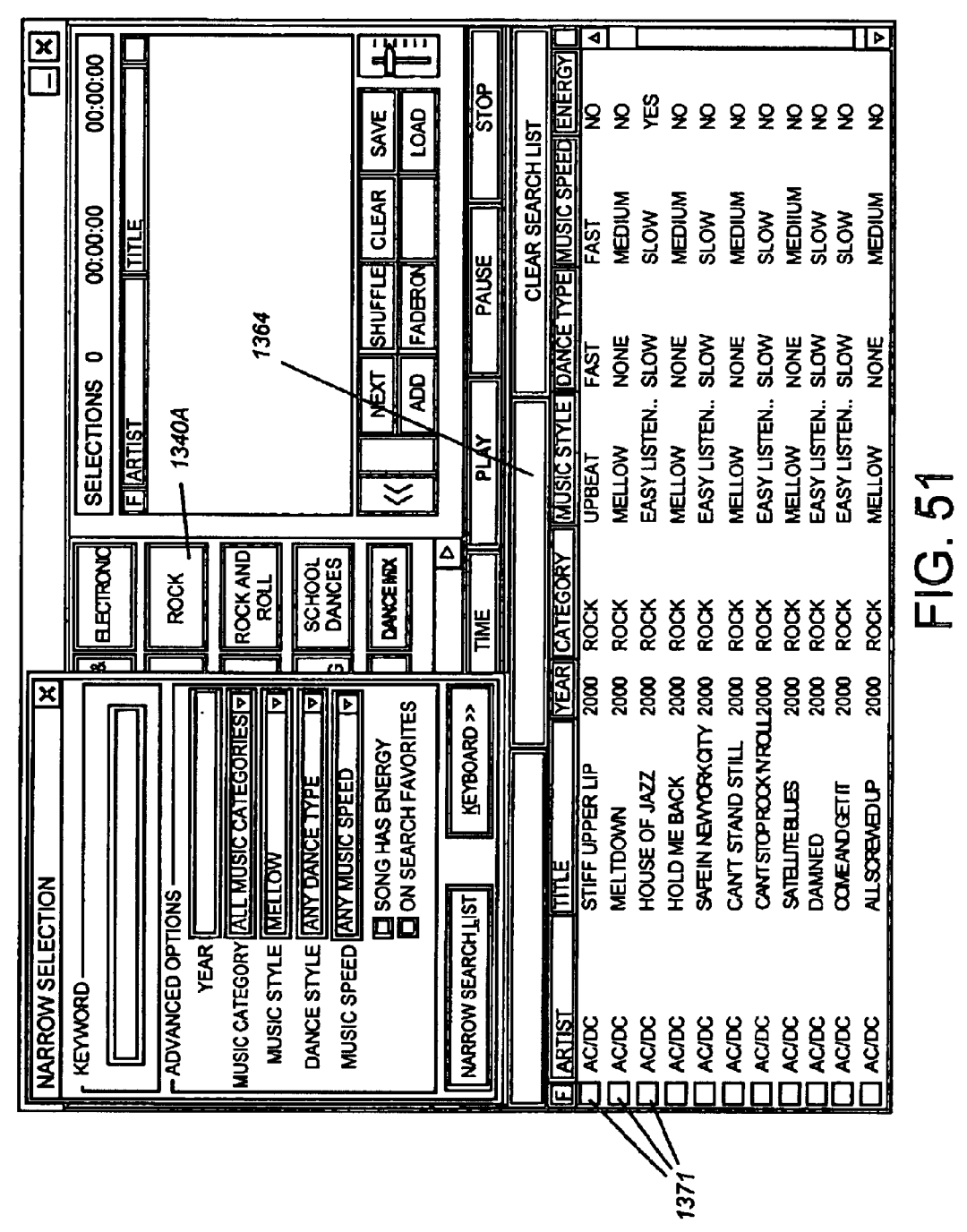

The musical selections which have been imported to the center 1000 can be searched, organized and played back in a variety of methods. FIG. 49 details a user operation search routine 1900. Referring to FIG. 31 and according to step 1902, a user clicks on one of the main category buttons 1340, one of the mood buttons 1350, the dance music button 1351 or the favorites button 1352. The routine 1900 then accesses the information database 1220 and finds all selections associated with the button clicked, according to steps 1904, 1906, 1908. All selections found are displayed in the Searchlist window 1370. For example, as seen in FIG. 51, when the Rock category button 1340A is clicked on, all media/data categorized as ROCK are displayed in the search list window 1370. If the play button 1360A is clicked on, according to step 1908, all media/data selections in the search list window 1370 (if their total playtime is less than 60 minutes) or media/data selections in the search list window 1370 which take up approximately 60 minutes of play time are mixed up and displayed in the play list window 1380 for immediate play.

Instead of clicking the play button 1360A, the Time button 1358 can be clicked, which causes a drop down menu and an OK button (not shown) listing various play times. The desired play time can be clicked on by a user according to step 1913 and media/data from the play list 1370 that add up to the approximate desired time will be displayed in the play list window 1370 for immediate playback.

The mood button 1350, the dance mix button 1351 and the favorite button 1352 are preferably rainbow colored and can include media/data from any main category. The upbeat, mellow, and easy listening mood buttons 1350 allows a user to create a mood or atmosphere by bringing up all media/data selections respectively categorized as having upbeat, mellow, or easy listening styles.

Clicking on the favorites button 1352 allows the user to play all media/data selections he has characterized as a favorite (by a method discussed further below).

Clicking on the dance mix button 1351 brings all selections characterized as having a slow or fast speed to the search list window 1370. Using the play button 1360A or the time button 1358 to play these selections as described above, randomly causes media/data to be placed in the playlist window 1380 so the media/data will continuously be played in the order of three fast and two slow for the selected time period.

The user may, as seen in FIG. 49, narrow the media/data selections already found and displayed in steps 1906 and 1908 to have a certain speed or energy by optionally clicking on one of the fast, medium, or slow speed buttons 1354 or an energy button 1356 which will respectively cause only the media/data selections categorized as fast speed, medium speed, slow speed or as having energy to be placed in the play list window for play when the user clicks on the play button 1360A or time button 1358, as discussed above.

Figure 50:
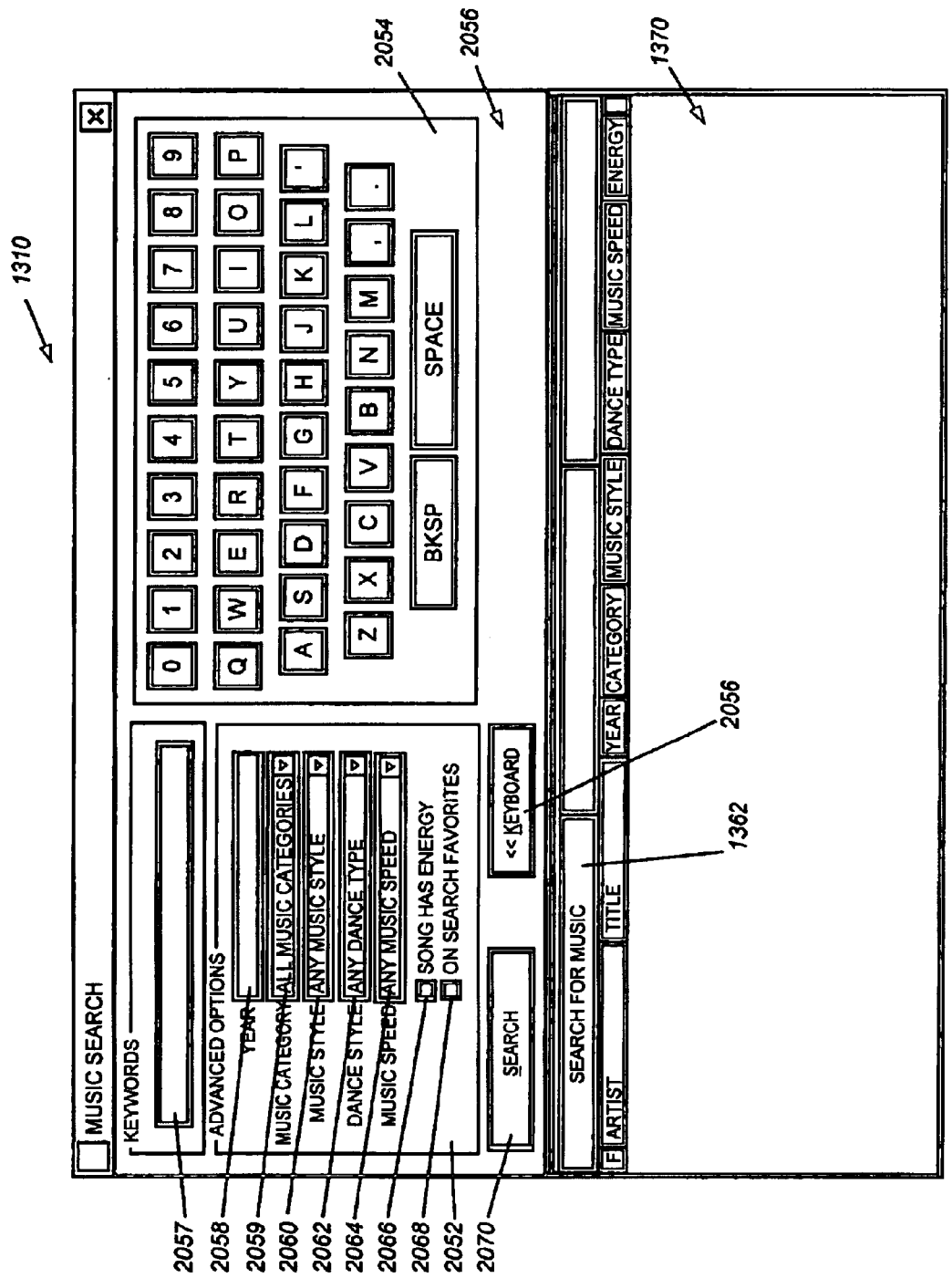
Figure 53:
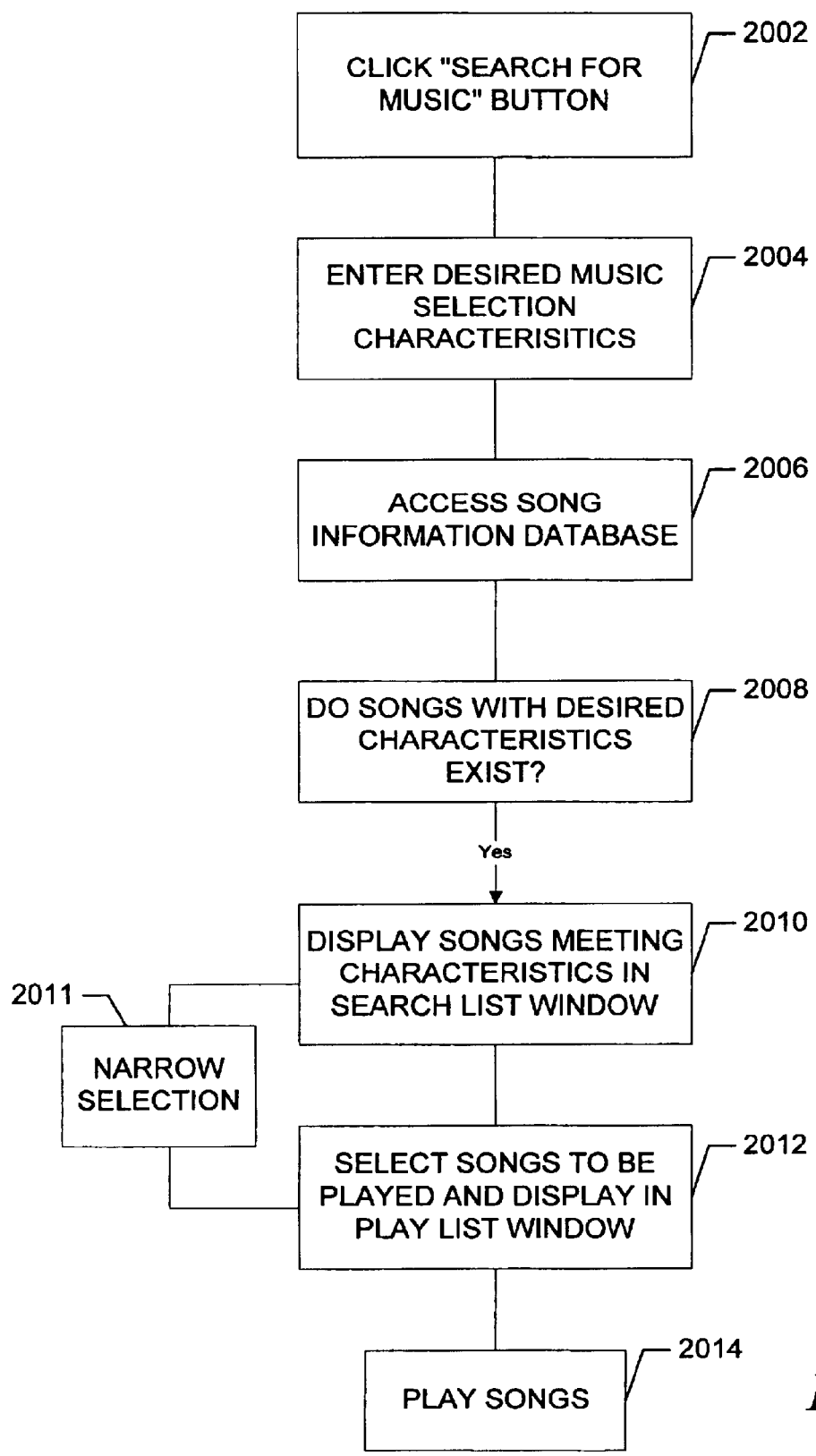
FIG. 53 is a schematic flow diagram for an alternate search routine.

FIG. 53 details an alternative user operation search routine 2000. Referring to FIG. 50 when the user clicks on a search button 1362 on screen 1310, according to step 2002 which causes a search screen 2050 to be superimposed on screen 1310. The screen 2050 includes a search area 2052 and a hideable touchscreen keyboard 2054, accessible and hideable by clicking on a keyboard button 2056. (Typing may be performed on the keyboard 2054 or the keyboard 1134 in search routing 7000).

According to step 2004, the user may type in a keyword or a year in spaces 2057, 2058, select from main categories, style, type and speed from drop down menus 2059, 2060, 2062, and 2064 and may choose whether the media/data selection has energy or is a favorite by respectively clicking on boxes 2066, 2068.

After the search criteria has been input to screen 2050 and a search button 2070 is clicked on by the user, the program 2000 accesses the Info Database 1220 and determines if media/data selections with the entered characteristics exist according to steps 2006–2008. If the media/data selections exist, their title, and other information are displayed (step 2010) in the search list window 1370. The media/data selections in the search list window 1370 may be further narrowed according to step 2011, as discussed below, or may be selected and placed in the playlist window 1380 (step 2012) for play by double clicking on a selection in the search list window 1370 or highlighting and dragging the selection into the play list window 1380. Clicking the play button 1360A will cause the selections in the play list window 1380 to be played (step 2014).

Figure 54:
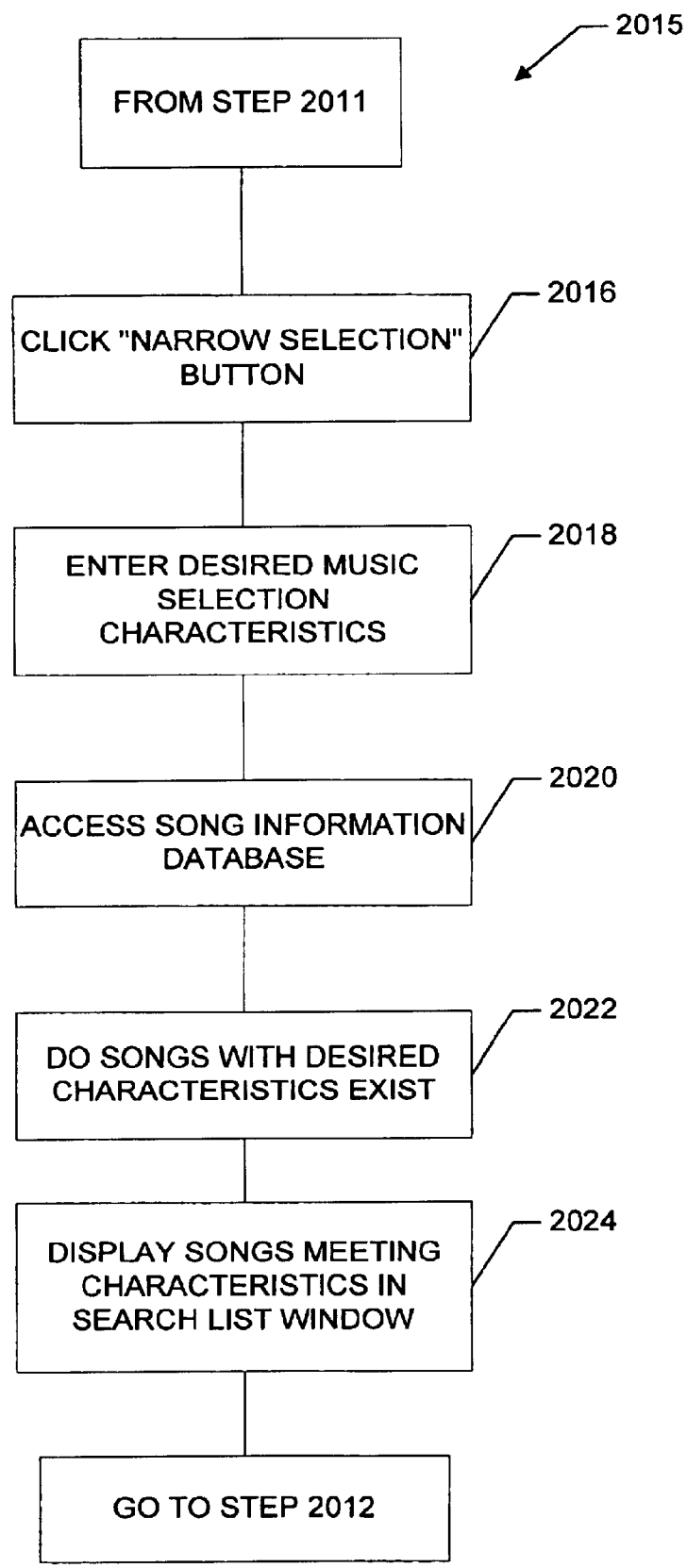
FIG. 54 is a schematic flow diagram for a narrowing search routine.

If the selections in the list are too voluminous in step 2010 (FIG. 53), the user may invoke a narrowing routine 2015 shown in FIG. 54. The user narrows the selections by clicking on the "Narrow Selections" button 1364 (FIG. 51) from screen 1310 (step 2016). This causes a narrow search screen 2100 similar to Search Screen 2050, to be superimposed on screen 1310 (FIG. 51). The screen 2100 has a search area 2102 and a hideable touchscreen keyboard (not shown) similar to keyboard 2054. The search area 2102 includes the same searchable characteristics as the Search Screen 2050 (and will not be further discussed). The user narrows the search by entering the characteristics (step 2018) in the same manner as step 2004 and clicking on a Narrow Search List button 2090 which accesses the information database 1220 (step 2020) which determines if the media/data selections already displayed in the search list window 1370 has the desired characteristics (step 2022). If media/data selections meeting these characteristics exist, they are displayed in the search list window replacing the media/data listed prior to the narrowing search (step 2024).

Figure 52:
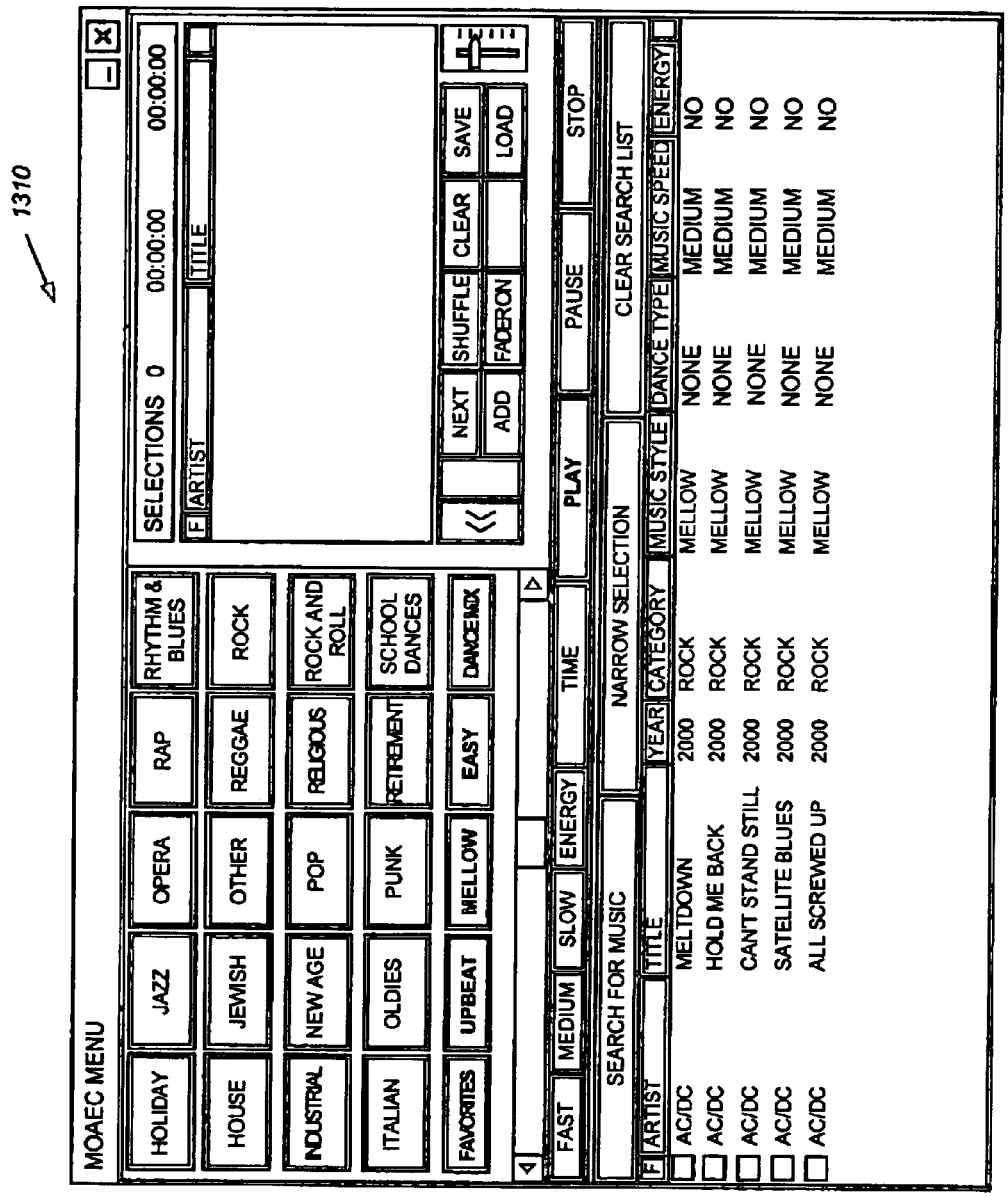

For example, the search list window 1370 in FIG. 51 includes media/data found when the main music category "Rock" was searched. When a "Mellow" style is used to narrow the search, only those (four) selections which have a "Rock" main category and a "Mellow" style are displayed in window 1370 (FIG. 52). The user then can select and play the media/data selections according to steps 2012 and 2014 of routine 2000.

The center 1000 also advantageously allows the user to edit media/data selection information (including category information) in the database 1220 (after is has already been imported and categorized) according to the user's tastes. The information can be updated via several methods.

Figure 55:
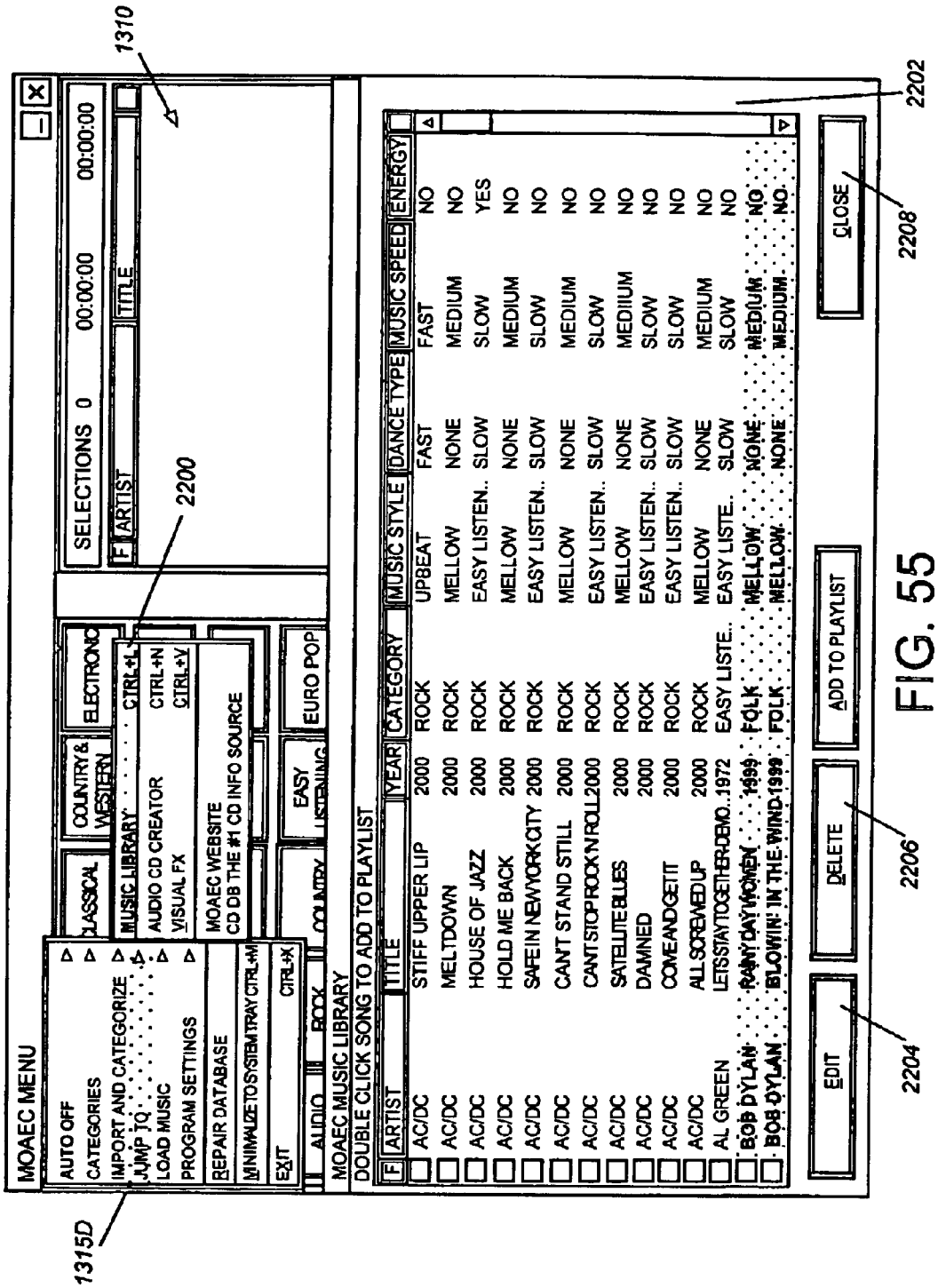
FIG. 55 is a plan view of the screen of the Search and Play Main Interface Screen with a Music Library Screen superimposed with a Music Library screen superimposed thereon.
Figure 56:
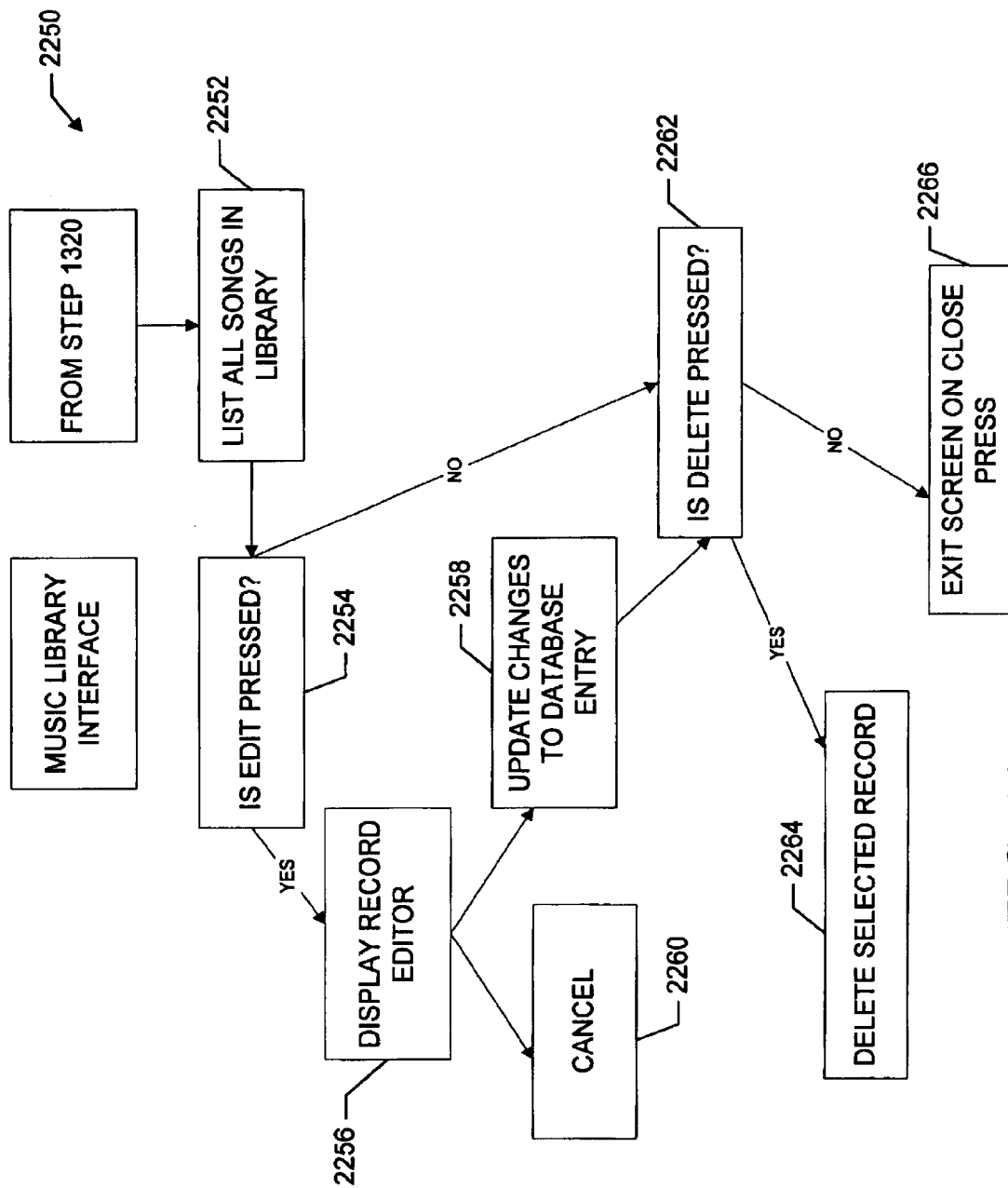
FIG. 56 is a schematic flow diagram for interfacing with the music library and editing the song information database.
Figure 57:
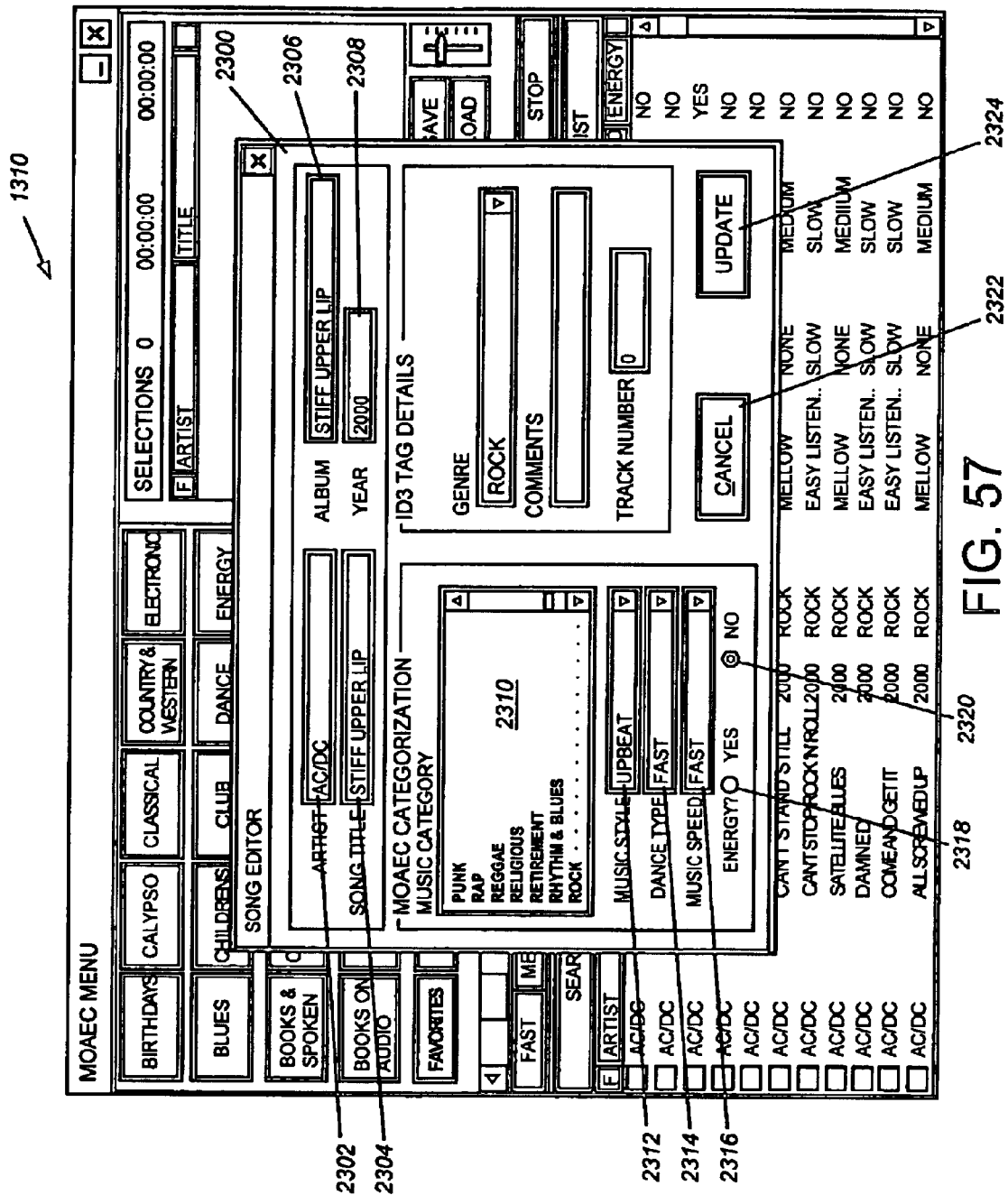
FIG. 57 is a plan view of a song editor screen superimposed on a Search and Play Main interface.
Figure 58:
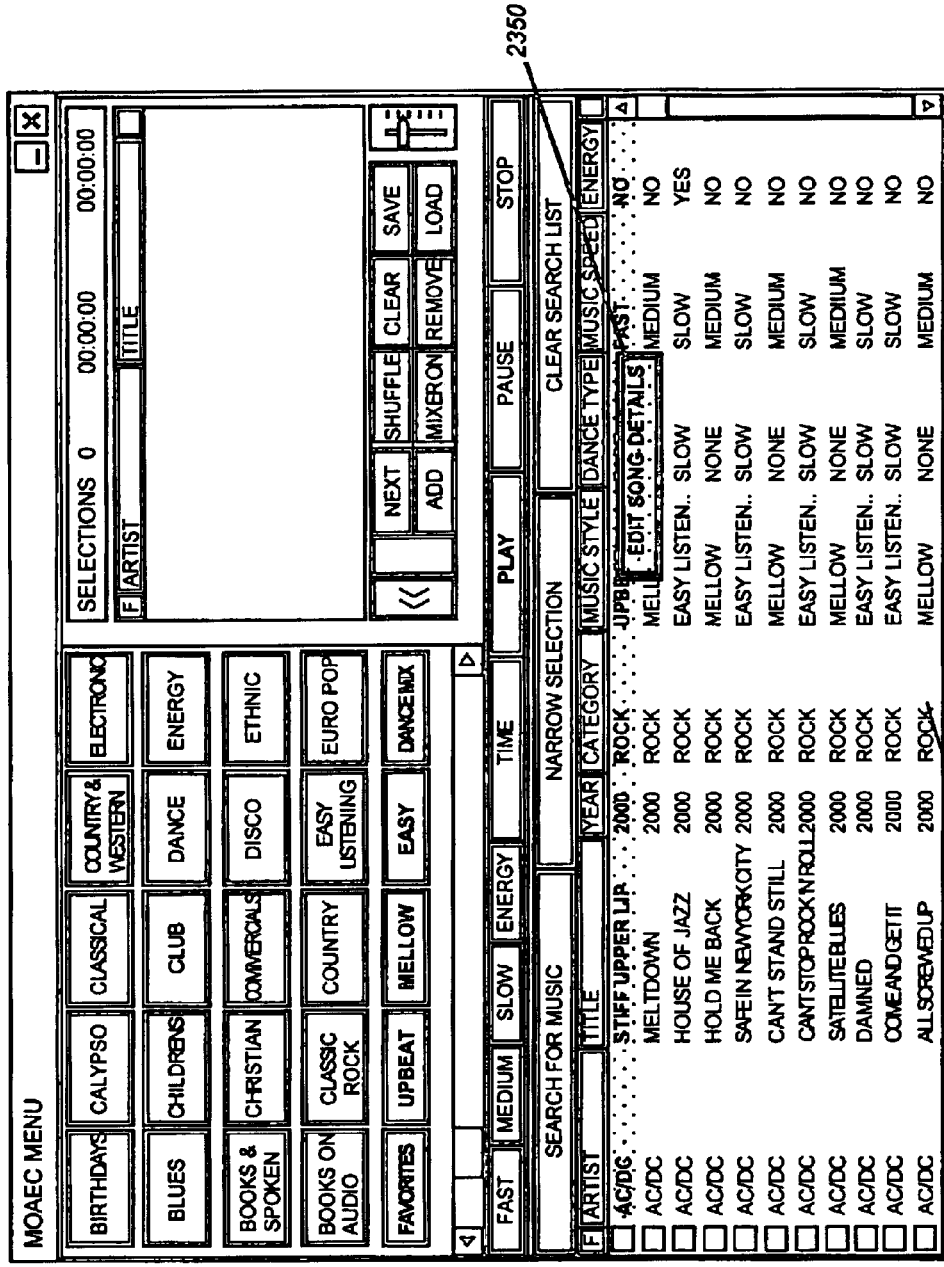
FIG. 58 is a plan view of a Search and Play Main Interface screen, illustrating a song information editing interface.

Referring to FIG. 30, if the user selects the jump option, (step 1320) and clicks on Jump To button 1315D and then clicks on Music Library button 2200 (FIG. 55), a Library Screen 2202 will be displayed. FIG. 56 illustrates a Music Library and Editing routine 2250. Once the music library button 2200 is engaged, all the media/data referred to in the database 1220 are listed according to step 2252. (The files containing the raw digital media/data are preferably kept on the hard drive storage 1190, but it is contemplated that the media/data files could reside on a storage device at a remote location.) Media/data selection information is edited by highlighting media/data file and then clicking on an edit button 2204 which superimposes an editor screen 2300, as seen in FIG. 57, with the information regarding the highlighted media/data selection (step 2256). The editor screen 2300 allows a varierty of categories to be edited, such as the artist, album, title, and year, etc. to be edited in boxes 2302, 2304, 2306 and 2308. The main category, style, type and speed can be modified by clicking on the appropriate characteristic listed in drop down menus 2310, 2312, 2314 and 2316. Additionally, the media/data selection can be categorized as having or not having energy by clicking on yes or no circles 2318, 2320. If an update button 2322 is engaged, the changes regarding the media/data selections are made to the database. If a cancel button 2324 is engaged, the editor screen 2300 is exited according to step 2260. The editor screen 2300 can also be accessed by the user, as seen in FIG. 58, by highlighting the media/data selection in the search list window 1370 by right clicking and then clicking on an edit details button 2350.

The Music Library interface also allows the user to delete records from the database by highlighting the media/data selection to be deleted in the Music Library Screen 2202 and pressing a Delete Button 2206 (FIG. 55) according to steps 2262 and 2264. The Music Library screen 2202 is exited when a close button 2208 is engaged (FIG. 55) according to step 2266.

Media/data selection information may also be edited by clicking on a favorites box 1317 next to a media/data selection description (FIG. 51) to place or remove a checkmark therein, when the media/data selection is displayed in the music library screen 2202, the search list window 1370 and/or the play list window 1380. When a check mark is placed in the box, the user has made the media/data selection a favorite, and this characteristic can be searched for, as described above.

Figure 59:
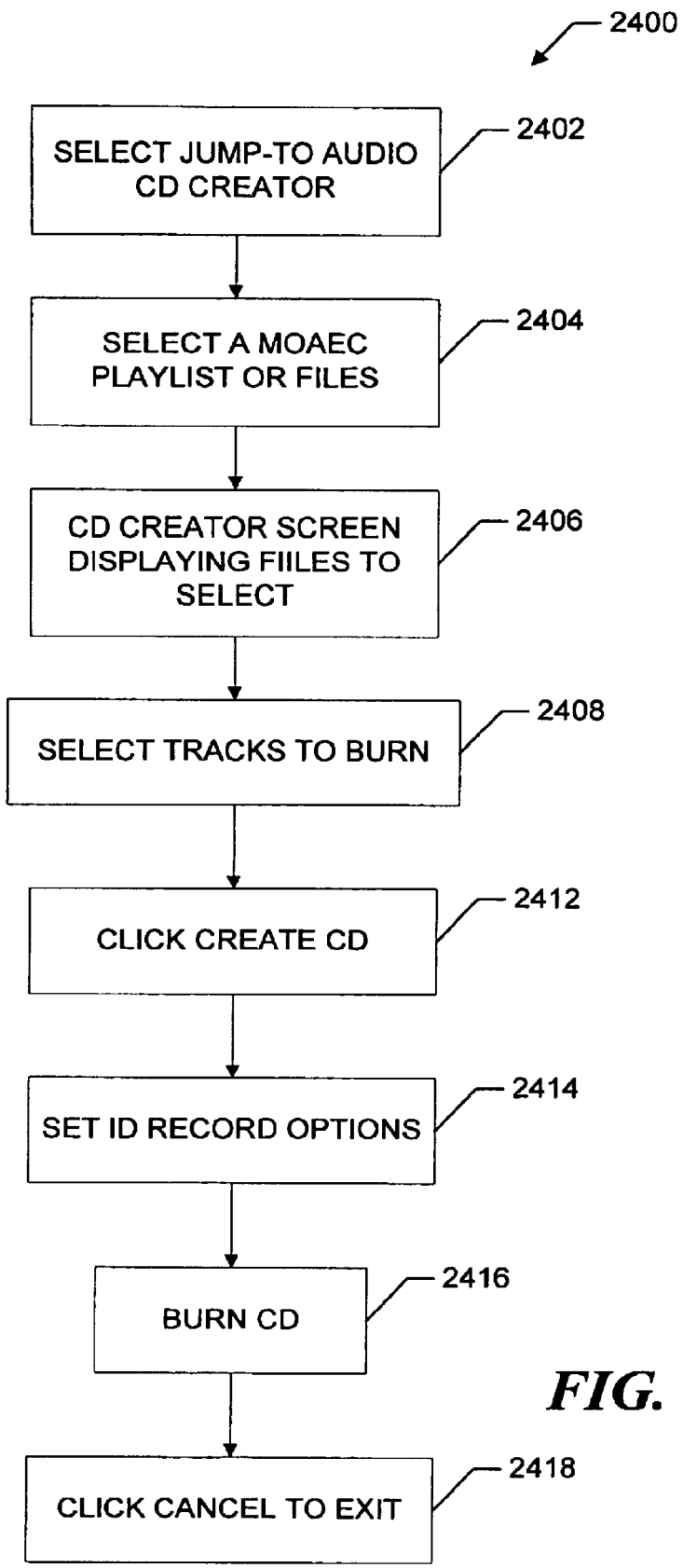
FIG. 59 is a schematic flow diagram illustrating an audio CD create routine.
Figure 60:
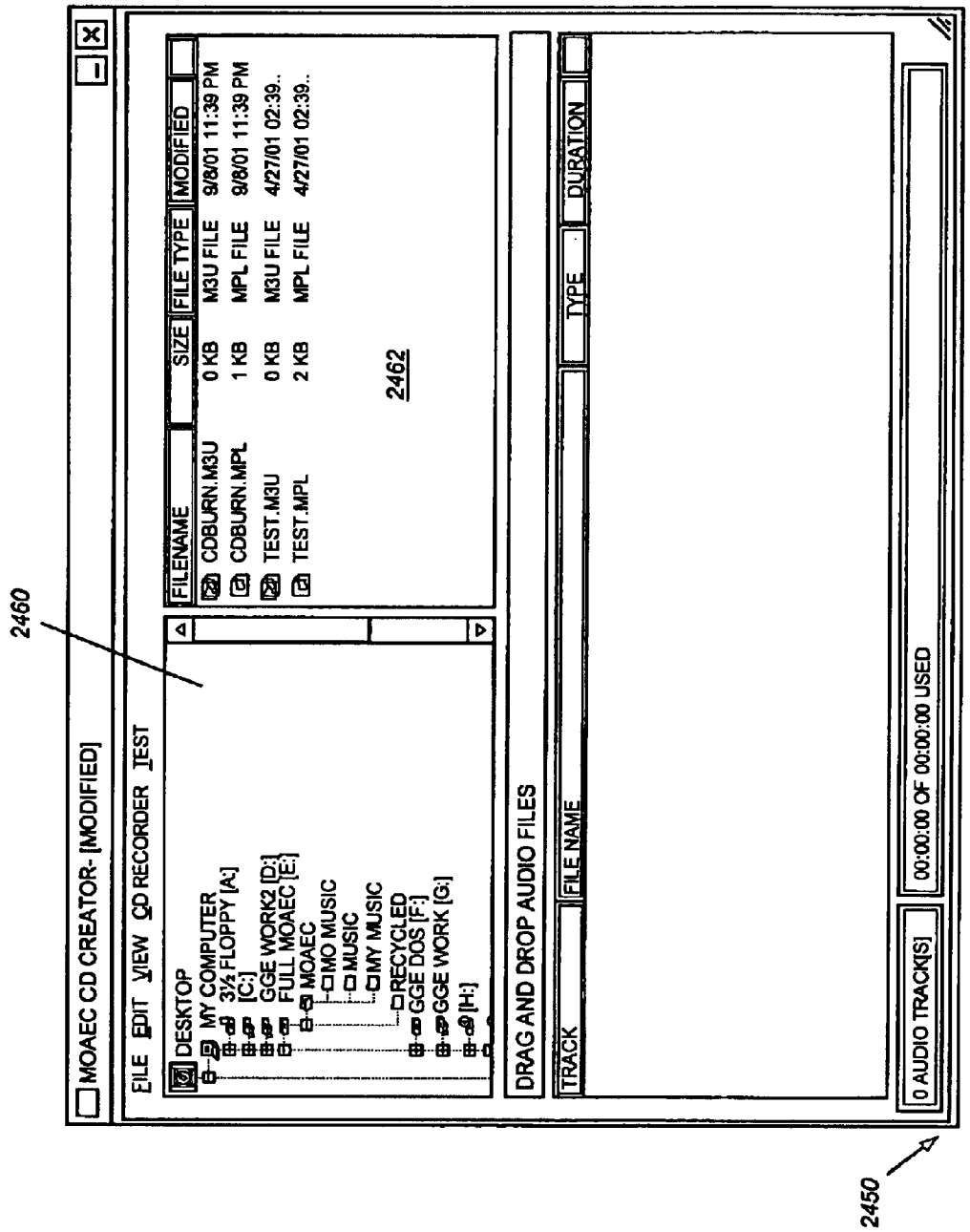
FIGS. 60 and 61 are plan views of a CD Creator screen.
Figure 61:
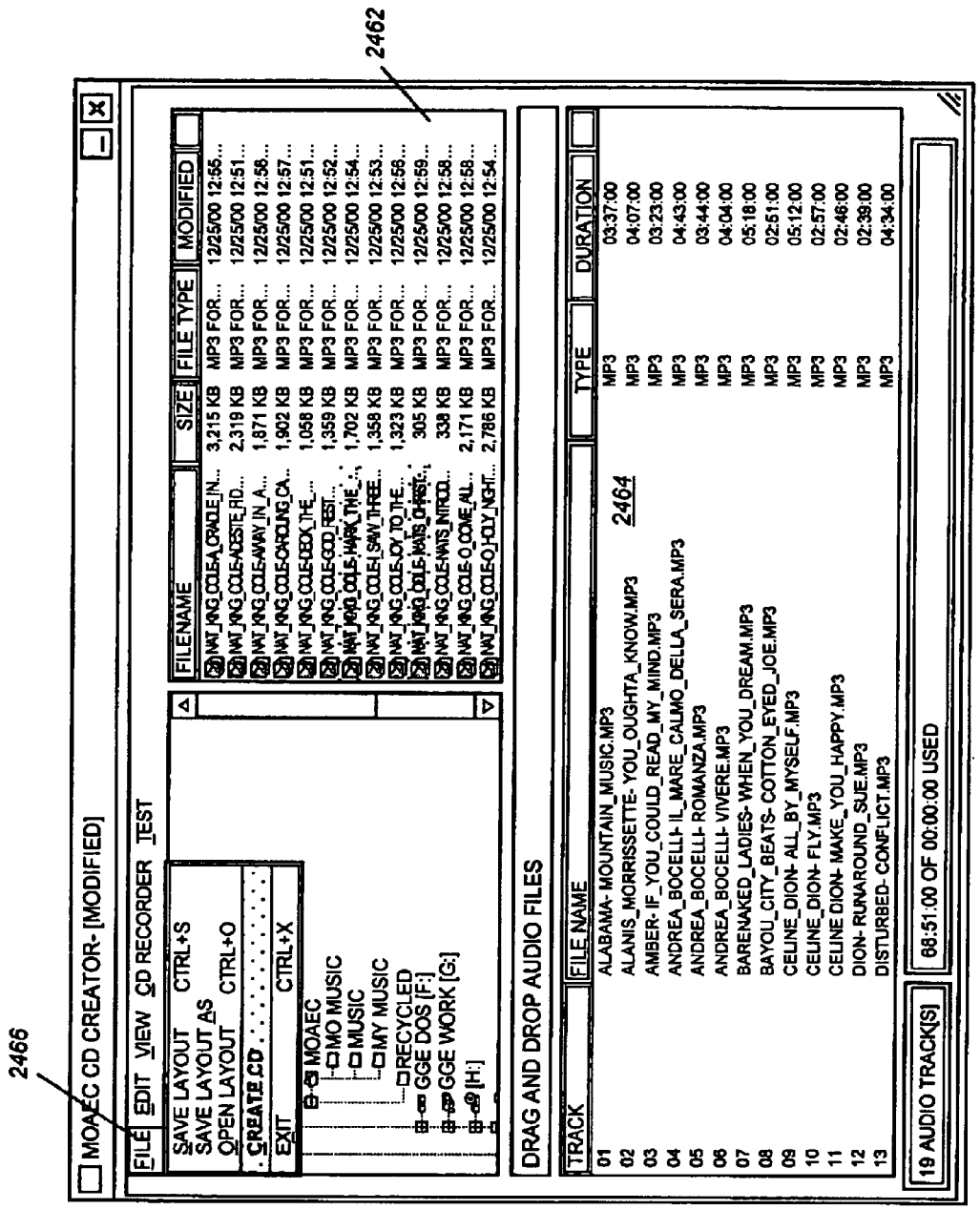
Figure 62:
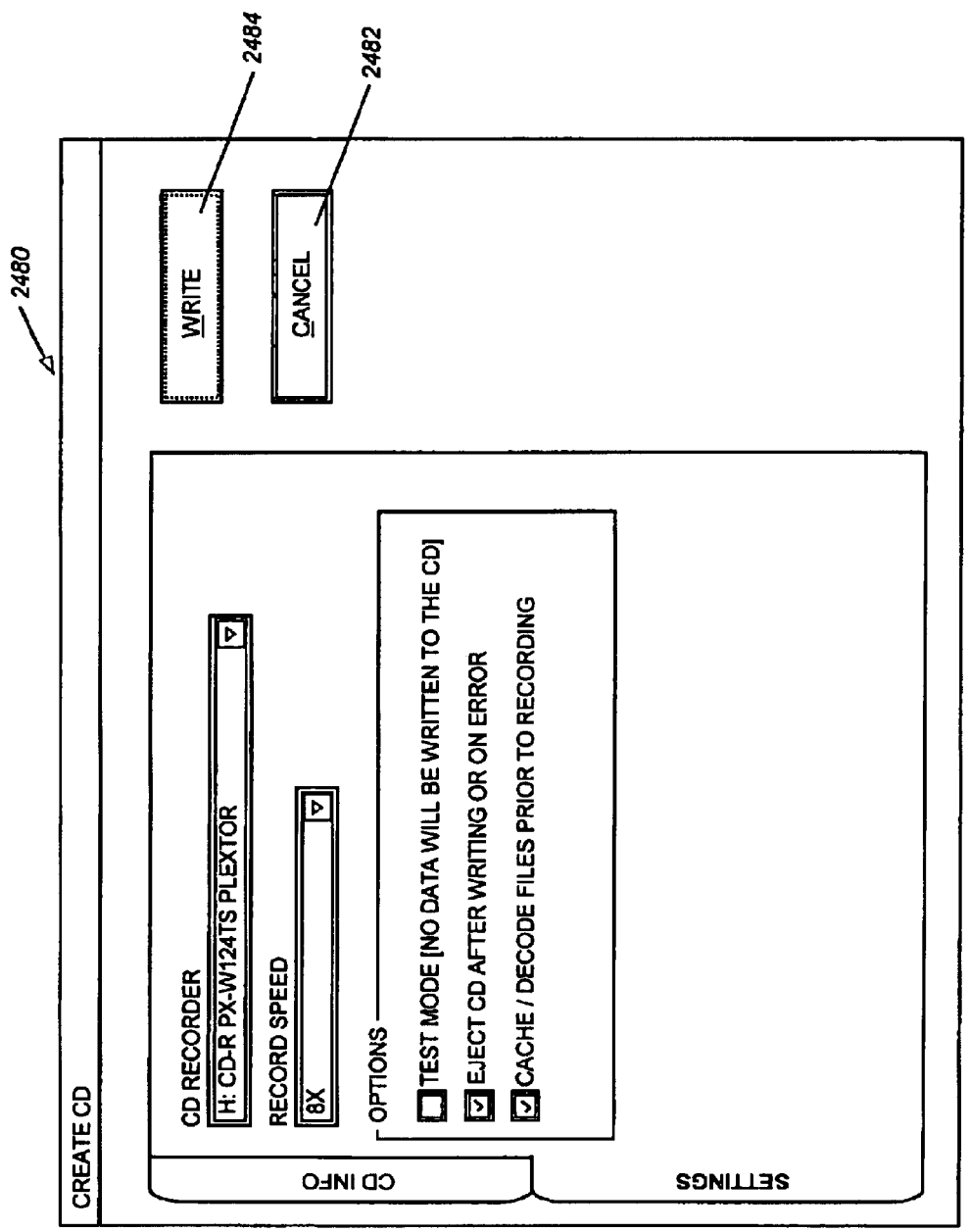
FIG. 62 is a plan view of a Create CD screen.

The center 1000 also allows you to create or burn organized or unorganized selections to an audio CD or digitally formatted CD (i.e. MP3, etc.). FIG. 59 illustrates an audio CD creator routine 2400 from the software 1240. From the drop down menu 1314, the "Jump To" button 1315D is clicked on, and then the "Audio CD Creator" button is clicked on (see FIG. 55) according to step 2402. This causes a CD Creator Screen 2450, as seen in FIG. 60, to be displayed listing any media/data file folders containing play lists or individual song located on the storage 1190 to be displayed in a file section 2460 of screen 2450. The user, according to step 2404, selects a media/data/play list or file by clicking on a folder. This causes, according to step 2406, all the files in the folder to be displayed in a Select File area 2462 of screen 2450. FIGS. 60 and 61 respectively illustrate a list of playlists and a list of individual songs displayed in area 2462 when a respective folder was clicked on. According to step 2408, a user can highlight and drag the playlist into a burn list area 2464 of screen 2450 which causes all the songs in the playlist to be listed in area 2464; or, as seen in FIG. 61, when area 2462 displays individual songs, the user drags and drops each song he wishes to burn into area 2464. The user then clicks on a files button 2466 which causes a drop down menu 2468 to be displayed. When the user clicks on a Create CD button 2470, a Create CD screen 2480, as seen in FIG. 62 is displayed. From screen 2480, the user can set the CD recording options, as necessary on screen 2480 (step 2414). The user then clicks on either cancel button 2482 (step 2418) or a Write button 2484 which creates the CD using the CD writer 1184 according to step 2416. When the CD is being burnt, a status screen (not shown) is displayed indicating the track being burnt.

Figure 63:
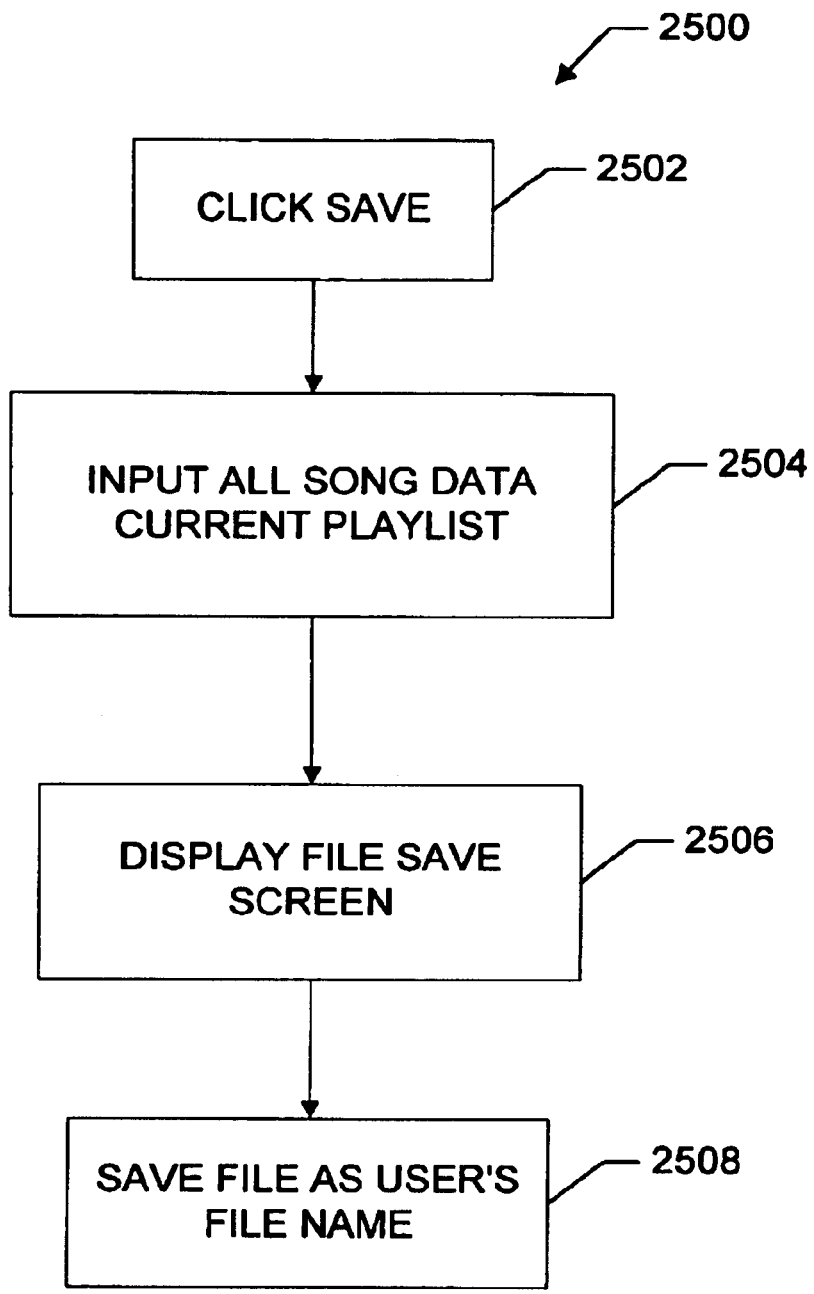
FIG. 63 is a schematic flow diagram for creating and saving play lists files.
Figure 64:
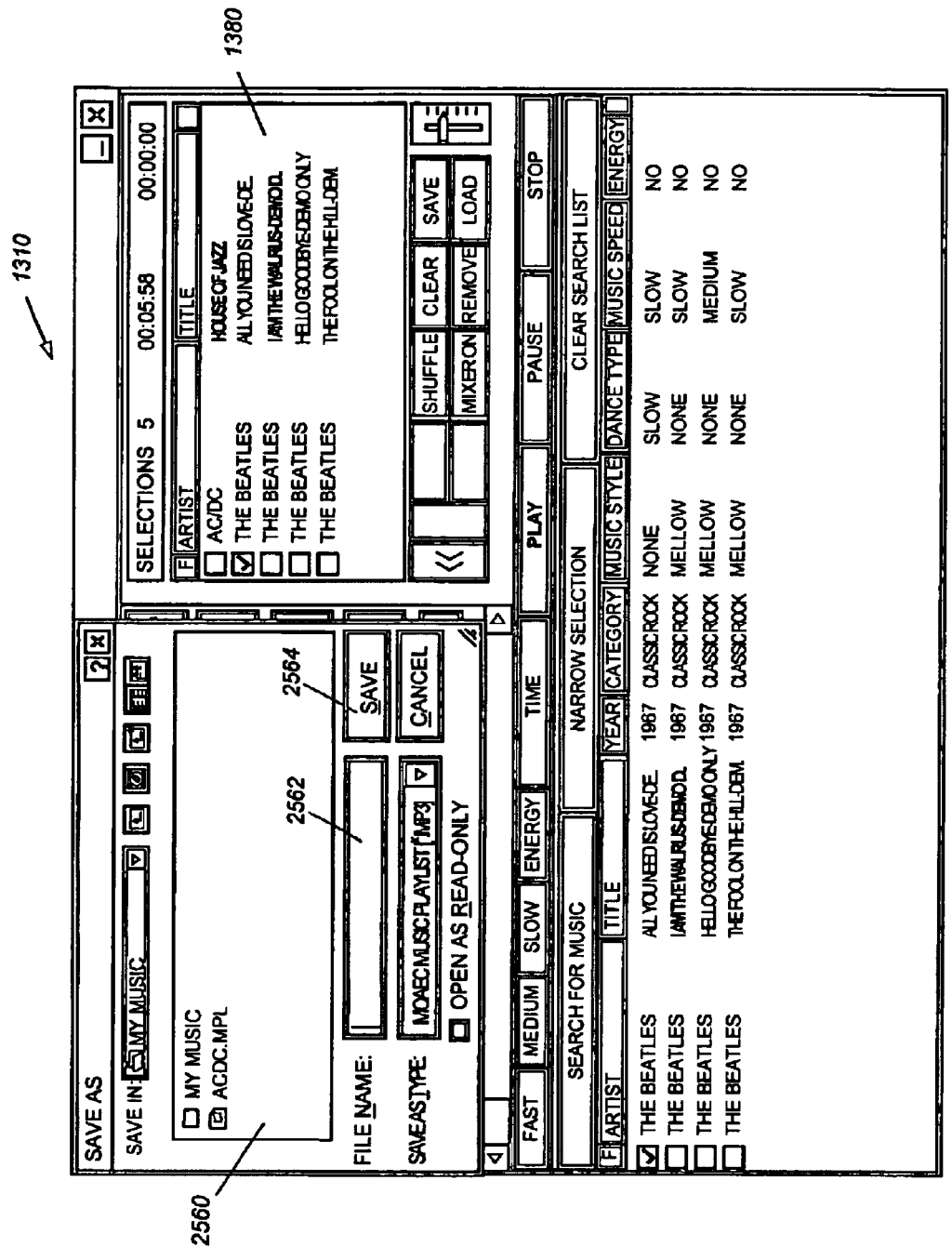
FIG. 64 is a plan view of a Save File Screen superimposed on a Search and Play Main Interface Screen.

Play list files can also be created by the center 1000 by a routine 2500 from the search and play interface software 1240 outlined in FIG. 63. Play list files are created by clicking on the save button 2550, as seen in FIG. 64, under the play list window 1380 according to step 2502. This causes all the media/data selections in the play list window 1380 to be placed in a file (step 2504) and a save file screen 2560 to be superimposed on screen 1340 (according to step 2506). The user then inputs the file name which the play list will be saved to in a file name box 2562 in screen 2560 and clicks on a save button 2564 according to step 2508.

The foregoing has been detailed description of a preferred embodiment of the invention. Various modifications and additions can be made without departing from the spirit and scope of this invention. For example, rather than simply having digital media/data selections resident on the local hard drive or accessed through a compact disc, it is contemplated that streaming digital medium can be used.

For example, users can connect their pc with the center 1000 software to an offsite pre-categorized database via satellite, cable, internet. The digital media may or may not be downloaded into the user's hardware device. Digital media files (i.e. Music, Movies, Books, etc.) are selected and streamed in packets (i.e. small pieces) with conventional streaming technology to the user's center. The digital media need not be downloaded into the users hardware device. As digital media packets (i.e. pieces) are received, they are not downloaded, but played immediately.

The user can categorize, search, organize, locate, play, create favorite play lists, create and bum custom audio or digital CDs while not storing any media/information on their hardware device, therefore not using any memory or storage space. The data/media, etc. may already be organized in the offsite library where the center is receiving the media streamlined via satellite/cable/broadband, etc. in a secure (i.e. encrypted) or non-secure (i.e. non-encrypted) format direct from the publishers libraries (such as, Vivendi/ Universal, BMG, EMI, Sony, AOL/Time Warner, etc.) or direct from the distributor's libraries (i.e. Tower Records, AEI, DMX, Muzak, Direct TV, Music Choice, Pegasus, AT&T Broadband, Looney Productions, LLC, etc.). The media/data/information, as discussed above, is not stored, but streamed and played, organized or recorded out of the customer's hard drive, flash card, memory stick, microchip or other portable or stationary device.

Alternatively, streaming digital, audio, video or other media can be downloaded into the center's hardware device. The digital media packets (i.e. pieces) can be organized or categorized prior to being received or after they are downloaded into the center's database.

It is also contemplated that the center software can be used in a network or multi-zoned environment where the library of media/data and software is shared by many users at the same time. For example, airplanes, automobiles, cruise ships, digital tvs, pcs, hotel rooms, boats, etc. each have a terminal (i.e. monitor (viewing screen), keyboard and speakers, etc.) in different locations for individually searching and playing music from a single library resident on one storage device located anywhere.

It is also contemplated, that a center may have speakers at various locations and the center software could control what media/data is to be played at what locations at the same time. For example, the center could allow jazz to be played in room (or zone) one, rock to be played in room two, folk music to be played in room three, love stories in a fourth room, action movies in a fifth room, and horror films in a sixth room, etc.

It is also contemplated that the center could also be used as a scheduler to start or stop playing media/data at any given time.

What is claimed is:

1. A media organizer and entertainment center comprising:
    an importer for importing individual media/data selections and automatically assigning each media/data selection at least one associated category flag representing a user-selected media content style;
    a storage device for storing compressed data corresponding to the plurality of individual media/data selections and the associated category flags;
    a retriever for retrieving the compressed data corresponding to the data selections from the storage device based upon user selection of one or more of the associated category flags;
    a selector for selecting for retrieval for a time interval chosen by the user the compressed data corresponding to each user-selected category flag;
    a data decompresser that translates the compressed data into playable digital media/data representing a timed sequence of all the media content styles selected by the user, and
    means for outputting the playable digital media data to a playing device whereby said device automatically plays a series of media selections segmented in a timed fashion according to the selected media styles.

2. The center as set forth in claim 1, wherein the importer includes means for importing individual media/data selections in an uncompressed form and converting the media/data selections to the compressed data.

3. The center as set forth in claim 1, wherein the importer includes means for importing the compressed data corresponding to the media/data selection.

4. The center as set forth in claim 3, wherein the importer means includes means for importing the compressed data over the internet.

5. The center of claim 3 wherein the importing means includes means for importing the compressed data from the storage device.

6. The center as set forth in claim 1, wherein the importer includes means for automatically accessing a remote database to obtain and assign associated category flags.

7. The center as set forth in claim 1, and further comprising means for altering the associated category flags.

8. The center as set forth in claim 1 further comprising a graphical user interface display having a plurality of category buttons constructed and arranged so that when a predetermined of the category buttons is activated, media/data selections having associated category flags matching the predetermined category of a respective of the buttons are selected and listed on the display to form a searchlist.

9. The center as set forth in claim 8 wherein the display includes a playlist of media/data selections chosen from the display list, the center being constructed and arranged to translate compressed data of each of the media/data selections on the playlist, in a predetermined order, and to convert the playable digital media/data into audible signals.

10. The center as set forth in of claim 1, further comprising means for creating a playlist of media/data selections from the retrieved selections and means for transmitting data corresponding to the media/data selections on the playlist to a second storage device.

11. The center as set forth in claim 10, further comprising means for decompressing the compressed data to form the data to be transmitted by the transmission means.

12. The center as set forth in claim 1 wherein the predetermined criteria for assigning at least one category flag comprises a number of beats per minute in each media/data selection.

13. The center as set forth in claim 1 wherein the individual media/data selections further comprises motion or non-motion pictures, videos, video games or games.

14. The center as set forth in claim 1 wherein the individual media/data selections further comprises books, articles, advertisements or commercials.

15. The center as set forth in claim 1, wherein the importer imports the media/data selections from a satellite, internet, cable, telephone or wireless media connection.

16. The center as set forth in claim 1, wherein the importer imports the media/data selections from a streaming media source.

17. The center as set forth in claim 1 wherein the plurality of individual media/data selections are shared among a plurality of users.

* * * * *

UNITED STATES PATENT AND TRADEMARK OFFICE
CERTIFICATE OF CORRECTION

PATENT NO.         : 6,953,886 B1
APPLICATION NO.    : 09/951040
DATED              : October 11, 2005
INVENTOR(S)        : Brian M. Looney et al.

Page 1 of 1

It is certified that error appears in the above-identified patent and that said Letters Patent is hereby corrected as shown below:

On title page, item (63) "Related U.S. Application Data," should read as follows:

Continuation-in-part of application No. 09/855,858, filed on May 15, 2001, now abandoned, which is a continuation of application No. 09419,559, filed on Oct 18, 1999, now Pat. No. 6,232,539, <u>which is a continuation of application No. 09/098,843, filed on Jun. 17, 1998, now Pat. No. 5,969,283</u>.

Col. 1, line 5

In the first paragraph of the Specification of U.S. Patent No. 6,953,886, "RELATED APPLICATIONS," should read as follows:

This is a continuation-in-part of U.S. patent application Ser. No. 09/855,858 filed on May 15, 2001, now abandoned, which is a continuation of application Ser. No. 09/419,559 filed Oct. 18, 1999, now U.S. Pat. No. 6,232,539/B1, <u>which is a continuation of U.S. patent application Ser. No. 09/098,843, filed on Jun. 17, 1998, now U.S. Pat. No. 5,969,283.</u>

Signed and Sealed this
Twenty-sixth Day of July, 2011

David J. Kappos
*Director of the United States Patent and Trademark Office*